US012282324B2

(12) United States Patent
Elbsat et al.

(10) Patent No.: US 12,282,324 B2
(45) Date of Patent: Apr. 22, 2025

(54) MODEL PREDICTIVE MAINTENANCE SYSTEM WITH DEGRADATION IMPACT MODEL

(71) Applicant: Johnson Controls Technology Company, Auburn Hills, MI (US)

(72) Inventors: Mohammad N. Elbsat, Milwaukee, WI (US); Michael J. Wenzel, Oak Creek, WI (US); Robert D. Turney, Watertown, WI (US)

(73) Assignee: Tyco Fire & Security GmbH, Neuhausen am Rheinfall (CH)

(*) Notice: Subject to any disclaimer, the term of this patent is extended or adjusted under 35 U.S.C. 154(b) by 0 days.

(21) Appl. No.: 16/899,220

(22) Filed: Jun. 11, 2020

(65) Prior Publication Data

US 2020/0301408 A1    Sep. 24, 2020

Related U.S. Application Data

(63) Continuation-in-part of application No. 15/895,836, filed on Feb. 13, 2018, now Pat. No. 11,487,277.
(Continued)

(51) Int. Cl.
G05B 23/02    (2006.01)
G05B 19/042    (2006.01)
G06N 3/08    (2023.01)

(52) U.S. Cl.
CPC ..... *G05B 23/0283* (2013.01); *G05B 19/0428* (2013.01); *G05B 23/0291* (2013.01); *G06N 3/08* (2013.01)

(58) Field of Classification Search
CPC ............ G05B 23/0283; G05B 23/0294; G05B 19/0428; G05B 23/0291; G05B 23/024;
(Continued)

(56) References Cited

U.S. PATENT DOCUMENTS 5,216,612 A    6/1993    Cornett et al.
5,630,070 A    5/1997    Dietrich et al.
(Continued)

FOREIGN PATENT DOCUMENTS

CA    2499695    4/2004
CN    104833063 A    8/2015
(Continued)

OTHER PUBLICATIONS

Correlation, Wikipedia, printed Oct. 10, 2022.*
(Continued)

*Primary Examiner* — Juan C Ochoa
(74) *Attorney, Agent, or Firm* — Foley & Lardner LLP

(57) ABSTRACT

A model predictive maintenance (MPM) system for building equipment includes one or more processing circuits having one or more processors and memory. The memory store instructions that, when executed by the one or more processors, cause the one or more processors to perform operations including estimating a degradation state of the building equipment, using a degradation impact model to predict an amount of one or more input resources consumed by the building equipment to produce one or more output resources based on the degradation state of the building equipment, generating a maintenance schedule for the building equipment based on the amount of the one or more input resources predicted by the degradation impact model, and initiating a maintenance activity for the building equipment in accordance with the maintenance schedule.

20 Claims, 17 Drawing Sheets

Related U.S. Application Data

(60) Provisional application No. 62/883,508, filed on Aug. 6, 2019, provisional application No. 62/511,113, filed on May 25, 2017.

(58) Field of Classification Search
CPC ...... G06Q 30/0206; G06Q 10/20; G06N 3/08; G06N 3/04
USPC .......................................................... 703/2, 6
See application file for complete search history.

(56) References Cited

U.S. PATENT DOCUMENTS

| | | | |
|---|---|---|---|
| 6,145,751 A | 11/2000 | Ahmed | |
| 7,062,361 B1 | 6/2006 | Lane | |
| 7,124,059 B2 | 10/2006 | Wetzer et al. | |
| 7,457,762 B2 | 11/2008 | Wetzer et al. | |
| 7,464,046 B2 | 12/2008 | Wilson et al. | |
| 7,693,735 B2 | 4/2010 | Carmi et al. | |
| 8,014,892 B2 | 9/2011 | Glasser | |
| 8,126,574 B2 | 2/2012 | Discenzo et al. | |
| 8,170,893 B1 | 5/2012 | Rossi | |
| 8,396,571 B2 | 3/2013 | Costiner et al. | |
| 8,880,962 B2 | 11/2014 | Hosking et al. | |
| 8,903,554 B2 | 12/2014 | Stagner | |
| 9,002,530 B2 | 4/2015 | O'Connor et al. | |
| 9,058,568 B2 | 6/2015 | Hosking et al. | |
| 9,058,569 B2 | 6/2015 | Hosking et al. | |
| 9,185,176 B2 | 11/2015 | Nielsen et al. | |
| 9,235,847 B2 | 1/2016 | Greene et al. | |
| 9,424,693 B2 | 8/2016 | Rodrigues | |
| 9,436,179 B1 | 9/2016 | Turney et al. | |
| 9,514,577 B2 | 12/2016 | Ahn et al. | |
| 9,740,545 B2 | 8/2017 | Aisu et al. | |
| 9,760,068 B2 | 9/2017 | Harkonen et al. | |
| 9,945,264 B2 | 4/2018 | Wichmann et al. | |
| 10,094,586 B2 | 10/2018 | Pavlovski et al. | |
| 10,101,731 B2 | 10/2018 | Asmus et al. | |
| 10,175,681 B2 | 1/2019 | Wenzel et al. | |
| 10,190,793 B2 | 1/2019 | Drees et al. | |
| 10,250,039 B2 | 4/2019 | Wenzel et al. | |
| 10,359,748 B2 | 7/2019 | Elbsat et al. | |
| 10,389,136 B2 | 8/2019 | Drees | |
| 10,437,241 B2 | 10/2019 | Higgins et al. | |
| 10,438,303 B2 | 10/2019 | Chen et al. | |
| 10,554,170 B2 | 2/2020 | Drees | |
| 10,564,610 B2 | 2/2020 | Drees | |
| 10,591,875 B2 | 3/2020 | Shanmugam et al. | |
| 10,761,547 B2 | 9/2020 | Risbeck et al. | |
| 10,762,475 B2 | 9/2020 | Song et al. | |
| 10,817,530 B2 | 10/2020 | Siebel et al. | |
| 10,876,755 B2 | 12/2020 | Martin | |
| 11,003,175 B2 | 5/2021 | Xenos et al. | |
| 2002/0072988 A1 | 6/2002 | Aram | |
| 2003/0158803 A1 | 8/2003 | Darken et al. | |
| 2004/0049295 A1 | 3/2004 | Wojsznis et al. | |
| 2004/0054564 A1 | 3/2004 | Fonseca et al. | |
| 2005/0091004 A1 | 4/2005 | Parlos et al. | |
| 2007/0005191 A1 | 1/2007 | Sloup et al. | |
| 2007/0203860 A1 | 8/2007 | Golden et al. | |
| 2007/0227721 A1 | 10/2007 | Springer et al. | |
| 2009/0112369 A1 | 4/2009 | Gwerder et al. | |
| 2009/0204267 A1 | 8/2009 | Sustaeta et al. | |
| 2009/0210081 A1* | 8/2009 | Sustaeta | H04L 67/125 715/702 |
| 2009/0240381 A1 | 9/2009 | Lane | |
| 2009/0313083 A1 | 12/2009 | Dillon et al. | |
| 2009/0319090 A1 | 12/2009 | Dillon et al. | |
| 2010/0241285 A1 | 9/2010 | Johnson et al. | |
| 2010/0262298 A1 | 10/2010 | Johnson et al. | |
| 2011/0018502 A1 | 1/2011 | Bianciotto et al. | |
| 2011/0035328 A1 | 2/2011 | Nielsen et al. | |
| 2011/0093310 A1 | 4/2011 | Watanabe et al. | |
| 2011/0130857 A1 | 6/2011 | Budiman et al. | |
| 2011/0178643 A1 | 7/2011 | Metcalfe | |
| 2011/0231028 A1 | 9/2011 | Ozog | |
| 2011/0231320 A1 | 9/2011 | Irving | |
| 2012/0016607 A1 | 1/2012 | Cottrell et al. | |
| 2012/0036250 A1 | 2/2012 | Vaswani et al. | |
| 2012/0092180 A1 | 4/2012 | Rikkola et al. | |
| 2012/0245968 A1 | 9/2012 | Beaulieu et al. | |
| 2012/0259469 A1 | 10/2012 | Ward et al. | |
| 2012/0296482 A1 | 11/2012 | Steven et al. | |
| 2012/0310860 A1 | 12/2012 | Kim et al. | |
| 2012/0316906 A1 | 12/2012 | Hampapur et al. | |
| 2013/0006429 A1 | 1/2013 | Shanmugam et al. | |
| 2013/0010348 A1 | 1/2013 | Massard et al. | |
| 2013/0020443 A1 | 1/2013 | Dyckrup et al. | |
| 2013/0085614 A1 | 4/2013 | Wenzel et al. | |
| 2013/0103481 A1 | 4/2013 | Carpenter et al. | |
| 2013/0113413 A1 | 5/2013 | Harty | |
| 2013/0204443 A1 | 8/2013 | Steven et al. | |
| 2013/0274937 A1 | 10/2013 | Ahn et al. | |
| 2013/0282195 A1 | 10/2013 | O'Connor et al. | |
| 2013/0339080 A1* | 12/2013 | Beaulieu | G06Q 10/00 705/7.25 |
| 2014/0039709 A1 | 2/2014 | Steven et al. | |
| 2014/0163936 A1 | 6/2014 | Hosking et al. | |
| 2014/0201018 A1 | 7/2014 | Chassin | |
| 2014/0244051 A1 | 8/2014 | Rollins et al. | |
| 2014/0249680 A1 | 9/2014 | Wenzel | |
| 2014/0277756 A1 | 9/2014 | Bruce et al. | |
| 2014/0277769 A1 | 9/2014 | Matsuoka et al. | |
| 2014/0316973 A1 | 10/2014 | Steven et al. | |
| 2015/0008884 A1 | 1/2015 | Waki et al. | |
| 2015/0027681 A1 | 1/2015 | Ragland et al. | |
| 2015/0088576 A1 | 3/2015 | Steven et al. | |
| 2015/0134123 A1 | 5/2015 | Obinelo | |
| 2015/0309495 A1 | 10/2015 | Delorme et al. | |
| 2015/0311713 A1 | 10/2015 | Asghari et al. | |
| 2015/0316903 A1 | 11/2015 | Asmus et al. | |
| 2015/0316907 A1 | 11/2015 | Elbsat et al. | |
| 2015/0326015 A1 | 11/2015 | Steven et al. | |
| 2015/0331972 A1 | 11/2015 | McClure et al. | |
| 2015/0371328 A1 | 12/2015 | Gabel et al. | |
| 2016/0020608 A1 | 1/2016 | Carrasco et al. | |
| 2016/0043550 A1 | 2/2016 | Sharma et al. | |
| 2016/0077880 A1 | 3/2016 | Santos et al. | |
| 2016/0092986 A1 | 3/2016 | Lian et al. | |
| 2016/0148137 A1 | 5/2016 | Phan et al. | |
| 2016/0148171 A1 | 5/2016 | Phan et al. | |
| 2016/0190805 A1 | 6/2016 | Steven et al. | |
| 2016/0209852 A1 | 7/2016 | Beyhaghi et al. | |
| 2016/0216722 A1 | 7/2016 | Tokunaga et al. | |
| 2016/0218505 A1* | 7/2016 | Krupadanam | H02J 3/005 |
| 2016/0246908 A1 | 8/2016 | Komzsik | |
| 2016/0275630 A1 | 9/2016 | Strelec et al. | |
| 2016/0281607 A1 | 9/2016 | Asati et al. | |
| 2016/0305678 A1 | 10/2016 | Pavlovski et al. | |
| 2016/0329708 A1 | 11/2016 | Day | |
| 2016/0356515 A1 | 12/2016 | Carter | |
| 2016/0363948 A1 | 12/2016 | Steven et al. | |
| 2016/0373453 A1 | 12/2016 | Ruffner et al. | |
| 2016/0379149 A1 | 12/2016 | Saito et al. | |
| 2017/0003667 A1 | 1/2017 | Nakabayashi et al. | |
| 2017/0083822 A1 | 3/2017 | Adendorff et al. | |
| 2017/0097647 A1 | 4/2017 | Lunani et al. | |
| 2017/0102162 A1 | 4/2017 | Drees et al. | |
| 2017/0102433 A1 | 4/2017 | Wenzel et al. | |
| 2017/0102434 A1 | 4/2017 | Wenzel et al. | |
| 2017/0102675 A1 | 4/2017 | Drees | |
| 2017/0103483 A1 | 4/2017 | Drees et al. | |
| 2017/0104332 A1 | 4/2017 | Wenzel et al. | |
| 2017/0104336 A1 | 4/2017 | Elbsat et al. | |
| 2017/0104337 A1 | 4/2017 | Drees | |
| 2017/0104342 A1 | 4/2017 | Elbsat et al. | |
| 2017/0104343 A1 | 4/2017 | Elbsat et al. | |
| 2017/0104344 A1 | 4/2017 | Wenzel et al. | |
| 2017/0104345 A1 | 4/2017 | Wenzel et al. | |
| 2017/0104346 A1 | 4/2017 | Wenzel et al. | |
| 2017/0104449 A1 | 4/2017 | Drees | |
| 2017/0167742 A1 | 6/2017 | Radovanovic et al. | |
| 2017/0169143 A1 | 6/2017 | Farahat et al. | |
| 2017/0205818 A1 | 7/2017 | Adendorff et al. | |

(56) References Cited

U.S. PATENT DOCUMENTS

| | | | |
|---|---|---|---|
| 2017/0236222 A1 | 8/2017 | Chen et al. | |
| 2017/0268795 A1 | 9/2017 | Yamamoto et al. | |
| 2017/0288455 A1 | 10/2017 | Fife | |
| 2017/0309094 A1 | 10/2017 | Farahat et al. | |
| 2017/0351234 A1 | 12/2017 | Chen et al. | |
| 2017/0364043 A1 | 12/2017 | Ganti et al. | |
| 2017/0366414 A1* | 12/2017 | Hamilton | H04L 41/145 |
| 2018/0004171 A1 | 1/2018 | Patel et al. | |
| 2018/0004172 A1 | 1/2018 | Patel et al. | |
| 2018/0046149 A1 | 2/2018 | Ahmed | |
| 2018/0082373 A1 | 3/2018 | Hong et al. | |
| 2018/0173214 A1 | 6/2018 | Higgins et al. | |
| 2018/0180314 A1 | 6/2018 | Brisette et al. | |
| 2018/0196456 A1 | 7/2018 | Elbsat | |
| 2018/0197253 A1 | 7/2018 | Elbsat et al. | |
| 2018/0203961 A1 | 7/2018 | Aisu et al. | |
| 2018/0224814 A1 | 8/2018 | Elbsat et al. | |
| 2018/0341255 A1 | 11/2018 | Turney et al. | |
| 2018/0373234 A1 | 12/2018 | Khalate et al. | |
| 2019/0066236 A1 | 2/2019 | Wenzel | |
| 2019/0129403 A1 | 5/2019 | Turney et al. | |
| 2019/0271978 A1 | 9/2019 | Elbsat et al. | |
| 2019/0295034 A1 | 9/2019 | Wenzel et al. | |
| 2019/0311332 A1 | 10/2019 | Turney et al. | |
| 2019/0325368 A1 | 10/2019 | Turney et al. | |
| 2019/0338972 A1 | 11/2019 | Schuster et al. | |
| 2019/0338973 A1 | 11/2019 | Turney et al. | |
| 2019/0338974 A1 | 11/2019 | Turney et al. | |
| 2019/0338977 A1 | 11/2019 | Turney et al. | |
| 2019/0347622 A1 | 11/2019 | Elbsat et al. | |
| 2019/0354071 A1 | 11/2019 | Turney et al. | |
| 2020/0019129 A1 | 1/2020 | Sircar et al. | |
| 2020/0088427 A1 | 3/2020 | Li et al. | |
| 2020/0090289 A1 | 3/2020 | Elbsat et al. | |
| 2020/0096985 A1 | 3/2020 | Wenzel et al. | |
| 2020/0166230 A1 | 5/2020 | Ng et al. | |
| 2020/0191427 A1 | 6/2020 | Martin | |
| 2020/0200423 A1 | 6/2020 | Gervais | |
| 2020/0301408 A1 | 9/2020 | Elbsat et al. | |

FOREIGN PATENT DOCUMENTS

| | | |
|---|---|---|
| CN | 104850013 A | 8/2015 |
| CN | 105320118 A | 2/2016 |
| CN | 106817909 A | 6/2017 |
| CN | 109980638 A | 7/2019 |
| CN | 11895625 A | 11/2020 |
| EP | 3 088 972 A2 | 11/2016 |
| EP | 3 447 258 A1 | 2/2019 |
| JP | 2001-357112 | 12/2001 |
| JP | 2003-141178 | 5/2003 |
| JP | 2005-148955 A | 6/2005 |
| JP | 2005-182465 | 7/2005 |
| JP | 2010-078447 A | 4/2010 |
| JP | 2012-073866 | 4/2012 |
| WO | WO-2011/072332 A1 | 6/2011 |
| WO | WO-2011/080547 A1 | 7/2011 |
| WO | WO-2012/145563 A1 | 10/2012 |
| WO | WO-2014/143908 A1 | 9/2014 |
| WO | WO-2015/031581 A1 | 3/2015 |
| WO | WO-2016/144586 | 9/2016 |
| WO | WO-2017/062896 A1 | 4/2017 |
| WO | WO-2018/128652 A1 | 7/2018 |
| WO | WO-2018/217251 A1 | 11/2018 |

OTHER PUBLICATIONS

Extended European Search Report on EP 18806317.6, dated Jun. 17, 2021, 10 pages.

Freire et al., "Predictive controllers for thermal comfort optimization and energy savings," Energy and Buildings, 2008, vol. 40, No. 7, pp. 1353-1365.

Nwankpa et al., "Activation Functions: Comparison of Trends in Practice and Research for Deep Learning," Engineering, University of Strathclyde, Glasgow, UK, 2018, 20 pages.

Schiavon et al., "Dynamic predictive clothing insulation models based on outdoor air and indoor operative temperatures," 2013, Building and Environment, 59, pp. 250-260.

Shanker et al., "Effect of Data Standardization on Neural Network Training," Omega, Int. J. Mgmt. Sci., 1996, vol. 24, No. 4, pp. 385-397.

Srivastava et al., "Dropout: a simple way to prevent neural networks from overfitting," Journal of Machine Learning Research, 2014, vol. 15, No. 1, pp. 1929-1958.

Taleghani et al., "A review into thermal comfort in buildings," Renewable and Sustainable Energy Reviews, Oct. 2013, vol. 26, p. 201-215.

Timplalexis et al., "Thermal Comfort Metabolic Rate and Clothing Inference," Centre for Research and Technology Hellas/Information Technologies Institute, Greece, Sep. 2019, pp. 690-699.

Weigel et al., "applying GIS and or Techniques to Solve Sears Technician-Dispatching and Home Delivery Problems," Interface, Jan.-Feb. 1999, 29:1, pp. 112-130 (20 pages total).

International Search Report and Written Opinion on PCT/US2020/045237, dated Nov. 10, 2020, 18 pages.

International Search Report and Written Opinion on PCT/US2020/042916, dated Oct. 8, 2020, 14 pages.

International Search Report and Written Opinion on PCT/US2020/045238, dated Oct. 26, 2020, 14 pages.

Moon, Jin Woo, "Performance of ANN-based predictive and adaptive thermal-control methods for disturbances in and around residential buildings," Building and Environment, 2012, vol. 48, pp. 15-26.

Fuller, Life-Cycle Cost Analysis (LCCA) | WBDG—Whole Building Design Guide, National Institute of Standards and Technology (NIST), https://www.wbdg.org/resources/life-cycle-cost-analysis-lcca, 2016, pp. 1-13.

Gedam, "Optimizing R&M Performance of a System Using Monte Carlo Simulation", 2012 Proceedings Annual Reliability and Maintainability Symposium, 2012, pp. 1-6.

Hagmark, et al., "Simulation and Calculation of Reliability Performance and Maintenance Costs", 2007 Annual Reliability and Maintainability Symposium, IEEE Xplore, 2007, pp. 34-40.

Mohsenian-Rad et al., "Smart Grid for Smart city Activities in the California City of Riverside," In: Alberto Leon-Garcia et al.: "Smart City 360°", Aug. 6, 2016, 22 Pages.

Notice of Allowance on U.S. Appl. No. 16/232,309 DTD Aug. 26, 2020.

Office Action on EP 18150740.1, dated Nov. 5, 2019, 6 pages.

Office Action on EP 18176474.7 dated Sep. 11, 2019. 5 pages.

Office Action on EP 18176474.7, dated Feb. 10, 2020, 6 pages.

Office Action on EP 18190786.6, dated Feb. 5, 2020, 4 pages.

Rahman et al., "Cost Estimation for Maintenance Contracts for Complex Asset/Equipment", 2008 IEEE International Conference on Industrial Engineering and Engineering Management, 2008, pp. 1355-1358.

Ruijters et al., "Fault Maintenance Trees: Reliability Centered Maintenance via Statistical Model Checking", 2016 Annual Reliability and Maintainability Symposium (RAMS), Jan. 25-28, 2016, pp. 1-6.

Afram et al., "Artificial Neural Network (ANN) Based Model Predictive Control (MPC) and Optimization of HVAC Systems: A State of the Art Review and Case Study of a Residential HVAC System," Energy and Buildings, Apr. 15, 2017, 141, pp. 96-113.

Ahou et al., "Reliability-centered predictive maintenance scheduling for a continuously monitored system subject to degradation," Reliability Engineering & System Safety, 2007, 92.4, pp. 530-534.

Astrom. "Optimal Control of Markov Decision Processes with Incomplete State Estimation," J. Math. Anal. Appl., 1965, 10, pp. 174-205.

U.S. Appl. No. 16/294,433, filed Mar. 6, 2019, Hitachi-Johnson Controls Air Conditioning, Inc.

U.S. Appl. No. 62/673,479, filed May 18, 2018, Johson Controls Technology Co.

U.S. Appl. No. 62/673,496, filed May 18, 2018, Johnson Controls Technology Co.

(56) References Cited

OTHER PUBLICATIONS

U.S. Appl. No. 62/853,983, filed May 29, 2019, Johnson Controls Technology Co.
Aynur, "Variable refrigerant flow systems: A review." Energy and Buildings, 2010, 42.7, pp. 1106-1112.
Bittanti et al., Adaptive Control of Linear Time Invariant Systems: The "Bet on the Best" Principle Communications in Information and Systems, 2006, 6.4, pp. 299-320.
Chan et al., "Estimation of Degradation-Based Reliability in Outdoor Environments," Statistics Preprints, Jun. 19, 2001, 25, 33 pages.
Chen et al., "Control-oriented System Identification: an H1 Approach," Wiley-Interscience, 2000, 19, Chapters 3 & 8, 38 pages.
Chu et al., "Predictive maintenance: The one-unit replacement model," International Journal of Production Economics, 1998, 54.3, pp. 285-295.
Chua et al., "Achieving better energy-efficient air conditioning—a review of technologies and strategies," Applied Energy, 2013, 104, pp. 87-104.
Crowder et al., "The Use of Degradation Measures to Design Reliability Test Plans." World Academy of Science, Engineering and Technology, International Journal of Mathematical, Computational, Physical, Electrical and Computer Engineering, 2014, 8, 18 pages.
De Carlo et al., "Maintenance Cost Optimization in Condition Based Maintenance: A Case Study for Critical Facilities," International Journal of Engineering and Technology, Oct.-Nov. 2013, 5.5, pp. 4296-4302.
E Costa et al., "A multi-criteria model for auditing a Predictive Maintenance Programme," European Journal of Operational Research, Sep. 29, 2011, 217.2, pp. 381-393.
Ebbers et al. "Smarter Data Centers—Achieving Great Efficiency—Second Edition", Oct. 21, 2011, 138 pages.
Emmerich et al., "State-of-the-Art Review of $CO_2$ Demand Controlled Ventilation Technology and Application," Nistir, Mar. 2001, 47 pages.
Extended European Search Report on European Patent Application No. 18150740.1 dated May 16, 2018, 7 pages.
Extended European Search Report on European Patent Application No. 18155069.0 dated Jun. 11, 2018, 6 pages.
Extended European Search Report on European Patent Application No. 18190786.6 dated Oct. 10, 2018, 7 pages.
Extended European Search Reported on EP Patent Application No. 18176474 dated Sep. 5, 2018, 8 pages.
Feng et al., "Model Predictive Control of Radiant Slab Systems with Evaporative Cooling Sources," Energy and Buildings, 2015, 87, pp. 199-210.
Fu et al., "Predictive Maintenance in Intelligent-Control-Maintenance-Management System for Hydroelectric Generating Unit," IEEE Transactions on Energy Conversion, Mar. 2004, 19.1, pp. 179-186.
George et al., "Time Series Analysis: Forecasting and Control," Fifth Edition, John Wiley & Sons, 2016, Chapters 4-7 and 13-15, 183 pages.
Grall et al., "Continuous-Time Predictive-Maintenance Scheduling for a Deteriorating System," IEEE Transactions on Reliability, Jun. 2002, 51.2, pp. 141-150.
Hardt et al., "Gradient Descent Learns Linear Dynamical Systems," Journal of Machine Learning Research, 2018, 19, pp. 1-44.
Helmicki et al. "Control Oriented System Identification: a Worstcase/deterministic Approach in H1," IEEE Transactions on Automatic Control, 1991, 36.10, pp. 1163-1176.
Hong et al. "Development and Validation of a New Variable Refrigerant Flow System Model in Energyplus," Energy and Buildings, 2016, 117, pp. 399-411.
Hong et al., "Statistical Methods for Degradation Data With Dynamic Covariates Information and an Application to Outdoor Weathering Data," Technometrics, Nov. 2014, 57.2, pp. 180-193.
International Search Report and Written Opinion on PCT/US2018/018039, dated Apr. 24, 2018, 14 pages.
JP2003141178 WIPO Translation, Accessed Feb. 18, 2020, 15 pages.
Kelman et al., "Bilinear Model Predictive Control of a HVAC System Using Sequential Quadratic Programming," Proceedings of the IFAC World Congress, Sep. 2, 2011, 6 pages.
Kharoufeh et al., "Semi-Markov Models for Degradation-Based Reliability," IIE Transactions, May 2010, 42.8, pp. 599-612.
Kingma et al.,. "Adam: A Method for Stochastic Optimization," International Conference on Learning Representations (ICLR), 2015, 15 pages.
Li et al., "Reliability Modeling and Life Estimation Using an Expectation Maximization Based Wiener Degradation Model for Momentum Wheels" IEEE Transactions on Cybernetics, May 2015, 45.5, pp. 969-977.
Ljung et al., "Theory and Practice of Recursive Identification," vol. 5. Jstor, 1983, Chapters 2, 3 & 7, 80 pages.
Ljung, editor. "System Identification: Theory for the User," 2nd Edition, Prentice Hall, Upper Saddle River, New Jersey, 1999, Chapters 5 and 7, 40 pages.
Moseley et al. "Electrochemical Energy Storage for Renewable Sources and Grid Balancing" Nov. 7, 2014. 14 pages.
Nevena et al., "Data center cooling using model-predictive control," 32nd Conference on Neural Information Processing Systems, 2018, 10 pages.
Pan et al., "Reliability modeling of degradation of products with multiple performance characteristics based on gamma processes," Reliability Engineering & System Safety, 2011, 96.8, pp. 949-957.
Peng et al., "Bayesian Degradation Analysis with Inverse Gaussian Process Models Under Time-Varying Degradation Rates," IEEE Transactions on Reliability, Mar. 2017, 66.1, pp. 84-96.
Peng et al., "Bivariate Analysis of Incomplete Degradation Observations Based on Inverse Gaussian Processes and Copulas," IEEE Transactions on Reliability, Jun. 2016, 65.2, pp. 624-639.
Peng et al., "Switching State-Space Degradation Model with Recursive Filter/Smoother for Prognostics of Remaining Useful Life," IEEE Transactions on Industrial Informatics, Feb. 2019, 15.2, pp. 822-832.
Perez-Lombard et al., "A review on buildings energy consumption information," Energy and Buildings, 2008, 40.3, pp. 394-398.
PJM Economic Demand Resource in Energy Market, PJM State and Member Training Department, 2014, 119 pages.
PJM Manual 11: Energy & Ancillary Services Market Operations, pp. 122-137, PJM, 2015.
PJM Open Access Transmission Tariff, Section 3.3A, Apr. 4, 2016, 10 pages.
Wan et al., "Data Analysis and Reliability Estimation of Step-Down Stress Accelerated Degradation Test Based on Wiener Process," Prognostics and System Health Management Conference (PHM-2014 Hunan), Aug. 2014, 5 pages.
Wang et al., "Reliability and Degradation Modeling with Random or Uncertain Failure Threshold," Reliability and Maintainability Symposium, 2007, pp. 392-397.
Xiao et al., "Optimal Design for Destructive Degradation Tests with Random Initial Degradation Values Using the Wiener Process," IEEE Transactions on Reliability, Sep. 2016, 65.3, pp. 1327-1342.
Xu et al., "Real-time Reliability Prediction for a Dynamic System Based on the Hidden Degradation Process Identification," IEEE Transactions on Reliability, Jun. 2008, 57.2, pp. 230-242.
Yang et al., "Thermal comfort and building energy consumption implications—a review," Applied Energy, 2014, 115, pp. 164-173.
Yudong et al., "Model Predictive Control for the Operation of Building Cooling Systems," IEEE Transactions on Control Systems Technology, May 2012, 20.3, pp. 796-803.
Yudong et al., "Predictive Control for Energy Efficient Buildings with Thermal Storage: Modeling, Stimulation, and Experiments." IEEE Control Systems, Feb. 2012, 32.1, pp. 44-64.
Zhang et al., "A Novel Variable Refrigerant Flow (VRF) Heat Recovery System Model: Development and Validation," Energy and Buildings, Jun. 2018, 168, pp. 399-412.
Zhang et al., "An Age- and State-Dependent Nonlinear Prognostic Model for Degrading Systems," IEEE Transactions on Reliability, Dec. 2015, 64.4, pp. 1214-1228.

(56) References Cited

OTHER PUBLICATIONS

Zhang et al., "Analysis of Destructive Degradation Tests for a Product with Random Degradation Initiation Time," IEEE Transactions on Reliability, Mar. 2015, 64.1, pp. 516-527.

Zhou et al. "Asset Lite Prediction Using Multiple Degradation Indicators and Lifetime Data: a Gamma-Based State Space Model Approach," 2009 8th International Conference on Reliability, Maintainability and Safety, Aug. 2009, 5 pages.

Doring, Matthias, "Prediction vs Forecasting: Predictions do not always concern the future . . . ," Data Science Blog, URL: https://www.datascienceblog.net/post/machine-learning/forecasting_vs_prediction/, 3 pages, Dec. 9, 2018, 3 pages.

Furuta et al., "Optimal Allocation of Fuzzy Controller and its rule tuning for Structural Vibration," Journal of Japan Society for Fuzzy Theory and Intelligent Informatics, Dec. 2008, vol. 20, No. 6 (pp. 921-934).

JP Office Action on JP 2020-107153, dated Oct. 5, 2021, with English language translation. (7 pages).

JP Office Action on JP Appl. Ser. No. 2020-109855 dated Dec. 7, 2021, with English language translation. (10 pages).

International Preliminary Report on Patentability on PCT Appl. Ser. No. PCT/US2020/045238 dated Feb. 17, 2022 (8 pages).

International Preliminary Report on Patentability on PCT Appl. Ser. No. PCT/US2020/042916 dated Feb. 3, 2022 (8 pages).

International Preliminary Report on patentability on PCT Appl. Ser. No. PCT/US2020/045237 dated Feb. 17, 2022 (11 pages).

Japanese Office Action on JP Appl. No. 2019-554919 dated Mar. 29, 2022 (9 pages with English language translation).

JP Office Action on JP Appl. Ser. No. 2020-109855 dated Jul. 12, 2022, with translation (7 pages).

CN Office Action on CN Appl. Ser. No. 2020800650785 dated Jan. 30, 2023 (13 pages).

Jakhrani et al., "Life Cycle Cost Analysis of a Standalone PV system," IEEE, 2012 International Conference in Green and Ubiquitous Technology (pp. 82-85).

EP Office Action on EP Appl. Ser. No. 18806317.6, dated Feb. 8, 2023 (8 pages).

CN Office Action for CN Appl. Ser. No. 202080065078.5 dated Aug. 10, 2023 (30 pages).

CN Office Action for CN Appl. Ser. No. 202080065078.5 dated Jan. 31, 2024 (32 pages).

Japanese office Action for JP Appl. Ser. No. 2022-160166 dated Jan. 9, 2024 (8 pages).

DE Office Action for DE Appl. Ser. No. 112020003719.3 dated Sep. 25, 2024 (16 pages).

\* cited by examiner

MODEL PREDICTIVE MAINTENANCE SYSTEM WITH DEGRADATION IMPACT MODEL

CROSS-REFERENCE TO RELATED PATENT APPLICATIONS

This application is a continuation-in-part of U.S. patent application Ser. No. 15/895,836 filed Feb. 13, 2018, which claims the benefit of and priority to U.S. Provisional Patent Application No. 62/511,113 filed May 25, 2017. This application also claims the benefit of and priority to U.S. Provisional Patent Application No. 62/883,508 filed Aug. 6, 2019. The entire disclosures of each of these patent applications are incorporated by reference herein.

BACKGROUND

The present disclosure relates generally to control systems for building equipment. The present disclosure relates more particularly to control systems that use predictive modeling to determine an optimal operating strategy and maintenance strategy for building equipment.

Building equipment operate to affect various conditions in a building such as temperature, humidity, air quality, lighting, etc. Building equipment degrade over time, as a result of operating the building equipment, which leads to reduced operating efficiency and increased power consumption and cost. Performing maintenance on building equipment can restore the equipment to a less degraded state and improve the operating efficiency and thus reduce operating cost. However, performing maintenance typically incurs a maintenance cost. Therefore, choosing to perform maintenance on the building equipment reduces ongoing operating cost as a result of reduced power consumption, but incurs an additional maintenance cost. Performing maintenance too frequently may result in a low operating cost but a high maintenance cost, whereas performing maintenance too infrequently may result in a low maintenance cost but a higher operating cost. It can be difficult to determine an appropriate maintenance strategy for building equipment in the interest of reducing total life cycle cost.

SUMMARY

One implementation of the present disclosure is a model predictive maintenance (MPM) system for building equipment. The MPM system includes one or more processing circuits having one or more processors and memory. The memory store instructions that, when executed by the one or more processors, cause the one or more processors to perform operations including estimating a degradation state of the building equipment, using a degradation impact model to predict an amount of one or more input resources consumed by the building equipment to produce one or more output resources based on the degradation state of the building equipment, generating a maintenance schedule for the building equipment based on the amount of the one or more input resources predicted using the degradation impact model, and initiating a maintenance activity for the building equipment in accordance with the maintenance schedule.

In some embodiments, using the degradation impact model to predict the amount of the one or more input resources consumed by the building equipment includes using the degradation impact model to generate parameters of a resource consumption model for the building equipment as a function of the degradation state of the building equipment and using the resource consumption model to predict the amount of one or more input resources consumed by the building equipment to produce the one or more output resources as a function of the parameters of the resource consumption model.

In some embodiments, the degradation impact model is trained using historical or simulated training data prior to using the degradation impact model to predict the amount of the one or more input resources consumed by the building equipment. Training the degradation impact model may include generating training data for the degradation impact model, the training data comprising a plurality of different values of the degradation state of the building equipment and corresponding values of parameters of a resource consumption model for the building equipment, and using the training data to train the degradation impact model to predict the values of the parameters of the resource consumption model as a function of the degradation state.

In some embodiments, generating the training data includes performing a regression process to generate the values of the parameters of the resource consumption model using data associated with a first degradation state of the building equipment and repeating the regression process using data associated with one or more additional degradation states of the building equipment to generate a plurality of different values of the parameters of the resource consumption model, the plurality of different values of the parameters corresponding to a plurality of different degradation states of the building equipment.

In some embodiments, the degradation impact model includes a neural network model and using the degradation impact model to predict the amount of the one or more input resources consumed by the building equipment includes providing the degradation state of the building equipment and an amount of the one or more output resources to be produced by the building equipment as inputs to the neural network model and obtaining the amount of one or more input resources consumed by the building equipment as an output of the neural network model.

In some embodiments, generating the maintenance schedule for the building equipment includes performing an optimization of an objective function that accounts for both a cost of operating the building equipment and a cost of performing maintenance on the building equipment over a time period and generating a set of maintenance decisions for the building equipment as a result of performing the optimization, the set of maintenance decisions forming the maintenance schedule.

In some embodiments, generating the maintenance schedule for the building equipment includes calculating a cost of operating the building equipment over a time period as a function of the degradation state of the building equipment at one or more times within the time period, calculating a cost of performing maintenance on the building equipment over the time period as a function of one or more maintenance activities defined by the maintenance schedule, adjusting the degradation state of the building equipment at one or more times following the one or more maintenance activities defined by the maintenance schedule, and generating the maintenance schedule that results in a lowest total cost comprising the cost of operating the building equipment over the time period and the cost of performing maintenance on the building equipment over the time period.

In some embodiments, the degradation state of the building equipment is an initial degradation state. The operations may further include predicting one or more future degradation states of the building equipment as a function of the initial degradation state and using the degradation impact model to predict the amount of the one or more input resources consumed by the building equipment at one or more future times as a function of the one or more future degradation states.

Another implementation of the present disclosure is a method for using model predictive maintenance (MPM) to generate a maintenance schedule for building equipment. The method includes estimating a degradation state of the building equipment, using a degradation impact model to predict an amount of one or more input resources consumed by the building equipment to produce one or more output resources based on the degradation state of the building equipment, generating a maintenance schedule for the building equipment based on the amount of the one or more input resources predicted using the degradation impact model, and initiating a maintenance activity for the building equipment in accordance with the maintenance schedule.

In some embodiments, using the degradation impact model to predict the amount of the one or more input resources consumed by the building equipment includes using the degradation impact model to generate parameters of a resource consumption model for the building equipment as a function of the degradation state of the building equipment and using the resource consumption model to predict the amount of one or more input resources consumed by the building equipment to produce the one or more output resources as a function of the parameters of the resource consumption model.

In some embodiments, the degradation impact model is trained using historical or simulated training data prior to using the degradation impact model to predict the amount of the one or more input resources consumed by the building equipment. Training the degradation impact model may include generating training data for the degradation impact model, the training data comprising a plurality of different values of the degradation state of the building equipment and corresponding values of parameters of a resource consumption model for the building equipment, and using the training data to train the degradation impact model to predict the values of the parameters of the resource consumption model as a function of the degradation state.

In some embodiments, generating the training data includes performing a regression process to generate the values of the parameters of the resource consumption model using data associated with a first degradation state of the building equipment and repeating the regression process using data associated with one or more additional degradation states of the building equipment to generate a plurality of different values of the parameters of the resource consumption model, the plurality of different values of the parameters corresponding to a plurality of different degradation states of the building equipment.

In some embodiments, the degradation impact model includes a neural network model and using the degradation impact model to predict the amount of the one or more input resources consumed by the building equipment includes providing the degradation state of the building equipment and an amount of the one or more output resources to be produced by the building equipment as inputs to the neural network model and obtaining the amount of one or more input resources consumed by the building equipment as an output of the neural network model.

In some embodiments, generating the maintenance schedule for the building equipment includes performing an optimization of an objective function that accounts for both a cost of operating the building equipment and a cost of performing maintenance on the building equipment over a time period and generating a set of maintenance decisions for the building equipment as a result of performing the optimization, the set of maintenance decisions forming the maintenance schedule.

In some embodiments, generating the maintenance schedule for the building equipment includes calculating a cost of operating the building equipment over a time period as a function of the degradation state of the building equipment at one or more times within the time period, calculating a cost of performing maintenance on the building equipment over the time period as a function of one or more maintenance activities defined by the maintenance schedule, adjusting the degradation state of the building equipment at one or more times following the one or more maintenance activities defined by the maintenance schedule, and generating the maintenance schedule that results in a lowest total cost comprising the cost of operating the building equipment over the time period and the cost of performing maintenance on the building equipment over the time period.

In some embodiments, the degradation state of the building equipment is an initial degradation state. The method may further include predicting one or more future degradation states of the building equipment as a function of the initial degradation state and using the degradation impact model to predict the amount of the one or more input resources consumed by the building equipment at one or more future times as a function of the one or more future degradation states.

Another implementation of the present disclosure is a model predictive maintenance (MPM) system for building equipment. The MPM system includes one or more processing circuits having one or more processors and memory. The memory store instructions that, when executed by the one or more processors, cause the one or more processors to perform operations including using a degradation impact model to generate parameters of a resource consumption model for the building equipment based on a degradation state of the building equipment, using the resource consumption model to generate a maintenance schedule for the building equipment that results in a lowest total cost of operating the building equipment and performing maintenance on the building equipment over a time period, and initiating a maintenance activity for the building equipment in accordance with the maintenance schedule.

In some embodiments, using the resource consumption model to generate the maintenance schedule includes using the resource consumption model to predict an amount of one or more input resources consumed by the building equipment to produce one or more output resources as a function of the parameters of the resource consumption model and generating the maintenance schedule based on the amount of the one or more input resources consumed by the building equipment to produce the one or more output resources.

In some embodiments, the degradation impact model is trained using historical or simulated training data prior to using the degradation impact model to generate the parameters of the resource consumption model. Training the degradation impact model may include generating training data for the degradation impact model, the training data comprising a plurality of different values of the degradation state of the building equipment and corresponding values of the parameters of the resource consumption model, and using the training data to train the degradation impact model to predict the values of the parameters of the resource consumption model as a function of the degradation state.

In some embodiments, generating the training data includes performing a regression process to generate the values of the parameters of the resource consumption model using data associated with a first degradation state of the building equipment and repeating the regression process using data associated with one or more additional degradation states of the building equipment to generate a plurality of different values of the parameters of the resource consumption model, the plurality of different values of the parameters corresponding to a plurality of different degradation states of the building equipment.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Referring generally to the FIGURES, systems and methods for performing model predictive maintenance (MPM) are shown, according to some embodiments. MPM can be performed for building equipment of a building to determine a maintenance and replacement strategy for the building equipment.

In order to optimize the scheduling of maintenance it is necessary to understand how degradation effects the performance of equipment. The mapping between degradation and performance can be nonlinear and have no known model form that would lend itself well to gray-box modeling. The systems and methods described herein provide a model that maps equipment degradation to operating performance using artificial intelligence (AI). Operating performance can be characterized by a model that relates the amount of resources consumed by the equipment (e.g., electricity, water, natural gas, etc.) to the amount of output resources produced by the equipment (e.g., hot water, cold water, heating load, cooling load, etc.) at a given time. Such a model can be characterized by a vector of model coefficients or parameters. The coefficients or parameters of the model may change as the equipment degrades. Accordingly, examining the relationship between degradation and model coefficients may allow for a mapping to be generated therebetween.

One example of a system in which the systems and methods of the present disclosure can be implemented is a variable refrigerant flow (VRF) system that consumes electric power to serve a heating or cooling load. A power consumption model can be used to relate the amount of power consumed by the VRF equipment to the amount of heating or cooling produced by the VRF equipment. An artificial neural network model is trained to predict values of coefficients of the power consumption model as a function of degradation state. To generate training data for the neural network model, both the degradation state and the power consumption can be estimated by the measurements collected from the VRF system. Once the neural network has been trained, the neural network can be used to predict power model coefficients as a function of the current degradation state. The power model coefficients are then used to predict the power consumption of the equipment during operation.

The predicted power consumption (or other resource consumption) can be used to perform a model predictive maintenance process to determine an optimal set of operating decisions and maintenance decisions for the equipment over a given time period. These and other features of the model predictive maintenance system are described in detail below.

Building HVAC Systems and Building Management Systems

Figure 1:
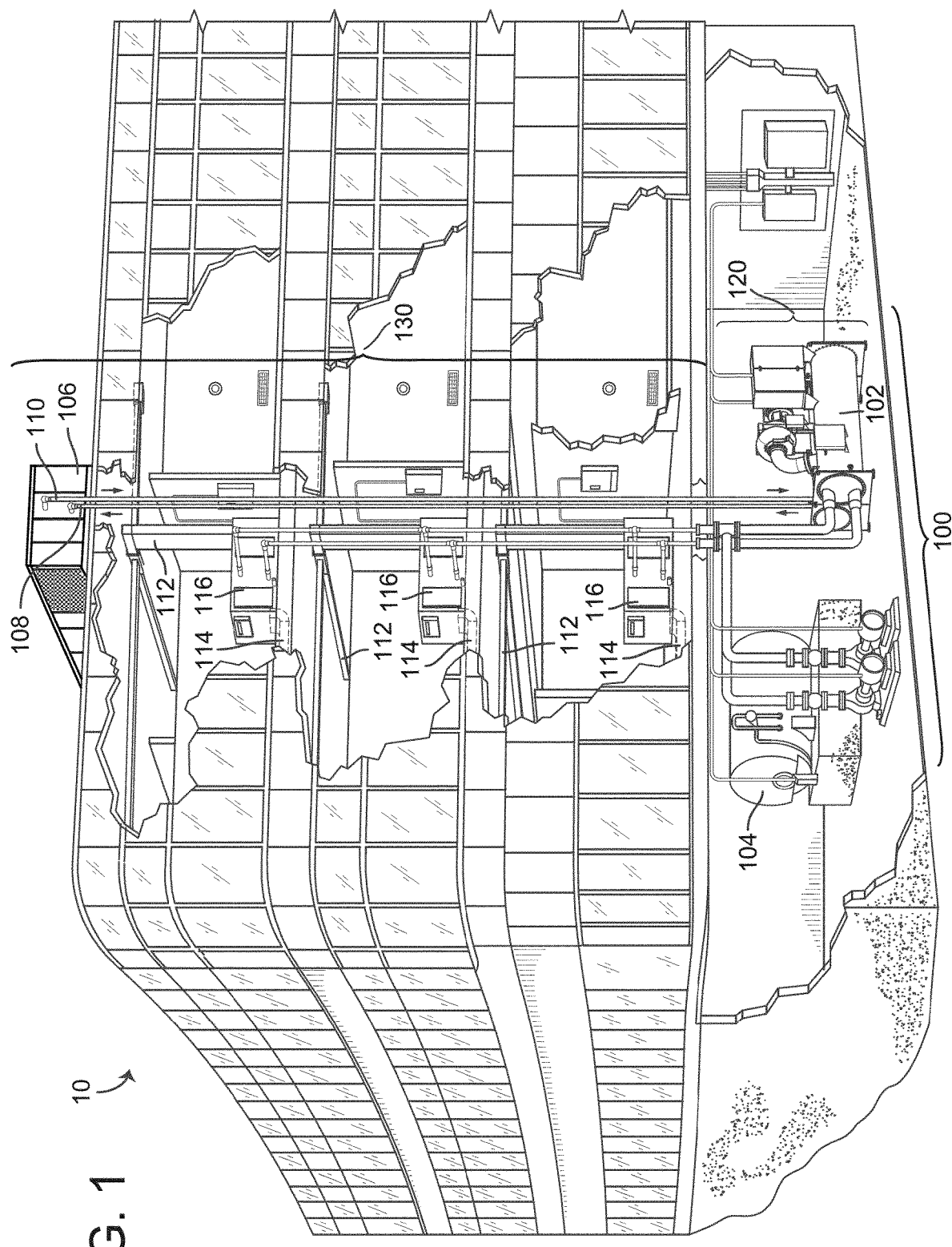
FIG. 1 is an illustration of a building equipped with a HVAC system, according some embodiments.
Figure 2:
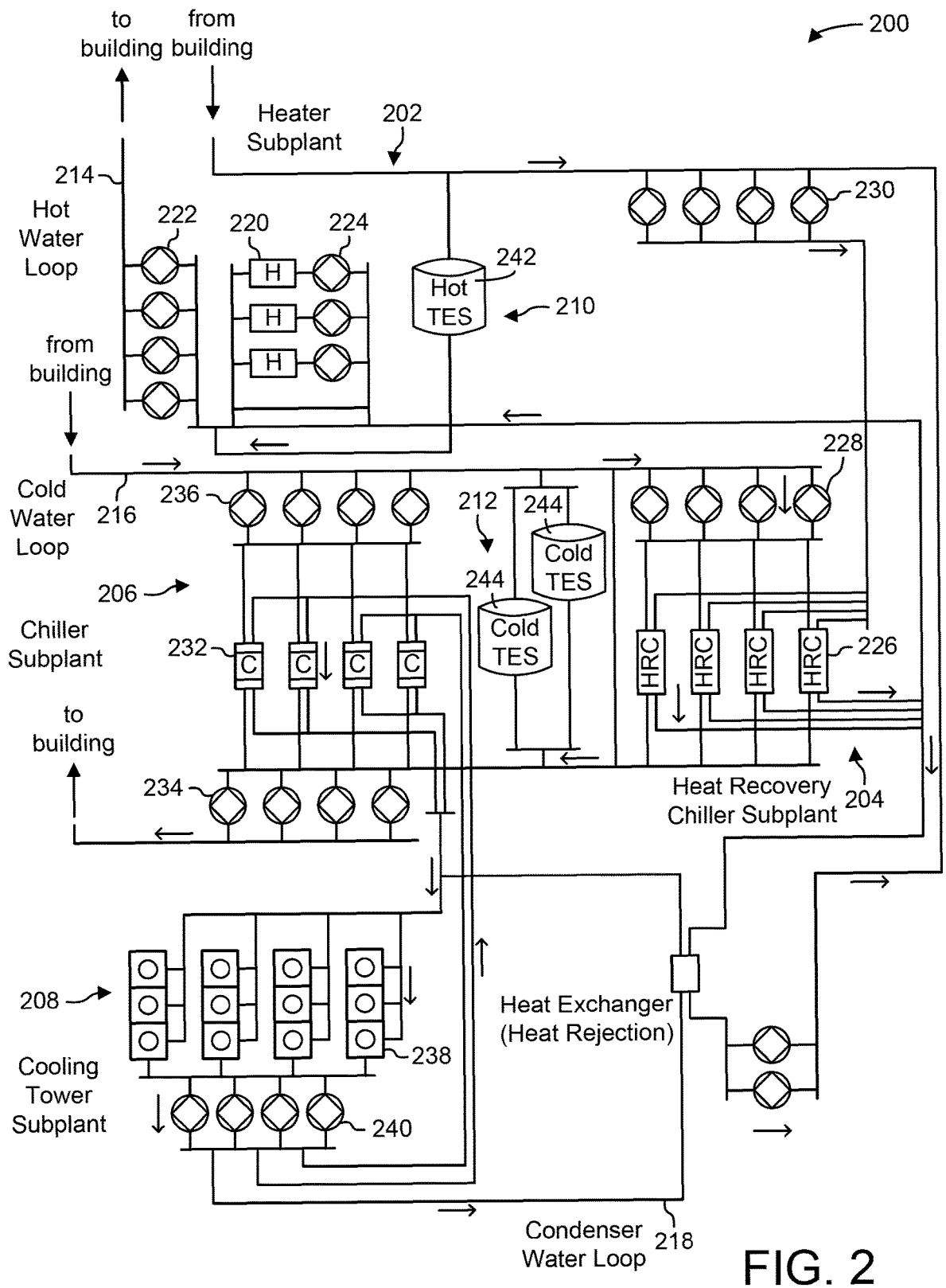
FIG. 2 is a block diagram of a waterside system that may be used in conjunction with the building of FIG. 1, according to some embodiments.
Figure 3:
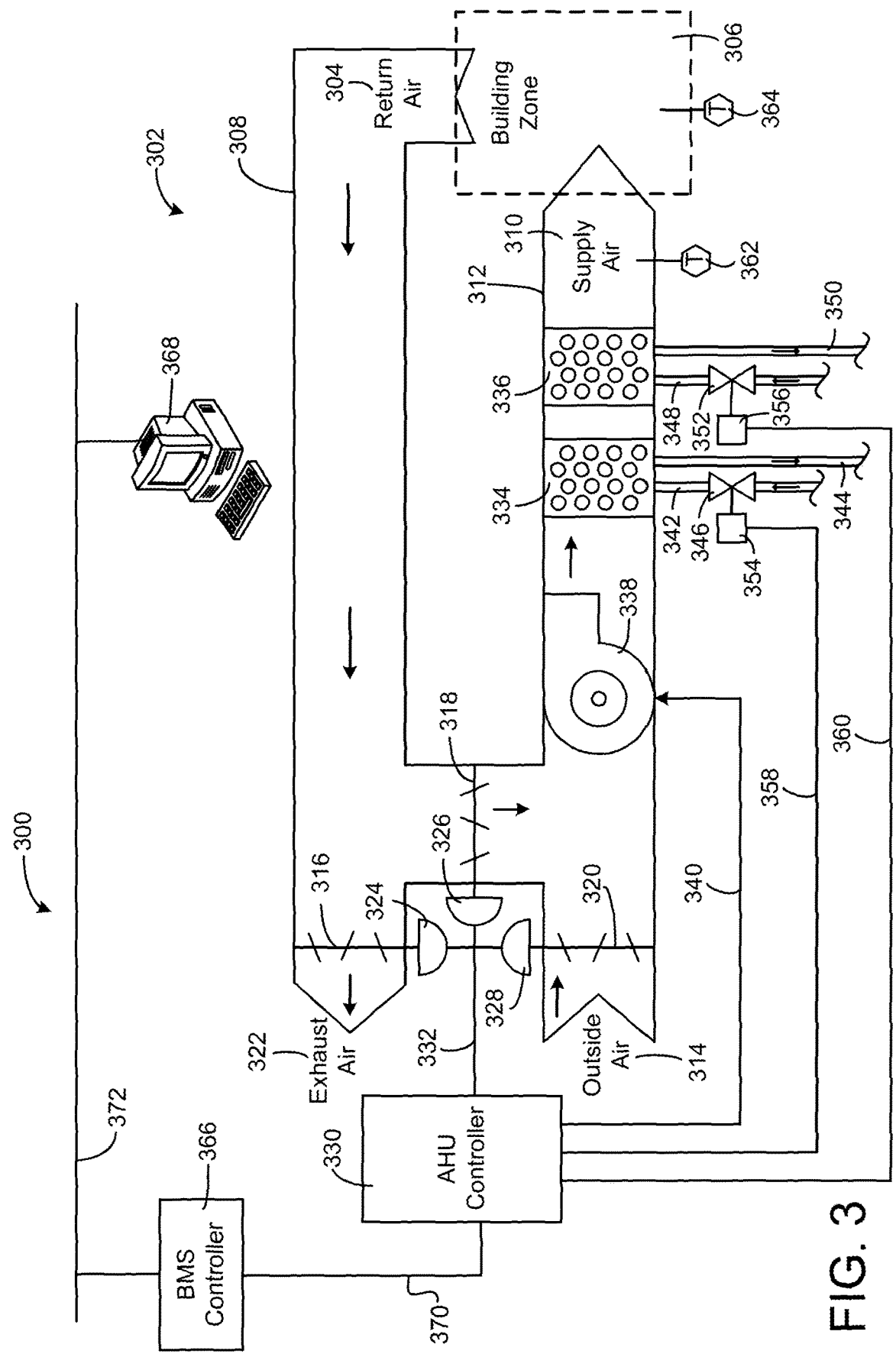
FIG. 3 is a block diagram of an airside system that may be used in conjunction with the building of FIG. 1, according to some embodiments.
Figure 4:
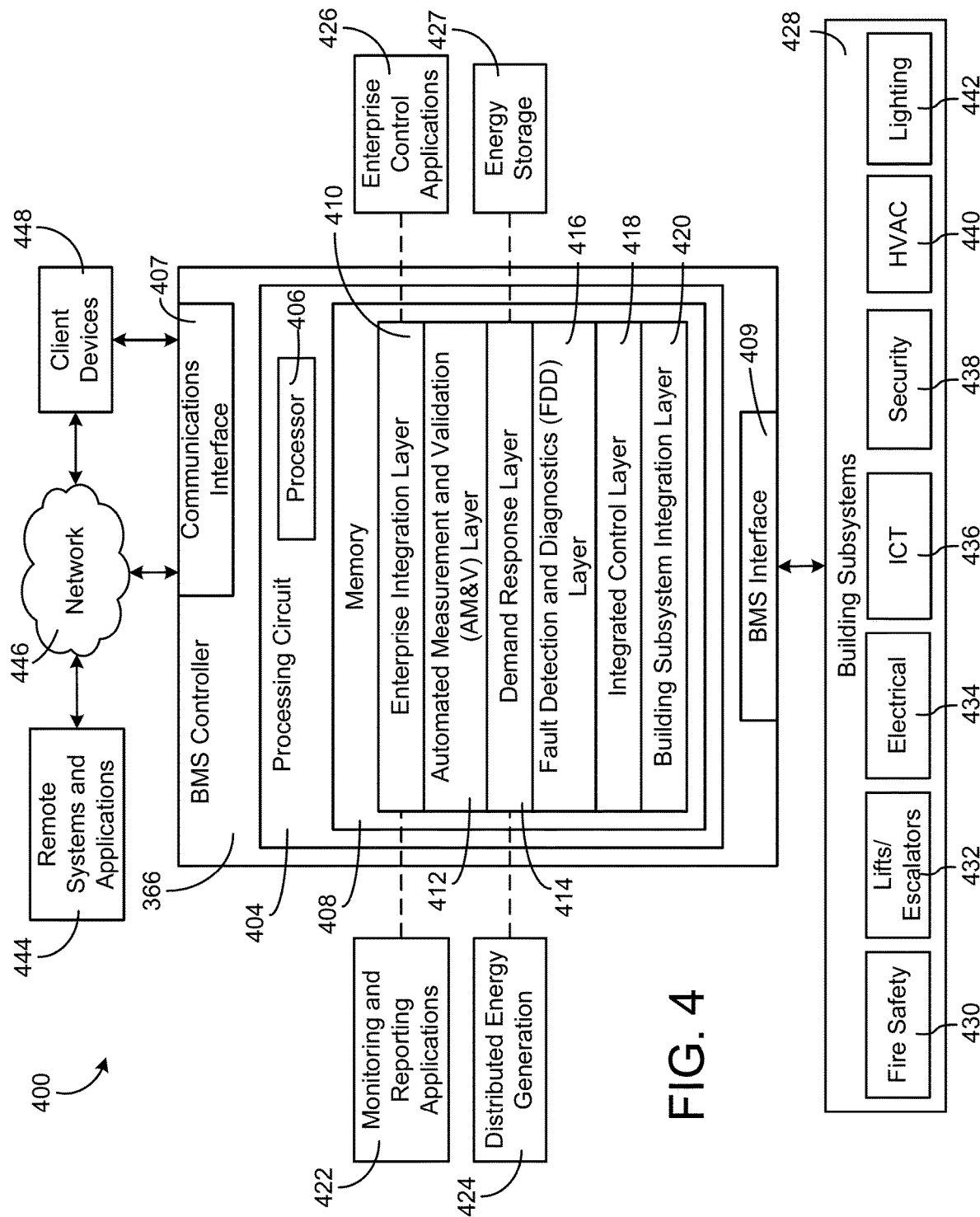
FIG. 4 is a block diagram of a building management system (BMS) which can be used to monitor and control the building of FIG. 1, according to some embodiments.
Figure 5:
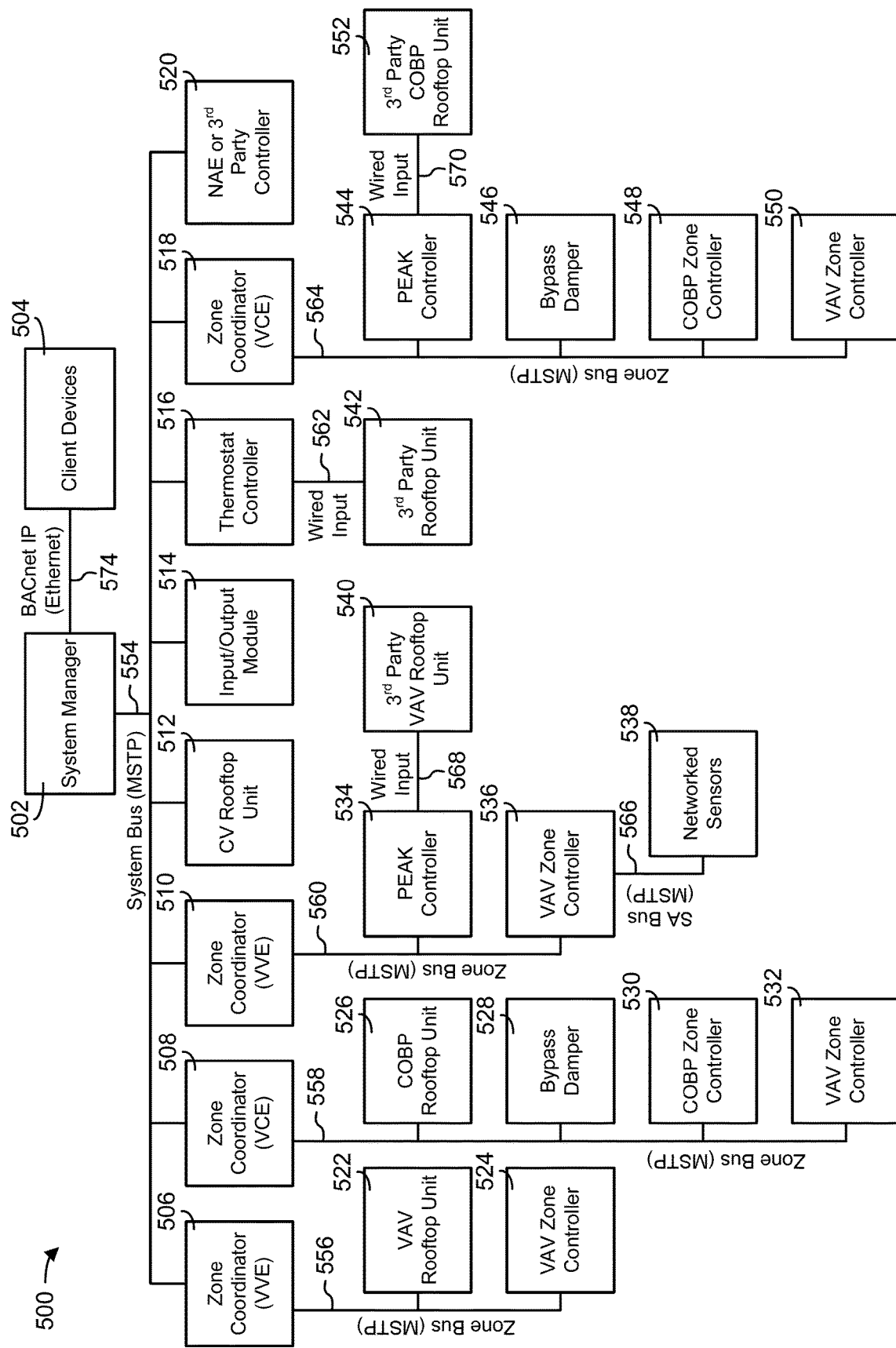
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Model Predictive Maintenance System

Figure 6:
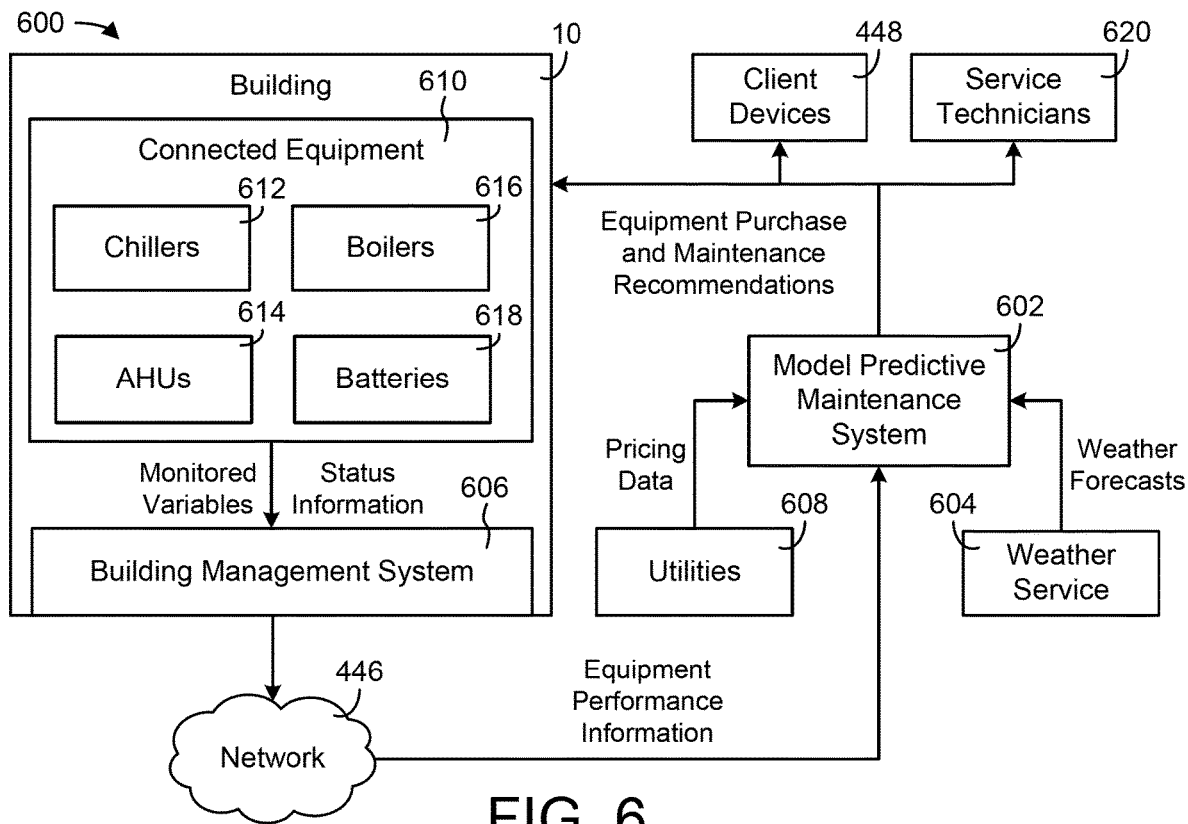
FIG. 6 is a block diagram of a building system including a model predictive maintenance (MPM) system that monitors equipment performance information from connected equipment installed in the building, according to some embodiments.

Referring now to FIG. 6, a block diagram of a building system 600 is shown, according to an exemplary embodiment. System 600 may include many of the same components as BMS 400 and BMS 500 as described with reference to FIGS. 4-5. For example, system 600 is shown to include building 10, network 446, and client devices 448. Building 10 is shown to include connected equipment 610, which can include any type of equipment used to monitor and/or control building 10. Connected equipment 610 can include connected chillers 612, connected AHUs 614, connected boilers 616, connected batteries 618, or any other type of equipment in a building system (e.g., heaters, economizers, valves, actuators, dampers, cooling towers, fans, pumps, etc.) or building management system (e.g., lighting equipment, security equipment, refrigeration equipment, etc.). Connected equipment 610 can include any of the equipment of HVAC system 100, waterside system 200, airside system 300, BMS 400, and/or BMS 500, as described with reference to FIGS. 1-5.

Figure 7:
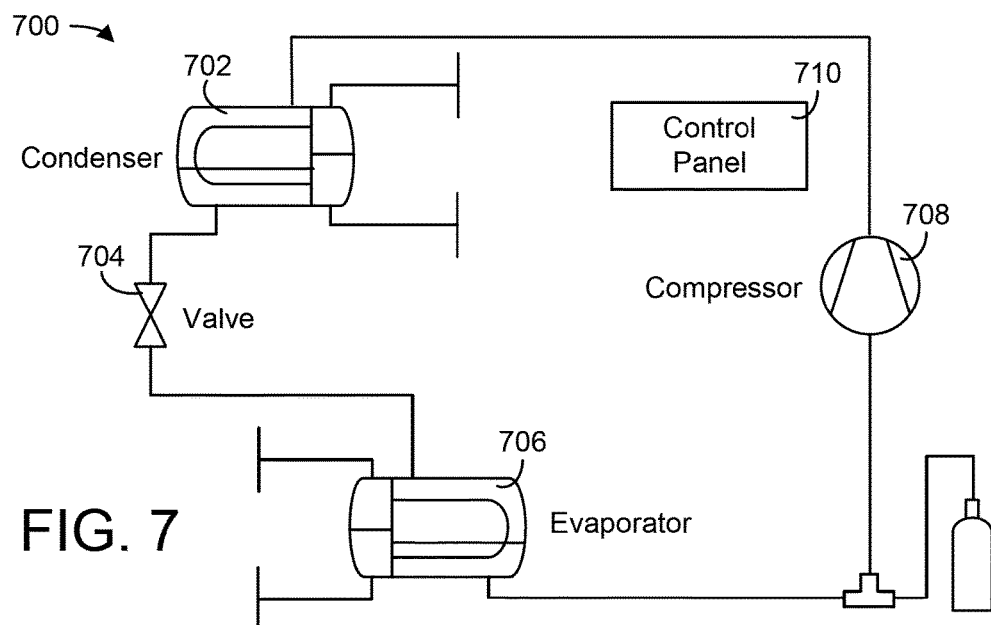
FIG. 7 is a schematic diagram of a chiller which may be a type of connected equipment that provides equipment performance information to the MPM system of FIG. 6, according to some embodiments.

Connected equipment 610 can be outfitted with sensors to monitor various conditions of the connected equipment 610 (e.g., power consumption, on/off states, operating efficiency, etc.). For example, chillers 612 can include sensors configured to monitor chiller variables such as chilled water temperature, condensing water temperature, and refrigerant properties (e.g., refrigerant pressure, refrigerant temperature, etc.) at various locations in the refrigeration circuit. An example of a chiller 700 which can be used as one of chillers 612 is shown in FIG. 7. Chiller 700 is shown to include a refrigeration circuit having a condenser 702, an expansion valve 704, an evaporator 706, a compressor 708, and a control panel 710. In some embodiments, chiller 700 includes sensors that measure a set of monitored variables at various locations along the refrigeration circuit. Similarly, AHUs 614 can be outfitted with sensors to monitor AHU variables such as supply air temperature and humidity, outside air temperature and humidity, return air temperature and humidity, chilled fluid temperature, heated fluid temperature, damper position, etc. In general, connected equipment 610 can monitor and report variables that characterize the performance of the connected equipment 610. Each monitored variable can be forwarded to building management system 606 as a data point including a point ID and a point value.

Monitored variables can include any measured or calculated values indicating the performance of connected equipment 610 and/or the components thereof. For example, monitored variables can include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, model parameters (e.g., regression model coefficients), or any other time-series values that provide information about how the corresponding system, device, or process is performing. Monitored variables can be received from connected equipment 610 and/or from various components thereof. For example, monitored variables can be received from one or more controllers (e.g., BMS controllers, subsystem controllers, HVAC controllers, subplant controllers, AHU controllers, device controllers, etc.), BMS devices (e.g., chillers, cooling towers, pumps, heating elements, etc.), or collections of BMS devices.

Connected equipment 610 can also report equipment status information. Equipment status information can include, for example, the operational status of the equipment, an operating mode (e.g., low load, medium load, high load, etc.), an indication of whether the equipment is running under normal or abnormal conditions, the hours during which the equipment is running, a safety fault code, or any other information that indicates the current status of connected equipment 610. In some embodiments, each device of connected equipment 610 includes a control panel (e.g., control panel 710 shown in FIG. 7). Control panel 710 can be configured to collect monitored variables and equipment status information from connected equipment 610 and provide the collected data to BMS 606. For example, control panel 710 can compare the sensor data (or a value derived from the sensor data) to predetermined thresholds. If the sensor data or calculated value crosses a safety threshold, control panel 710 can shut down the device. Control panel 710 can generate a data point when a safety shut down occurs. The data point can include a safety fault code which indicates the reason or condition that triggered the shutdown.

Connected equipment 610 can provide monitored variables and equipment status information to BMS 606. BMS 606 can include a building controller (e.g., BMS controller 366), a system manager (e.g., system manager 503), a network automation engine (e.g., NAE 520), or any other system or device of building 10 configured to communicate with connected equipment 610. BMS 606 may include some or all of the components of BMS 400 or BMS 500, as described with reference to FIGS. 4-5. In some embodiments, the monitored variables and the equipment status information are provided to BMS 606 as data points. Each data point can include a point ID and a point value. The point ID can identify the type of data point or a variable measured by the data point (e.g., condenser pressure, refrigerant temperature, power consumption, etc.). Monitored variables can be identified by name or by an alphanumeric code (e.g., Chilled_Water_Temp, 7694, etc.). The point value can include an alphanumeric value indicating the current value of the data point.

BMS 606 can broadcast the monitored variables and the equipment status information to a model predictive maintenance system 602. In some embodiments, model predictive maintenance system 602 is a component of BMS 606. For example, model predictive maintenance system 602 can be implemented as part of a METASYS® brand building automation system, as sold by Johnson Controls Inc. In other embodiments, model predictive maintenance system 602 can be a component of a remote computing system or cloud-based computing system configured to receive and process data from one or more building management systems via network 446. For example, model predictive maintenance system 602 can be implemented as part of a PANOPTIX® brand building efficiency platform, as sold by Johnson Controls Inc. In other embodiments, model predictive maintenance system 602 can be a component of a subsystem level controller (e.g., a HVAC controller), a subplant controller, a device controller (e.g., AHU controller 330, a chiller controller, etc.), a field controller, a computer workstation, a client device, or any other system or device that receives and processes monitored variables from connected equipment 610.

Model predictive maintenance (MPM) system 602 may use the monitored variables and/or the equipment status information to identify a current operating state of connected equipment 610. The current operating state can be examined by MPM system 602 to expose when connected equipment 610 begins to degrade in performance and/or to predict when faults will occur. In some embodiments, MPM system 602 uses the information collected from connected equipment 610 to estimate the reliability of connected equipment 610. For example, MPM system 602 can estimate a likelihood of various types of failures that could potentially occur based on the current operating conditions of connected equipment 610 and an amount of time that has elapsed since connected equipment 610 has been installed and/or since maintenance was last performed. In some embodiments, MPM system 602 estimates an amount of time until each failure is predicted to occur and identifies a financial cost associated with each failure (e.g., maintenance cost, increased operating cost, replacement cost, etc.). MPM system 602 can use the reliability information and the likelihood of potential failures to predict when maintenance will be needed and to estimate the cost of performing such maintenance over a predetermined time period.

MPM system 602 can be configured to determine an optimal maintenance strategy for connected equipment 610. In some embodiments, the optimal maintenance strategy is a set of decisions which optimizes the total cost associated with purchasing, maintaining, and operating connected equipment 610 over the duration of an optimization period (e.g., 30 weeks, 52 weeks, 10 years, 30 years, etc.). The decisions can include, for example, equipment purchase decisions, equipment maintenance decisions, and equipment operating decisions. MPM system 602 can use a model predictive control technique to formulate an objective function which expresses the total cost as a function of these decisions, which can be included as decision variables in the objective function. MPM system 602 can optimize (i.e., minimize) the objective function using any of a variety of optimization techniques to identify the optimal values for each of the decision variables.

One example of an objective function which can be optimized by MPM system 602 is shown in the following equation:

$$J = \sum_{i=1}^{h} C_{op,i} P_{op,i} \Delta t + \sum_{i=1}^{h} C_{main,i} B_{main,i} + \sum_{i=1}^{h} C_{cap,i} P_{cap,i}$$

where $C_{op,i}$ is the cost per unit of energy (e.g., $/kWh) consumed by connected equipment 610 at time step i of the optimization period, $P_{op,i}$ is the power consumption (e.g., kW) of connected equipment 610 at time step i, $\Delta t$ is the duration of each time step i, $C_{main,i}$ is the cost of maintenance performed on connected equipment 610 at time step i, $B_{main,i}$ is a binary variable that indicates whether the maintenance is performed, $C_{cap,i}$ is the capital cost of purchasing a new device of connected equipment 610 at time step i, $B_{cap,i}$ is a binary variable that indicates whether the new device is purchased, and h is the duration of the horizon or optimization period over which the optimization is performed.

The first term in the objective function J represents the operating cost of connected equipment 610 over the duration of the optimization period. In some embodiments, the cost per unit of energy $C_{op,i}$ is received from a utility 608 as energy pricing data. The cost $C_{op,i}$ may be a time-varying cost that depends on the time of day, the day of the week (e.g., weekday vs. weekend), the current season (e.g., summer vs. winter), or other time-based factors. For example, the cost $C_{op,i}$ may be higher during peak energy consumption periods and lower during off-peak or partial-peak energy consumption periods.

In some embodiments, the power consumption $P_{op,i}$ is based on the heating or cooling load of building 10. The heating or cooling load can be predicted by MPM system 602 as a function of building occupancy, the time of day, the day of the week, the current season, or other factors that can affect the heating or cooling load. In some embodiments, MPM system 602 uses weather forecasts from a weather service 604 to predict the heating or cooling load. The power consumption $P_{op,i}$ may also depend on the efficiency $\eta_i$ of connected equipment 610. For example, connected equipment 610 that operate at a high efficiency may consume less power $P_{op,i}$ to satisfy the same heating or cooling load relative to connected equipment 610 that operate at a low efficiency. In general, the power consumption $P_{op,i}$ of a particular device of connected equipment 610 can be modeled using the following equations:

$$P_{op,i} = \frac{P_{ideal,i}}{\eta_i}$$

$$P_{ideal,i} = f(\text{Load}_i)$$

where $Load_i$ is the heating or cooling load on the device at time step i (e.g., tons cooling, kW heating, etc.), $P_{ideal,i}$ is the value of the equipment performance curve (e.g., tons cooling, kW heating, etc.) for the device at the corresponding load point $Load_i$, and $\eta_i$ is the operating efficiency of the device at time step i (e.g., $0 \leq \eta_i \leq 1$). The function $f(Load_i)$ may be defined by the equipment performance curve for the device or set of devices represented by the performance curve.

In some embodiments, the equipment performance curve is based on manufacturer specifications for the device under ideal operating conditions. For example, the equipment performance curve may define the relationship between power consumption and heating/cooling load for each device of connected equipment 610. However, the actual performance of the device may vary as a function of the actual operating conditions. MPM system 602 can analyze the equipment performance information provided by connected equipment 610 to determine the operating efficiency $\eta_i$ for each device of connected equipment 610. In some embodiments, MPM system 602 uses the equipment performance information from connected equipment 610 to determine the actual operating efficiency $\eta_i$ for each device of connected equipment 610. MPM system 602 can use the operating efficiency $\eta_i$ as an input to the objective function J and/or to calculate the corresponding value of $P_{op,i}$.

Advantageously, MPM system 602 can model the efficiency $\eta_i$ of connected equipment 610 at each time step i as a function of the maintenance decisions $B_{main,i}$ and the equipment purchase decisions $B_{cap,i}$. For example, the efficiency $\eta_i$ for a particular device may start at an initial value $\eta_0$ when the device is purchased and may degrade over time such that the efficiency $\eta_i$ decreases with each successive time step i. Performing maintenance on a device may reset the efficiency $\eta_i$ to a higher value immediately after the maintenance is performed. Similarly, purchasing a new device to replace an existing device may reset the efficiency $\eta_i$ to a higher value immediately after the new device is purchased. After being reset, the efficiency $\eta_i$ may continue to degrade over time until the next time at which maintenance is performed or a new device is purchased.

Performing maintenance or purchasing a new device may result in a relatively lower power consumption $P_{op,i}$ during operation and therefore a lower operating cost at each time step i after the maintenance is performed or the new device is purchased. In other words, performing maintenance or purchasing a new device may decrease the operating cost represented by the first term of the objective function J. However, performing maintenance may increase the second term of the objective function J and purchasing a new device may increase the third term of the objective function J. The objective function J captures each of these costs and can be optimized by MPM system 602 to determine the optimal set of maintenance and equipment purchase decisions (i.e., optimal values for the binary decision variables $B_{main,i}$ and $B_{cap,i}$) over the duration of the optimization period.

In some embodiments, MPM system 602 uses the equipment performance information from connected equipment 610 to estimate the reliability of connected equipment 610. The reliability may be a statistical measure of the likelihood that connected equipment 610 will continue operating without fault under its current operating conditions. Operating under more strenuous conditions (e.g., high load, high temperatures, etc.) may result in a lower reliability, whereas operating under less strenuous conditions (e.g., low load, moderate temperatures, etc.) may result in a higher reliability. In some embodiments, the reliability is based on an amount of time that has elapsed since connected equipment 610 last received maintenance.

MPM system 602 may receive operating data from a plurality of devices of connected equipment 610 distributed across multiple buildings and can use the set of operating data (e.g., operating conditions, fault indications, failure times, etc.) to develop a reliability model for each type of equipment. The reliability models can be used by MPM system 602 to estimate the reliability of any given device of connected equipment 610 as a function of its current operating conditions and/or other extraneous factors (e.g., time since maintenance was last performed, geographic location, water quality, etc.). In some embodiments, MPM system 602 uses the estimated reliability of each device of connected equipment 610 to determine the probability that the device will require maintenance and/or replacement at each time step of the optimization period. MPM system 602 can use these probabilities to determine the optimal set of maintenance and equipment purchase decisions (i.e., optimal values for the binary decision variables $B_{main,i}$ and $B_{cap,i}$) over the duration of the optimization period.

In some embodiments, MPM system 602 generates and provides equipment purchase and maintenance recommendations. The equipment purchase and maintenance recommendations may be based on the optimal values for the binary decision variables $B_{main,i}$ and $B_{cap,i}$ determined by optimizing the objective function J. For example, a value of $B_{main,25}=1$ for a particular device of connected equipment 610 may indicate that maintenance should be performed on that device at the $25^{th}$ time step of the optimization period, whereas a value of $B_{main,25}=0$ may indicate that the maintenance should not be performed at that time step. Similarly, a value of $B_{cap,25}=1$ may indicate that a new device of connected equipment 610 should be purchased at the $25^{th}$ time step of the optimization period, whereas a value of $B_{cap,25}=0$ may indicate that the new device should not be purchased at that time step.

Advantageously, the equipment purchase and maintenance recommendations generated by MPM system 602 are predictive recommendations based on the actual operating conditions and actual performance of connected equipment 610. The optimization performed by MPM system 602 weighs the cost of performing maintenance and the cost of purchasing new equipment against the decrease in operating cost resulting from such maintenance or purchase decisions in order to determine the optimal maintenance strategy that minimizes the total combined cost J. In this way, the equipment purchase and maintenance recommendations generated by MPM system 602 may be specific to each group of connected equipment 610 in order to achieve the optimal cost J for that specific group of connected equipment 610. The equipment-specific recommendations may result in a lower overall cost J relative to generic preventive maintenance recommendations provided by an equipment manufacturer (e.g., service equipment every year) which may be suboptimal for some groups of connected equipment 610 and/or some operating conditions.

In some embodiments, the equipment purchase and maintenance recommendations are provided to building 10 (e.g., to BMS 606) and/or to client devices 448. An operator or building owner can use the equipment purchase and maintenance recommendations to assess the costs and benefits of performing maintenance and purchasing new devices. In some embodiments, the equipment purchase and maintenance recommendations are provided to service technicians 620. Service technicians 620 can use the equipment purchase and maintenance recommendations to determine when customers should be contacted to perform service or replace equipment.

In some embodiments, MPM system 602 includes a data analytics and visualization platform. MPM system 602 may provide a web interface which can be accessed by service technicians 620, client devices 448, and other systems or devices. The web interface can be used to access the equipment performance information, view the results of the optimization, identify which equipment is in need of maintenance, and otherwise interact with MPM system 602. Service technicians 620 can access the web interface to view a list of equipment for which maintenance is recommended by MPM system 602. Service technicians 620 can use the equipment purchase and maintenance recommendations to proactively repair or replace connected equipment 610 in order to achieve the optimal cost predicted by the objective function J. These and other features of MPM system 602 are described in greater detail below.

Figure 8:
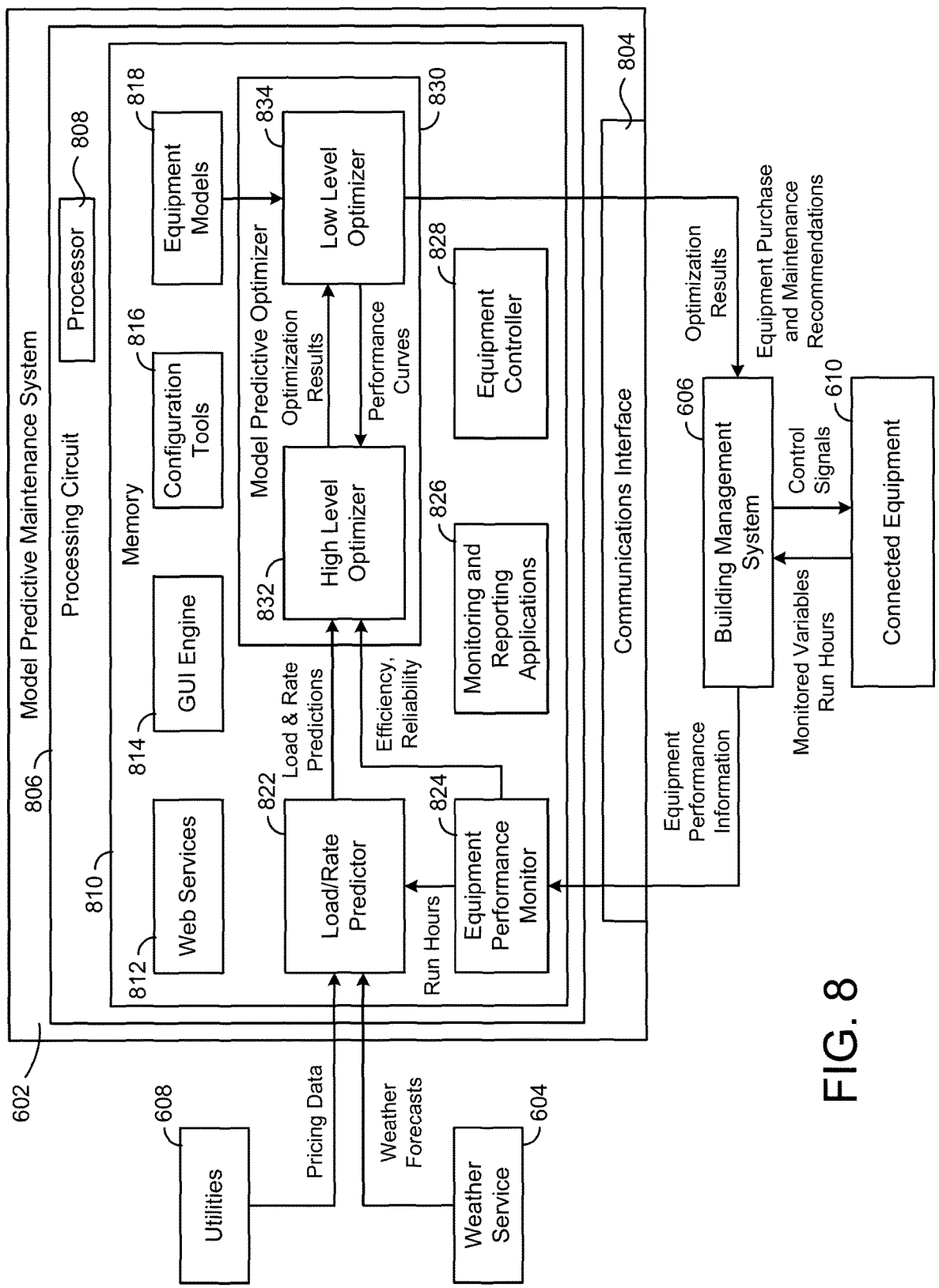
FIG. 8 is a block diagram illustrating the MPM system of FIG. 6 in greater detail, according to some embodiments.

Referring now to FIG. 8, a block diagram illustrating MPM system 602 in greater detail is shown, according to an exemplary embodiment. MPM system 602 is shown providing optimization results to a building management system (BMS) 606. BMS 606 can include some or all of the features of BMS 400 and/or BMS 500, as described with reference to FIGS. 4-5. The optimization results provided to BMS 606 may include the optimal values of the decision variables in the objective function J for each time step i in the optimization period. In some embodiments, the optimization results include equipment purchase and maintenance recommendations for each device of connected equipment 610.

BMS 606 may be configured to monitor the operation and performance of connected equipment 610. BMS 606 may receive monitored variables from connected equipment 610. Monitored variables can include any measured or calculated values indicating the performance of connected equipment 610 and/or the components thereof. For example, monitored variables can include one or more measured or calculated temperatures, pressures, flow rates, valve positions, resource consumptions (e.g., power consumption, water consumption, electricity consumption, etc.), control setpoints, model parameters (e.g., equipment model coefficients), or any other variables that provide information about how the corresponding system, device, or process is performing.

In some embodiments, the monitored variables indicate the operating efficiency $\eta_i$ of each device of connected equipment 610 or can be used to calculate the operating efficiency $\eta_i$. For example, the temperature and flow rate of chilled water output by a chiller can be used to calculate the cooling load (e.g., tons cooling) served by the chiller. The cooling load can be used in combination with the power consumption of the chiller to calculate the operating efficiency $\eta_i$ (e.g., tons cooling per kW of electricity consumed). BMS 606 may report the monitored variables to MPM system 602 for use in calculating the operating efficiency $\eta_i$ of each device of connected equipment 610.

In some embodiments, BMS 606 monitors the run hours of connected equipment 610. The run hours may indicate the number of hours within a given time period during which each device of connected equipment 610 is active. For example, the run hours for a chiller may indicate that the chiller is active for approximately eight hours per day. The run hours can be used in combination with the average power consumption of the chiller when active to estimate the total power consumption $P_{op,i}$ of connected equipment 610 at each time step i.

In some embodiments, BMS 606 monitors the equipment failures and fault indications reported by connected equipment 610. BMS 606 can record the times at which each failure or fault occurs and the operating conditions of connected equipment 610 under which the fault or failure occurred. The operating data collected from connected equipment 610 can be used by BMS 606 and/or MPM system 602 to develop a reliability model for each device of connected equipment 610. BMS 606 may provide the monitored variables, the equipment run hours, the operating conditions, and the equipment failures and fault indications to MPM system 602 as equipment performance information.

BMS 606 may be configured to monitor conditions within a controlled building or building zone. For example, BMS 606 may receive input from various sensors (e.g., temperature sensors, humidity sensors, airflow sensors, voltage sensors, etc.) distributed throughout the building and may report building conditions to MPM system 602. Building conditions may include, for example, a temperature of the building or a zone of the building, a power consumption (e.g., electric load) of the building, a state of one or more actuators configured to affect a controlled state within the building, or other types of information relating to the controlled building. BMS 606 may operate connected equipment 610 to affect the monitored conditions within the building and to serve the thermal energy loads of the building.

BMS 606 may provide control signals to connected equipment 610 specifying on/off states, charge/discharge rates, and/or setpoints for connected equipment 610. BMS 606 may control the equipment (e.g., via actuators, power relays, etc.) in accordance with the control signals to achieve setpoints for various building zones and/or devices of connected equipment 610. In various embodiments, BMS 606 may be combined with MPM system 602 or may be part of a separate building management system. According to an exemplary embodiment, BMS 606 is a METASYS® brand building management system, as sold by Johnson Controls, Inc.

MPM system 602 may monitor the performance of connected equipment 610 using information received from BMS 606. MPM system 602 may be configured to predict the thermal energy loads (e.g., heating loads, cooling loads, etc.) of the building for plurality of time steps in the optimization period (e.g., using weather forecasts from a weather service 604). MPM system 602 may also predict the cost of electricity or other resources (e.g., water, natural gas, etc.) using pricing data received from utilities 608. MPM system 602 may generate optimization results that optimize the economic value of operating, maintaining, and purchasing connected equipment 610 over the duration of the optimization period subject to constraints on the optimization process (e.g., load constraints, decision variable constraints, etc.). The optimization process performed by MPM system 602 is described in greater detail below.

According to an exemplary embodiment, MPM system 602 can be integrated within a single computer (e.g., one server, one housing, etc.). In various other exemplary embodiments, MPM system 602 can be distributed across multiple servers or computers (e.g., that can exist in distributed locations). In another exemplary embodiment, MPM system 602 may integrated with a smart building manager that manages multiple building systems and/or combined with BMS 606.

MPM system 602 is shown to include a communications interface 804 and a processing circuit 806. Communications interface 804 may include wired or wireless interfaces (e.g., jacks, antennas, transmitters, receivers, transceivers, wire terminals, etc.) for conducting data communications with various systems, devices, or networks. For example, communications interface 804 may include an Ethernet card and port for sending and receiving data via an Ethernet-based communications network and/or a WiFi transceiver for communicating via a wireless communications network. Communications interface 804 may be configured to communicate via local area networks or wide area networks (e.g., the Internet, a building WAN, etc.) and may use a variety of communications protocols (e.g., BACnet, IP, LON, etc.).

Communications interface 804 may be a network interface configured to facilitate electronic data communications between MPM system 602 and various external systems or devices (e.g., BMS 606, connected equipment 610, utilities 510, etc.). For example, MPM system 602 may receive information from BMS 606 indicating one or more measured states of the controlled building (e.g., temperature, humidity, electric loads, etc.) and equipment performance information for connected equipment 610 (e.g., run hours, power consumption, operating efficiency, etc.). Communications interface 804 may receive inputs from BMS 606 and/or connected equipment 610 and may provide optimization results to BMS 606 and/or other external systems or devices. The optimization results may cause BMS 606 to activate, deactivate, or adjust a setpoint for connected equipment 610 in order to achieve the optimal values of the decision variables specified in the optimization results.

Still referring to FIG. 8, processing circuit 806 is shown to include a processor 808 and memory 810. Processor 808 may be a general purpose or specific purpose processor, an application specific integrated circuit (ASIC), one or more field programmable gate arrays (FPGAs), a group of processing components, or other suitable processing components. Processor 808 may be configured to execute computer code or instructions stored in memory 810 or received from other computer readable media (e.g., CDROM, network storage, a remote server, etc.).

Memory 810 may include one or more devices (e.g., memory units, memory devices, storage devices, etc.) for storing data and/or computer code for completing and/or facilitating the various processes described in the present disclosure. Memory 810 may include random access memory (RAM), read-only memory (ROM), hard drive storage, temporary storage, non-volatile memory, flash memory, optical memory, or any other suitable memory for storing software objects and/or computer instructions. Memory 810 may include database components, object code components, script components, or any other type of information structure for supporting the various activities and information structures described in the present disclosure. Memory 810 may be communicably connected to processor 808 via processing circuit 806 and may include computer code for executing (e.g., by processor 808) one or more processes described herein.

MPM system 602 is shown to include an equipment performance monitor 824. Equipment performance monitor 824 can receive equipment performance information from BMS 606 and/or connected equipment 610. The equipment performance information can include samples of monitored variables (e.g., measured temperature, measured pressure, measured flow rate, power consumption, etc.), current operating conditions (e.g., heating or cooling load, current operating state, etc.), fault indications, or other types of information that characterize the performance of connected equipment 610. In some embodiments, equipment performance monitor 824 uses the equipment performance information to calculate the current efficiency $\eta_i$ and reliability of each device of connected equipment 610. Equipment performance monitor 824 can provide the efficiency $\eta_i$ and reliability values to model predictive optimizer 830 for use in optimizing the objective function J.

Still referring to FIG. 8, MPM system 602 is shown to include a load/rate predictor 822. Load/rate predictor 822 may be configured to predict the energy loads (Load$_i$) (e.g., heating load, cooling load, electric load, etc.) of the building or campus for each time step i of the optimization period. Load/rate predictor 822 is shown receiving weather forecasts from a weather service 604. In some embodiments, load/rate predictor 822 predicts the energy loads Load$_i$ as a function of the weather forecasts. In some embodiments, load/rate predictor 822 uses feedback from BMS 606 to predict loads Load$_i$. Feedback from BMS 606 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 822 receives a measured electric load and/or previous measured load data from BMS 606 (e.g., via equipment performance monitor 824). Load/rate predictor 822 may predict loads Load$_i$ as a function of a given weather forecast ($\hat{\phi}_w$), a day type (day), the time of day (t), and previous measured load data ($Y_{i-1}$). Such a relationship is expressed in the following equation:

$$\text{Load}_i = f(\hat{\phi}_w, \text{day}, t | Y_{i-1})$$

In some embodiments, load/rate predictor 822 uses a deterministic plus stochastic model trained from historical load data to predict loads Load$_i$. Load/rate predictor 822 may use any of a variety of prediction methods to predict loads Load$_i$ (e.g., linear regression for the deterministic portion and an AR model for the stochastic portion). Load/rate predictor 822 may predict one or more different types of loads for the building or campus. For example, load/rate predictor 822 may predict a hot water load Load$_{Hot,i}$ a cold water load Load$_{Cold,i}$, and an electric load Load$_{Elec,i}$ for each time step i within the optimization period. The predicted load values Load$_i$ can include some or all of these types of loads. In some embodiments, load/rate predictor 822 makes load/rate predictions using the techniques described in U.S. patent application Ser. No. 14/717,593.

Load/rate predictor 822 is shown receiving utility rates from utilities 608. Utility rates may indicate a cost or price per unit of a resource (e.g., electricity, natural gas, water, etc.) provided by utilities 608 at each time step i in the optimization period. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 608 or predicted utility rates estimated by load/rate predictor 822.

In some embodiments, the utility rates include demand charges for one or more resources provided by utilities 608. A demand charge may define a separate cost imposed by utilities 608 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Model predictive optimizer 830 may be configured to account for demand charges in the high level optimization process performed by high level optimizer 832. Utilities 608 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 822 may store the predicted loads Load and the utility rates in memory 810 and/or provide the predicted loads $Load_i$ and the utility rates to model predictive optimizer 830.

Still referring to FIG. 8, MPM system 602 is shown to include a model predictive optimizer 830. Model predictive optimizer 830 can be configured to perform a multi-level optimization process to optimize the total cost associated with purchasing, maintaining, and operating connected equipment 610. In some embodiments, model predictive optimizer 830 includes a high level optimizer 832 and a low level optimizer 834. High level optimizer 832 may optimize the objective function J for an entire set of connected equipment 610 (e.g., all of the devices within a building) or for a subset of connected equipment 610 (e.g., a single device, all of the devices of a subplant or building subsystem, etc.) to determine the optimal values for each of the decision variables (e.g., $P_{op,i}$, $B_{main,i}$, and $B_{cap,i}$) in the objective function J. The optimization performed by high level optimizer 832 is described in greater detail with reference to FIG. 9.

In some embodiments, low level optimizer 834 receives the optimization results from high level optimizer 832. The optimization results may include optimal power consumption values $P_{op,i}$ and/or load values $Load_i$ for each device or set of devices of connected equipment at each time step i in the optimization period. Low level optimizer 834 may determine how to best run each device or set of devices at the load values determined by high level optimizer 832. For example, low level optimizer 834 may determine on/off states and/or operating setpoints for various devices of connected equipment 610 in order to optimize (e.g., minimize) the power consumption of connected equipment 610 meeting the corresponding load value $Load_i$.

Low level optimizer 834 may be configured to generate equipment performance curves for each device or set of devices of connected equipment 610. Each performance curve may indicate an amount of resource consumption (e.g., electricity use measured in kW, water use measured in L/s, etc.) by a particular device or set of devices of connected equipment 610 as a function of the load on the device or set of devices. In some embodiments, low level optimizer 834 generates the performance curves by performing a low level optimization process at various combinations of load points (e.g., various values of $Load_i$) and weather conditions to generate multiple data points. The low level optimization may be used to determine the minimum amount of resource consumption required to satisfy the corresponding heating or cooling load. An example of a low level optimization process which can be performed by low level optimizer 834 is described in detail in U.S. patent application Ser. No. 14/634,615 titled "Low Level Central Plant Optimization" and filed Feb. 27, 2015, the entire disclosure of which is incorporated by reference herein. Low level optimizer 834 may fit a curve to the data points to generate the performance curves.

In some embodiments, low level optimizer 834 generates equipment performance curves for a set of connected equipment 610 (e.g., a chiller subplant, a heater subplant, etc.) by combining efficiency curves for individual devices of connected equipment 610. A device efficiency curve may indicate the amount of resource consumption by the device as a function of load. The device efficiency curves may be provided by a device manufacturer or generated using experimental data. In some embodiments, the device efficiency curves are based on an initial efficiency curve provided by a device manufacturer and updated using experimental data. The device efficiency curves may be stored in equipment models 818. For some devices, the device efficiency curves may indicate that resource consumption is a U-shaped function of load. Accordingly, when multiple device efficiency curves are combined into a performance curve for multiple devices, the resultant performance curve may be a wavy curve. The waves are caused by a single device loading up before it is more efficient to turn on another device to satisfy the subplant load. Low level optimizer 834 may provide the equipment performance curves to high level optimizer 832 for use in the high level optimization process.

Still referring to FIG. 8, MPM system 602 is shown to include an equipment controller 828. Equipment controller 828 can be configured to control connected equipment 610 to affect a variable state or condition in building 10 (e.g., temperature, humidity, etc.). In some embodiments, equipment controller 828 controls connected equipment 610 based on the results of the optimization performed by model predictive optimizer 830. In some embodiments, equipment controller 828 generates control signals which can be provided to connected equipment 610 via communications interface 804 and/or BMS 606. The control signals may be based on the optimal values of the decision variables in the objective function J. For example, equipment controller 828 may generate control signals which cause connected equipment 610 to achieve the optimal power consumption values $P_{op,i}$ for each time step i in the optimization period.

Data and processing results from model predictive optimizer 830, equipment controller 828, or other modules of MPM system 602 may be accessed by (or pushed to) monitoring and reporting applications 826. Monitoring and reporting applications 826 may be configured to generate real time "system health" dashboards that can be viewed and navigated by a user (e.g., a system engineer). For example, monitoring and reporting applications 826 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across building management systems in different buildings (real or modeled), different campuses, or the like. Other GUI elements or reports may be generated and shown based on available data that allow users to assess performance across one or more energy storage systems from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the building system.

Still referring to FIG. 8, MPM system 602 may include one or more GUI servers, web services 812, or GUI engines 814 to support monitoring and reporting applications 826. In various embodiments, applications 826, web services 812, and GUI engine 814 may be provided as separate components outside of MPM system 602 (e.g., as part of a smart building manager). MPM system 602 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. MPM system 602 may be configured to provide the results of any such processing to other databases, tables, XML files, or other data structures for further querying, calculation, or access by, for example, external monitoring and reporting applications.

MPM system 602 is shown to include configuration tools 816. Configuration tools 816 can allow a user to define (e.g., via graphical user interfaces, via prompt-driven "wizards," etc.) how MPM system 602 should react to changing conditions in BMS 606 and/or connected equipment 610. In an exemplary embodiment, configuration tools 816 allow a user to build and store condition-response scenarios that can cross multiple devices of connected equipment 610, multiple building systems, and multiple enterprise control applications (e.g., work order management system applications, entity resource planning applications, etc.). For example, configuration tools 816 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 816 can present user interfaces for building such conditional logic. The user interfaces may allow users to define policies and responses graphically. In some embodiments, the user interfaces may allow a user to select a pre-stored or pre-constructed policy and adapt it or enable it for use with their system.

High Level Optimizer

Figure 9:
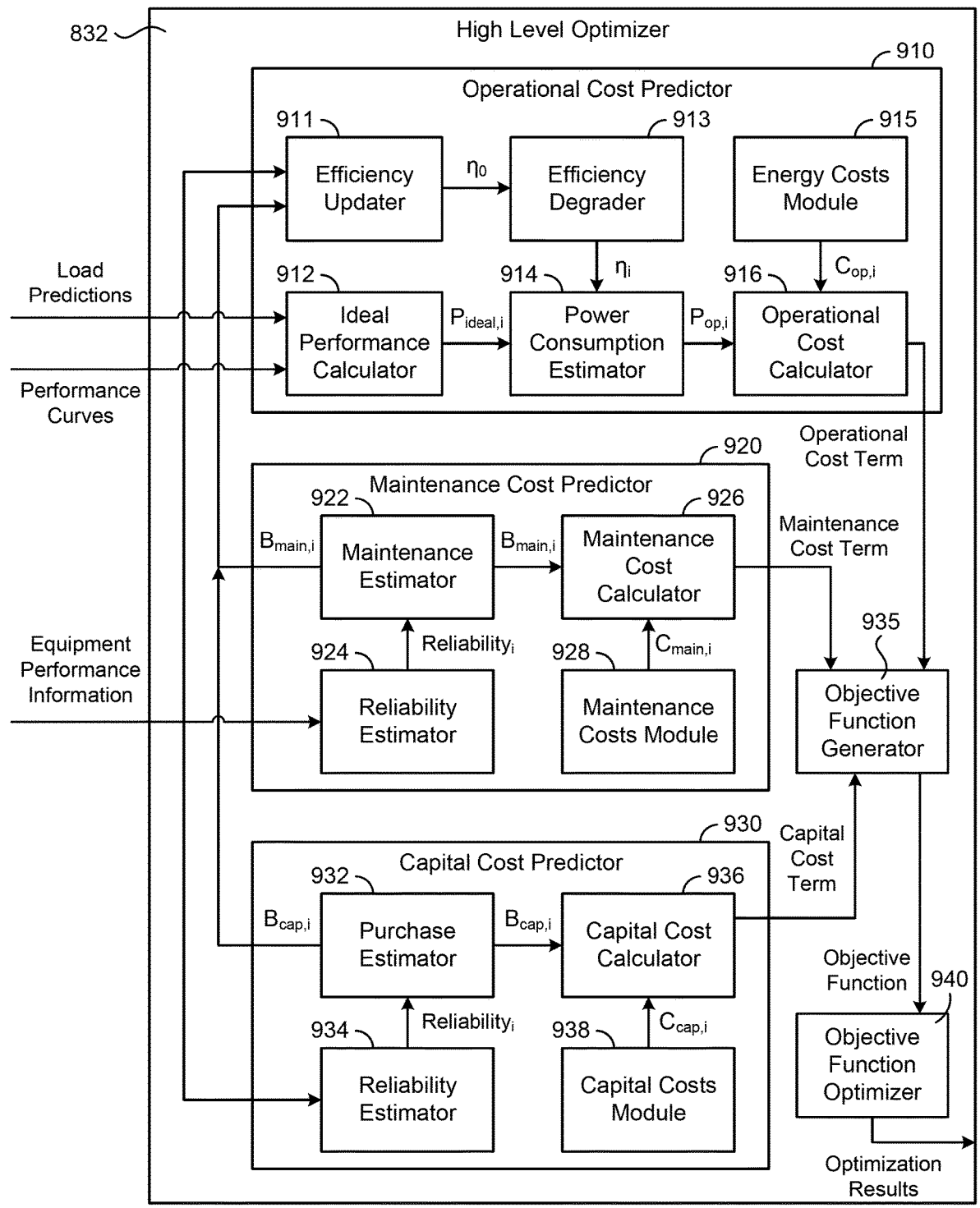
FIG. 9 is a block diagram illustrating a high level optimizer of the MPM system of FIG. 6 in greater detail, according to some embodiments.

Referring now to FIG. 9, a block diagram illustrating high level optimizer 832 in greater detail is shown, according to an exemplary embodiment. High level optimizer 832 can be configured to determine an optimal maintenance strategy for connected equipment 610. In some embodiments, the optimal maintenance strategy is a set of decisions which optimizes the total cost associated with purchasing, maintaining, and operating connected equipment 610 over the duration of an optimization period (e.g., 30 weeks, 52 weeks, 10 years, 30 years, etc.). The decisions can include, for example, equipment purchase decisions, equipment maintenance decisions, and equipment operating decisions.

High level optimizer 832 is shown to include an operational cost predictor 910, a maintenance cost predictor 920, a capital cost predictor 930, an objective function generator 935, and an objective function optimizer 940. Cost predictors 910, 920, and 930 can use a model predictive control technique to formulate an objective function which expresses the total cost as a function of several decision variables (e.g., maintenance decisions, equipment purchase decisions, etc.) and input parameters (e.g., energy cost, device efficiency, device reliability). Operational cost predictor 910 can be configured to formulate an operational cost term in the objective function. Similarly, maintenance cost predictor 920 can be configured to formulate a maintenance cost term in the objective function and capital cost predictor 930 can be configured to formulate a capital cost term in the objective function. Objective function optimizer 940 can optimize (i.e., minimize) the objective function using any of a variety of optimization techniques to identify the optimal values for each of the decision variables.

One example of an objective function which can be generated by high level optimizer 832 is shown in the following equation:

$$J = \sum_{i=1}^{h} C_{op,i} P_{op,i} \Delta t + \sum_{i=1}^{h} C_{main,i} B_{main,i} + \sum_{i=1}^{h} C_{cap,i} P_{cap,i}$$

where $C_{op,i}$ is the cost per unit of energy (e.g., $/kWh) consumed by connected equipment 610 at time step i of the optimization period, $P_{op,i}$ is the power consumption (e.g., kW) of connected equipment 610 at time step i, $\Delta t$ is the duration of each time step i, $C_{main,i}$ is the cost of maintenance performed on connected equipment 610 at time step i, $B_{main,i}$ is a binary variable that indicates whether the maintenance is performed, $C_{cap,i}$ is the capital cost of purchasing a new device of connected equipment 610 at time step i, $B_{cap,i}$ is a binary variable that indicates whether the new device is purchased, and h is the duration of the horizon or optimization period over which the optimization is performed.

Operational Cost Predictor

Operational cost predictor 910 can be configured to formulate the first term in the objective function J. The first term in the objective function J represents the operating cost of connected equipment 610 over the duration of the optimization period and is shown to include three variables or parameters (i.e., $C_{op,i}$, $P_{op,i}$, and $\Delta t$). In some embodiments, the cost per unit of energy $C_{op,i}$ is determined by energy costs module 915. Energy costs module 915 can receive a set of energy prices from utility 608 as energy pricing data. In some embodiments, the energy prices are time-varying cost that depend on the time of day, the day of the week (e.g., weekday vs. weekend), the current season (e.g., summer vs. winter), or other time-based factors. For example, the cost of electricity may be higher during peak energy consumption periods and lower during off-peak or partial-peak energy consumption periods.

Energy costs module 915 can use the energy costs to define the value of $C_{op,i}$ for each time step i of the optimization period. In some embodiments, energy costs module 915 stores the energy costs as an array $C_{op}$ including a cost element for each of the h time steps in the optimization period. For example, energy costs module 915 can generate the following array:

$$C_{op} = [C_{op,1} C_{op,2} \ldots C_{op,h}]$$

where the array $C_{op}$ has a size of 1×h and each element of the array $C_{op}$ includes an energy cost value $C_{op,i}$ for a particular time step i=1 . . . h of the optimization period.

Still referring to FIG. 9, operational cost predictor 910 is shown to include an ideal performance calculator 912. Ideal performance calculator 912 may receive load predictions $Load_i$ from load/rate predictor 822 and may receive performance curves from low level optimizer 834. As discussed above, the performance curves may define the ideal power consumption $P_{ideal}$ of a device or set of devices of connected equipment 610 as a function of the heating or cooling load on the device or set of devices. For example, the performance curve one or more devices of connected equipment 610 can be defined by the following equation:

$$P_{ideal,i} = f(Load_i)$$

where $P_{ideal,i}$ is the ideal power consumption (e.g., kW) of connected equipment 610 at time step i and $Load_i$ is the load (e.g., tons cooling, kW heating, etc.) on connected equipment 610 at time step i. The ideal power consumption $P_{ideal,i}$ may represent the power consumption of the one or more devices of connected equipment 610 assuming they operate at perfect efficiency.

Ideal performance calculator 912 can use the performance curve for a device or set of devices of connected equipment 610 to identify the value of $P_{ideal,i}$ that corresponds to the load point $Load_i$ for the device or set of devices at each time step of the optimization period. In some embodiments, ideal performance calculator 912 stores the ideal load values as an array $P_{ideal}$ including an element for each of the h time steps in the optimization period. For example, ideal performance calculator 912 can generate the following array:

$$P_{ideal} = [P_{ideal,1} P_{ideal,2} \cdots P_{ideal,h}]^T$$

where the array $P_{ideal}$ has a size of h×1 and each element of the array $P_{ideal}$ includes an ideal power consumption value $P_{ideal,i}$ for a particular time step i=1 ... h of the optimization period.

Still referring to FIG. 9, operational cost predictor 910 is shown to include an efficiency updater 911 and an efficiency degrader 913. Efficiency updater 911 can be configured to determine the efficiency η of connected equipment 610 under actual operating conditions. In some embodiments, the efficiency $\eta_i$ represents the ratio of the ideal power consumption $P_{ideal}$ of connected equipment to the actual power consumption $P_{actual}$ of connected equipment 610, as shown in the following equation:

$$\eta = \frac{P_{ideal}}{P_{actual}}$$

where $P_{ideal}$ is the ideal power consumption of connected equipment 610 as defined by the performance curve for connected equipment 610 and $P_{actual}$ is the actual power consumption of connected equipment 610. In some embodiments, efficiency updater 911 uses the equipment performance information collected from connected equipment 610 to identify the actual power consumption value $P_{actual}$. Efficiency updater 911 can use the actual power consumption $P_{actual}$ in combination with the ideal power consumption $P_{ideal}$ to calculate the efficiency η.

Efficiency updater 911 can be configured to periodically update the efficiency η to reflect the current operating efficiency of connected equipment 610. For example, efficiency updater 911 can calculate the efficiency η of connected equipment 610 once per day, once per week, once per year, or at any other interval as may be suitable to capture changes in the efficiency η over time. Each value of the efficiency η may be based on corresponding values of $P_{ideal}$ and $P_{actual}$ at the time the efficiency η is calculated. In some embodiments, efficiency updater 911 updates the efficiency η each time the high level optimization process is performed (i.e., each time the objective function J is optimized). The efficiency value calculated by efficiency updater 911 may be stored in memory 810 as an initial efficiency value $\eta_0$, where the subscript 0 denotes the value of the efficiency η at or before the beginning of the optimization period (e.g., at time step 0).

In some embodiments, efficiency updater 911 updates the efficiency $\eta_i$ for one or more time steps during the optimization period to account for increases in the efficiency η of connected equipment 610 that will result from performing maintenance on connected equipment 610 or purchasing new equipment to replace or supplement one or more devices of connected equipment 610. The time steps i at which the efficiency $\eta_i$ is updated may correspond to the predicted time steps at which the maintenance will be performed or the equipment will replaced. The predicted time steps at which maintenance will be performed on connected equipment 610 may be defined by the values of the binary decision variables $B_{main,i}$ in the objective function J. Similarly, the predicted time steps at which the equipment will be replaced may be defined by the values of the binary decision variables $B_{cap,i}$ in the objective function J.

Efficiency updater 911 can be configured to reset the efficiency $\eta_i$ for a given time step i if the binary decision variables $B_{main,i}$ and $B_{cap,i}$ indicate that maintenance will be performed at that time step and/or new equipment will be purchased at that time step (i.e., $B_{main,i}=1$ and/or $B_{cap,i}=1$). For example, if $B_{main,i}=1$, efficiency updater 911 can be configured to reset the value of $\eta_i$ to $\eta_{main,i}$, where $\eta_{main}$ is the efficiency value that is expected to result from the maintenance performed at time step i. Similarly, if $B_{cap,i}=1$, efficiency updater 911 can be configured to reset the value of $\eta_i$ to $\eta_{cap,i}$ where $\eta_{cap}$ is the efficiency value that is expected to result from purchasing a new device to supplement or replace one or more devices of connected equipment 610 performed at time step i. Efficiency updater 911 can dynamically reset the efficiency $\eta_i$ for one or more time steps while the optimization is being performed (e.g., with each iteration of the optimization) based on the values of binary decision variables $B_{main,i}$ and $B_{cap,i}$.

Efficiency degrader 913 can be configured to predict the efficiency $\eta_i$ of connected equipment 610 at each time step i of the optimization period. The initial efficiency $\eta_0$ at the beginning of the optimization period may degrade over time as connected equipment 610 degrade in performance. For example, the efficiency of a chiller may degrade over time as a result of the chilled water tubes becoming dirty and reducing the heat transfer coefficient of the chiller. Similarly, the efficiency of a battery may decrease over time as a result of degradation in the physical or chemical components of the battery. Efficiency degrader 913 can be configured to account for such degradation by incrementally reducing the efficiency $\eta_i$ over the duration of the optimization period.

In some embodiments, the initial efficiency value $\eta_0$ is updated at the beginning of each optimization period. However, the efficiency η may degrade during the optimization period such that the initial efficiency value $\eta_0$ becomes increasingly inaccurate over the duration of the optimization period. To account for efficiency degradation during the optimization period, efficiency degrader 913 can decrease the efficiency η by a predetermined amount with each successive time step. For example, efficiency degrader 913 can define the efficiency at each time step i=1 ... h as follows:

$$\eta_i = \eta_{i-1} - \Delta t$$

where $\eta_i$ is the efficiency at time step i, $\eta_{i-1}$ is the efficiency at time step i−1, and Δη is the degradation in efficiency between consecutive time steps. In some embodiments, this definition of $\eta_i$ is applied to each time step for which $B_{main,i}=0$ and $B_{cap,i}=0$. However, if either $B_{main,i}=1$ or $B_{cap,i}=1$, the value of $\eta_i$ may be reset to either $\eta_{main}$ or $\eta_{cap}$ as previously described.

In some embodiments, the value of Δη is based on a time series of efficiency values calculated by efficiency updater 911. For example, efficiency degrader 913 may record a time series of the initial efficiency values $\eta_0$ calculated by efficiency updater 911, where each of the initial efficiency values $\eta_0$ represents the empirically-calculated efficiency of connected equipment 610 at a particular time. Efficiency degrader 913 can examine the time series of initial efficiency values $\eta_0$ to determine the rate at which the efficiency degrades. For example, if the initial efficiency $\eta_0$ at time $t_1$ is $\eta_{0,1}$ and the initial efficiency at time $t_2$ is $\eta_{0,2}$, efficiency degrader 913 can calculate the rate of efficiency degradation as follows:

$$\frac{\Delta \eta}{\Delta t} = \frac{\eta_{0,2} - \eta_{0,1}}{t_2 - t_1}$$

where $$\frac{\Delta \eta}{\Delta t}$$

is the rate of efficiency degradation. Efficiency degrader 913 can multiply $$\frac{\Delta \eta}{\Delta t}$$

by the duration of each time step $\Delta t$ to calculate the value of $\Delta \eta$ $$\Delta \eta \left( \text{i.e., } \Delta \eta = \frac{\Delta \eta}{\Delta t} * \Delta t \right).$$

In some embodiments, efficiency degrader 913 stores the efficiency values over the duration of the optimization period in an array $\eta$ including an element for each of the h time steps in the optimization period. For example, efficiency degrader 913 can generate the following array:

$$\eta = [\eta_1 \eta_2 \ldots \eta_h]$$

where the array $\eta$ has a size of 1×h and each element of the array $\eta$ includes an efficiency value $\eta_i$ for a particular time step i=1 . . . h of the optimization period. Each element i of the array $\eta$ may be calculated based on the value of the previous element and the value of $\Delta \eta$ (e.g., if $B_{main,i}=0$ and $B_{cap,i}=0$) or may be dynamically reset to either $\eta_{main}$ or $\eta_{cap}$ (e.g., if $B_{main,i}=1$ or $B_{cap,i}=1$.

The logic characterizing the efficiency updating and resetting operations performed by efficiency updater 911 and efficiency degrader 913 can be summarized in the following equations:

if $B_{main,i}=1 \rightarrow \eta_i=\eta_{main}$ if $B_{cap,i}=1 \rightarrow \eta_i=\eta_{cap}$ if $B_{main,i}=0$ and $B_{cap,i}=0 \rightarrow \eta_i=\eta_{i-1}-\Delta \eta$ which can be applied as constraints on the high level optimization performed by objective function optimizer 940.

Advantageously, efficiency updater 911 and efficiency degrader 913 can model the efficiency $\eta_i$ of connected equipment 610 at each time step i as a function of the maintenance decisions $B_{main,i}$ and the equipment purchase decisions $B_{cap,i}$. For example, the efficiency $\eta_i$ for a particular device may start at an initial value $\eta_0$ at the beginning of the optimization period and may degrade over time such that the efficiency $\eta_i$ decreases with each successive time step i. Performing maintenance on a device may reset the efficiency $\eta_i$ to a higher value immediately after the maintenance is performed. Similarly, purchasing a new device to replace an existing device may reset the efficiency $\eta_i$ to a higher value immediately after the new device is purchased. After being reset, the efficiency $\eta_i$ may continue to degrade over time until the next time at which maintenance is performed or a new device is purchased.

Still referring to FIG. 9, operational cost predictor 910 is shown to include a power consumption estimator 914 and an operational cost calculator 916. Power consumption estimator 914 can be configured to estimate the power consumption $P_{op,i}$ of connected equipment 610 at each time step i of the optimization period. In some embodiments, power consumption estimator 914 estimates the power consumption $P_{op,i}$ as a function of the ideal power consumption $P_{ideal,i}$ calculated by ideal performance calculator 912 and the efficiency $\eta_i$ determined by efficiency degrader 913 and/or efficiency updater 911. For example, power consumption estimator 914 can calculate the power consumption $P_{op,i}$ using the following equation:

$$P_{op,i} = \frac{P_{ideal,i}}{\eta_i}$$

where $P_{ideal,i}$ is the power consumption calculated by ideal performance calculator 912 based on the equipment performance curve for the device at the corresponding load point $Load_i$, and $\eta_i$ is the operating efficiency of the device at time step i.

In some embodiments, power consumption estimator 914 stores the power consumption values as an array $P_{op}$, including an element for each of the h time steps in the optimization period. For example, power consumption estimator 914 can generate the following array:

$$P_{op} = [P_{op,1} P_{op,2} \ldots P_{op,h}]^T$$

where the array $P_{op}$ has a size of h×1 and each element of the array $P_{op}$ includes a power consumption value $P_{op,i}$ for a particular time step i=1 . . . h of the optimization period.

Operational cost calculator 916 can be configured to estimate the operational cost of connected equipment 610 over the duration of the optimization period. In some embodiments, operational cost calculator 916 calculates the operational cost during each time step i using the following equation:

$$\text{Cost}_{op,i} = C_{op,i} P_{op,i} \Delta t$$

where $P_{op,i}$ is the predicted power consumption at time step i determined by power consumption estimator 914, $C_{op,i}$ is the cost per unit of energy at time step i determined by energy costs module 915, and $\Delta t$ is the duration of each time step. Operational cost calculator 916 can sum the operational costs over the duration of the optimization period as follows:

$$\text{Cost}_{op} = \sum_{i=1}^{h} \text{Cost}_{op,i}$$

where $\text{Cost}_{op}$ is the operational cost term of the objective function J.

In other embodiments, operational cost calculator 916 estimates the operational cost $Cost_{op}$ by multiplying the cost array $C_{op}$ by the power consumption array $P_{op}$ and the duration of each time step $\Delta t$ as shown in the following equations:

$$Cost_{op} = C_{op} P_{op} \Delta t$$

$$Cost_{op} = [C_{op,1} C_{op,2} \ldots C_{op,h}][P_{op,1} P_{op,2} \ldots P_{op,h}] \Delta t$$

Maintenance Cost Predictor

Maintenance cost predictor 920 can be configured to formulate the second term in the objective function J. The second term in the objective function J represents the cost of performing maintenance on connected equipment 610 over the duration of the optimization period and is shown to include two variables or parameters (i.e., $C_{main,i}$ and $B_{main,i}$). Maintenance cost predictor 920 is shown to include a maintenance estimator 922, a reliability estimator 924, a maintenance cost calculator 926, and a maintenance costs module 928.

Reliability estimator 924 can be configured to estimate the reliability of connected equipment 610 based on the equipment performance information received from connected equipment 610. The reliability may be a statistical measure of the likelihood that connected equipment 610 will continue operating without fault under its current operating conditions. Operating under more strenuous conditions (e.g., high load, high temperatures, etc.) may result in a lower reliability, whereas operating under less strenuous conditions (e.g., low load, moderate temperatures, etc.) may result in a higher reliability. In some embodiments, the reliability is based on an amount of time that has elapsed since connected equipment 610 last received maintenance and/or an amount of time that has elapsed since connected equipment 610 was purchased or installed.

In some embodiments, reliability estimator 924 uses the equipment performance information to identify a current operating state of connected equipment 610. The current operating state can be examined by reliability estimator 924 to expose when connected equipment 610 begins to degrade in performance and/or to predict when faults will occur. In some embodiments, reliability estimator 924 estimates a likelihood of various types of failures that could potentially occur in connected equipment 610. The likelihood of each failure may be based on the current operating conditions of connected equipment 610, an amount of time that has elapsed since connected equipment 610 has been installed, and/or an amount of time that has elapsed since maintenance was last performed. In some embodiments, reliability estimator 924 identifies operating states and predicts the likelihood of various failures using the systems and methods described in U.S. patent application Ser. No. 15/188,824 titled "Building Management System With Predictive Diagnostics" and filed Jun. 21, 2016, the entire disclosure of which is incorporated by reference herein.

In some embodiments, reliability estimator 924 receives operating data from a plurality of devices of connected equipment 610 distributed across multiple buildings. The operating data can include, for example, current operating conditions, fault indications, failure times, or other data that characterize the operation and performance of connected equipment 610. Reliability estimator 924 can use the set of operating data to develop a reliability model for each type of equipment. The reliability models can be used by reliability estimator 924 to estimate the reliability of any given device of connected equipment 610 as a function of its current operating conditions and/or other extraneous factors (e.g., time since maintenance was last performed, time since installation or purchase, geographic location, water quality, etc.).

One example of a reliability model which can be used by reliability estimator 924 is shown in the following equation:

$$\text{Reliability}_i = f(\text{OpCond}_i, \Delta t_{main,i}, \Delta t_{cap,i})$$

where $\text{Reliability}_i$ is the reliability of connected equipment 610 at time step i, $\text{OpCond}_i$ are the operating conditions at time step i, $\Delta t_{main,i}$ is the amount of time that has elapsed between the time at which maintenance was last performed and time step i, and $\Delta t_{cap,i}$ is the amount of time that has elapsed between the time at which connected equipment 610 was purchased or installed and time step i. Reliability estimator 924 can be configured to identify the current operating conditions $\text{OpCond}_i$ based on the equipment performance information received as a feedback from connected equipment 610. Operating under more strenuous conditions (e.g., high load, extreme temperatures, etc.) may result in a lower reliability, whereas operating under less strenuous conditions (e.g., low load, moderate temperatures, etc.) may result in a higher reliability.

Reliability estimator 924 may determine the amount of time $\Delta t_{main,i}$ that has elapsed since maintenance was last performed on connected equipment 610 based on the values of the binary decision variables $B_{main,i}$. For each time step i, reliability estimator 924 can examine the corresponding values of $B_{main}$ at time step i and each previous time step (e.g., time steps i−1, i−2, . . . , 1). Reliability estimator 924 can calculate the value of $\Delta t_{main,i}$ by subtracting the time at which maintenance was last performed (i.e., the most recent time at which $B_{main,i}=1$) from the time associated with time step i. A long amount of time $\Delta t_{main,i}$ since maintenance was last performed may result in a lower reliability, whereas a short amount of time since maintenance was last performed may result in a higher reliability.

Similarly, reliability estimator 924 may determine the amount of time $\Delta t_{cap,i}$ that has elapsed since connected equipment 610 was purchased or installed based on the values of the binary decision variables $B_{cap,i}$. For each time step i, reliability estimator 924 can examine the corresponding values of $B_{cap}$ at time step i and each previous time step (e.g., time steps i−1, i−2, . . . , 1). Reliability estimator 924 can calculate the value of $\Delta t_{cap,i}$ by subtracting the time at which connected equipment 610 was purchased or installed (i.e., the most recent time at which $B_{cap,i}=1$) from the time associated with time step i. A long amount of time $\Delta t_{cap,i}$ since connected equipment 610 was purchased or installed may result in a lower reliability, whereas a short amount of time since connected equipment 610 was purchased or installed may result in a higher reliability.

Reliability estimator 924 can be configured to reset the reliability for a given time step i if the binary decision variables $B_{main,i}$ and $B_{cap,i}$ indicate that maintenance will be performed at that time step and/or new equipment will be purchased at that time step (i.e., $B_{main,i}=1$ and/or $B_{cap,i}=1$). For example, if $B_{main,i}=1$, reliability estimator 924 can be configured to reset the value of Reliability to $\text{Reliability}_{main}$, where $\text{Reliability}_{main}$ is the reliability value that is expected to result from the maintenance performed at time step i. Similarly, if $B_{cap,i}=1$, reliability estimator 924 can be configured to reset the value of Reliability to $\text{Reliability}_{cap}$, where $\text{Reliability}_{cap}$ is the reliability value that is expected to result from purchasing a new device to supplement or replace one or more devices of connected equipment 610 performed at time step i. Reliability estimator 924 can dynamically reset the reliability for one or more time steps while the optimization is being performed (e.g., with each iteration of the optimization) based on the values of binary decision variables $B_{main,i}$ and $B_{cap,i}$.

Maintenance estimator 922 can be configured to use the estimated reliability of connected equipment 610 over the duration of the optimization period to determine the probability that connected equipment 610 will require maintenance and/or replacement at each time step of the optimization period. In some embodiments, maintenance estimator 922 is configured to compare the probability that connected equipment 610 will require maintenance at a given time step to a critical value. Maintenance estimator 922 can be configured to set the value of $B_{main,i}=1$ in response to a determination that the probability that connected equipment 610 will require maintenance at time step i exceeds the critical value. Similarly, maintenance estimator 922 can be configured to compare the probability that connected equipment 610 will require replacement at a given time step to a critical value. Maintenance estimator 922 can be configured to set the value of $B_{cap,i}=1$ in response to a determination that the probability that connected equipment 610 will require replacement at time step i exceeds the critical value.

In some embodiments, a reciprocal relationship exists between the reliability of connected equipment 610 and the values of the binary decision variables $B_{main,i}$ and $B_{cap,i}$. In other words, the reliability of connected equipment 610 can affect the values of the binary decision variables $B_{main,i}$ and $B_{cap,i}$ selected in the optimization, and the values of the binary decision variables $B_{main,i}$ and $B_{cap,i}$ can affect the reliability of connected equipment 610. Advantageously, the optimization performed by objective function optimizer 940 can identify the optimal values of the binary decision variables $B_{main,i}$ and $B_{cap,i}$ while accounting for the reciprocal relationship between the binary decision variables $B_{main,i}$ and $B_{cap,i}$ and the reliability of connected equipment 610.

In some embodiments, maintenance estimator 922 generates a matrix $B_{main}$ of the binary maintenance decision variables. The matrix $B_{main}$ may include a binary decision variable for each of the different maintenance activities that can be performed at each time step of the optimization period. For example, maintenance estimator 922 can generate the following matrix:

$$B_{main} = \begin{bmatrix} B_{main,1,1} & B_{main,1,2} & \cdots & B_{main,1,h} \\ B_{main,2,1} & B_{main,2,2} & \cdots & B_{main,2,h} \\ \vdots & \vdots & \ddots & \vdots \\ B_{main,m,1} & B_{main,m,2} & \cdots & B_{main,m,h} \end{bmatrix}$$

where the matrix $B_{main}$ has a size of m×h and each element of the matrix $B_{main}$ includes a binary decision variable for a particular maintenance activity at a particular time step of the optimization period. For example, the value of the binary decision variable $B_{main,j,i}$ indicates whether the jth maintenance activity will be performed during the ith time step of the optimization period.

Still referring to FIG. 9, maintenance cost predictor 920 is shown to include a maintenance costs module 928 and a maintenance costs calculator 926. Maintenance costs module 928 can be configured to determine costs $C_{main,i}$ associated with performing various types of maintenance on connected equipment 610. Maintenance costs module 928 can receive a set of maintenance costs from an external system or device (e.g., a database, a user device, etc.). In some embodiments, the maintenance costs define the economic cost (e.g., $) of performing various types of maintenance. Each type of maintenance activity may have a different economic cost associated therewith. For example, the maintenance activity of changing the oil in a chiller compressor may incur a relatively small economic cost, whereas the maintenance activity of completely disassembling the chiller and cleaning all of the chilled water tubes may incur a significantly larger economic cost.

Maintenance costs module 928 can use the maintenance costs to define the values of $C_{main,i}$ in objective function J. In some embodiments, maintenance costs module 928 stores the maintenance costs as an array $C_{main}$ including a cost element for each of the maintenance activities that can be performed. For example, maintenance costs module 928 can generate the following array:

$$C_{main}=[C_{main,1}, C_{main,2} \cdots C_{main,m}]$$

where the array $C_{main}$ has a size of 1×m and each element of the array $C_{main}$ includes a maintenance cost value $C_{main,j}$ for a particular maintenance activity j=1 . . . m.

Some maintenance activities may be more expensive than other. However, different types of maintenance activities may result in different levels of improvement to the efficiency η and/or the reliability of connected equipment 610. For example, merely changing the oil in a chiller may result in a minor improvement in efficiency η and/or a minor improvement in reliability, whereas completely disassembling the chiller and cleaning all of the chilled water tubes may result in a significantly greater improvement to the efficiency η and/or the reliability of connected equipment 610. Accordingly, multiple different levels of post-maintenance efficiency (i.e., $\eta_{main}$) and post-maintenance reliability (i.e., Reliability$_{main}$) may exist. Each level of $\eta_{main}$ and Reliability$_{main}$ may correspond to a different type of maintenance activity.

In some embodiments, maintenance estimator 922 stores each of the different levels of $\eta_{main}$ and Reliability$_{main}$ in a corresponding array. For example, the parameter $\eta_{main}$ can be defined as an array $\eta_{main}$ with an element for each of the m different types of maintenance activities. Similarly, the parameter Reliability$_{main}$ can be defined as an array Reliability$_{main}$ with an element for each of the m different types of maintenance activities. Examples of these arrays are shown in the following equations:

$$\eta_{main}=[\eta_{main,1}\eta_{main,2} \cdots \eta_{main,m}]$$

$$\text{Reliability}_{main}=[\text{Reliability}_{main,1}\ \text{Reliability}_{main,2} \cdots \text{Reliability}_{main,m}]$$

where the array $\eta_{main}$ has a size of 1×m and each element of the array $\eta_{main}$ includes a post-maintenance efficiency value $\eta_{main,j}$ for a particular maintenance activity. Similarly, the array Reliability$_{main}$ has a size of 1×m and each element of the array Reliability$_{main}$ includes a post-maintenance reliability value Reliability$_{main,j}$ for a particular maintenance activity.

In some embodiments, efficiency updater 911 identifies the maintenance activity associated with each binary decision variable $B_{main,j,i}$ and resets the efficiency η to the corresponding post-maintenance efficiency level $\eta_{main,j}$ if $B_{main,j,i}=1$. Similarly, reliability estimator 924 can identify the maintenance activity associated with each binary decision variable $B_{main,j,i}$ and can reset the reliability to the corresponding post-maintenance reliability level Reliability$_{main,j}$ if $B_{main,j,i}=1$.

Maintenance cost calculator 926 can be configured to estimate the maintenance cost of connected equipment 610 over the duration of the optimization period. In some embodiments, maintenance cost calculator 926 calculates the maintenance cost during each time step i using the following equation:

$$Cost_{main,i} = C_{main,i} B_{main,i}$$

where $C_{main,i}$ is an array of maintenance costs including an element for each of the m different types of maintenance activities that can be performed at time step i and $B_{main,i}$ is an array of binary decision variables indicating whether each of the m maintenance activities will be performed at time step i. Maintenance cost calculator 926 can sum the maintenance costs over the duration of the optimization period as follows:

$$Cost_{main} = \sum_{i=1}^{h} Cost_{main,i}$$

where $Cost_{main}$ is the maintenance cost term of the objective function J.

In other embodiments, maintenance cost calculator 926 estimates the maintenance cost $Cost_{main}$ by multiplying the maintenance cost array $C_{main}$ by the matrix of binary decision variables $B_{main}$ as shown in the following equations:

$$Cost_{main} = C_{main} B_{main}$$

$$Cost_{main} = [C_{main,1}\ C_{main,2}\ \ldots\ C_{main,m}] \begin{bmatrix} B_{main,1,1} & B_{main,1,2} & \cdots & B_{main,1,h} \\ B_{main,2,1} & B_{main,2,2} & \cdots & B_{main,2,h} \\ \vdots & \vdots & \ddots & \vdots \\ B_{main,m,1} & B_{main,m,2} & \cdots & B_{main,m,h} \end{bmatrix}$$

Capital Cost Predictor

Capital cost predictor 930 can be configured to formulate the third term in the objective function J. The third term in the objective function J represents the cost of purchasing new devices of connected equipment 610 over the duration of the optimization period and is shown to include two variables or parameters (i.e., $C_{cap,i}$ and $B_{cap,i}$). Capital cost predictor 930 is shown to include a purchase estimator 932, a reliability estimator 934, a capital cost calculator 936, and a capital costs module 938.

Reliability estimator 934 can include some or all of the features of reliability estimator 924, as described with reference to maintenance cost predictor 920. For example, reliability estimator 934 can be configured to estimate the reliability of connected equipment 610 based on the equipment performance information received from connected equipment 610. The reliability may be a statistical measure of the likelihood that connected equipment 610 will continue operating without fault under its current operating conditions. Operating under more strenuous conditions (e.g., high load, high temperatures, etc.) may result in a lower reliability, whereas operating under less strenuous conditions (e.g., low load, moderate temperatures, etc.) may result in a higher reliability. In some embodiments, the reliability is based on an amount of time that has elapsed since connected equipment 610 last received maintenance and/or an amount of time that has elapsed since connected equipment 610 was purchased or installed. Reliability estimator 934 can include some or all of the features and/or functionality of reliability estimator 924, as previously described.

Purchase estimator 932 can be configured to use the estimated reliability of connected equipment 610 over the duration of the optimization period to determine the probability that new devices of connected equipment 610 will be purchased at each time step of the optimization period. In some embodiments, purchase estimator 932 is configured to compare the probability that new devices of connected equipment 610 will be purchased at a given time step to a critical value. Purchase estimator 932 can be configured to set the value of $B_{cap,i}=1$ in response to a determination that the probability that connected equipment 610 will be purchased at time step i exceeds the critical value.

In some embodiments, purchase estimator 932 generates a matrix $B_{cap}$ of the binary capital decision variables. The matrix $B_{cap}$ may include a binary decision variable for each of the different capital purchases that can be made at each time step of the optimization period. For example, purchase estimator 932 can generate the following matrix:

$$B_{cap} = \begin{bmatrix} B_{cap,1,1} & B_{cap,1,2} & \cdots & B_{cap,1,h} \\ B_{cap,2,1} & B_{cap,2,2} & \cdots & B_{cap,2,h} \\ \vdots & \vdots & \ddots & \vdots \\ B_{cap,p,1} & B_{cap,p,2} & \cdots & B_{cap,p,h} \end{bmatrix}$$

where the matrix $B_{cap}$ has a size of p×h and each element of the matrix $B_{cap}$ includes a binary decision variable for a particular capital purchase at a particular time step of the optimization period. For example, the value of the binary decision variable $B_{cap,k,i}$ indicates whether the kth capital purchase will be made during the ith time step of the optimization period.

Still referring to FIG. 9, capital cost predictor 930 is shown to include a capital costs module 938 and a capital cost calculator 936. Capital costs module 938 can be configured to determine costs $C_{cap,i}$ associated with various capital purchases (i.e., purchasing one or more new devices of connected equipment 610). Capital costs module 938 can receive a set of capital costs from an external system or device (e.g., a database, a user device, etc.). In some embodiments, the capital costs define the economic cost (e.g., $) of making various capital purchases. Each type of capital purchase may have a different economic cost associated therewith. For example, purchasing a new temperature sensor may incur a relatively small economic cost, whereas purchasing a new chiller may incur a significantly larger economic cost.

Capital costs module 938 can use the purchase costs to define the values of $C_{cap,i}$ in objective function J. In some embodiments, capital costs module 938 stores the capital costs as an array $C_{cap}$ including a cost element for each of the capital purchases that can be made. For example, capital costs module 938 can generate the following array:

$$C_{cap} = [C_{cap,1}\ C_{cap,2}\ \ldots\ C_{cap,p}]$$

where the array $C_{cap}$ has a size of 1×p and each element of the array $C_{cap}$ includes a cost value $C_{cap,k}$ for a particular capital purchase k=1 . . . p.

Some capital purchases may be more expensive than other. However, different types of capital purchases may result in different levels of improvement to the efficiency η and/or the reliability of connected equipment 610. For example, purchasing a new sensor to replace an existing sensor may result in a minor improvement in efficiency η and/or a minor improvement in reliability, whereas purchasing a new chiller and control system may result in a significantly greater improvement to the efficiency η and/or the reliability of connected equipment 610. Accordingly, multiple different levels of post-purchase efficiency (i.e., $\eta_{cap}$) and post-purchase reliability (i.e., Reliability$_{cap}$) may exist. Each level of $\eta_{cap}$ and Reliability$_{cap}$ may correspond to a different type of capital purchase.

In some embodiments, purchase estimator 932 stores each of the different levels of $\eta_{cap}$ and Reliability$_{cap}$ in a corresponding array. For example, the parameter $\eta_{cap}$ can be defined as an array $\eta_{cap}$ with an element for each of the p different types of capital purchases which can be made. Similarly, the parameter Reliability$_{cap}$ can be defined as an array Reliability$_{cap}$ with an element for each of the p different types of capital purchases that can be made. Examples of these arrays are shown in the following equations:

$$\eta_{cap} = [\eta_{cap,1} \eta_{cap,2} \cdots \eta_{cap,p}]$$

$$\text{Reliability}_{cap} = [\text{Reliability}_{cap,1} \text{ Reliability}_{cap,2} \cdots \text{Reliability}_{cap,p}]$$

where the array $\eta_{cap}$ has a size of 1×p and each element of the array $\eta_{cap}$ includes a post-purchase efficiency value $\eta_{cap,k}$ for a particular capital purchase k. Similarly, the array Reliability$_{cap}$ has a size of 1×p and each element of the array Reliability$_{cap}$ includes a post-purchase reliability value Reliability$_{cap,k}$ for a particular capital purchase k.

In some embodiments, efficiency updater 911 identifies the capital purchase associated with each binary decision variable $B_{main,k,i}$ and resets the efficiency η to the corresponding post-purchase efficiency level $\eta_{cap,k}$ if $B_{cap,k,i}=1$. Similarly, reliability estimator 924 can identify the capital purchase associated with each binary decision variable $B_{cap,k,i}$ and can reset the reliability to the corresponding post-purchase reliability level Reliability$_{cap,k}$ if $B_{main,k,i}=1$.

Capital cost calculator 936 can be configured to estimate the capital cost of connected equipment 610 over the duration of the optimization period. In some embodiments, capital cost calculator 936 calculates the capital cost during each time step i using the following equation:

$$\text{Cost}_{cap,i} = C_{cap,i} B_{cap,i}$$

where $C_{cap,i}$ is an array of capital purchase costs including an element for each of the p different capital purchases that can be made at time step i and $B_{cap,i}$ is an array of binary decision variables indicating whether each of the p capital purchases will be made at time step i. Capital cost calculator 936 can sum the capital costs over the duration of the optimization period as follows:

$$\text{Cost}_{cap} = \sum_{i=1}^{h} \text{Cost}_{cap,i}$$

where Cost$_{cap}$ is the capital cost term of the objective function J.

In other embodiments, capital cost calculator 936 estimates the capital cost Cost$_{cap}$ by multiplying the capital cost array $C_{cap}$ by the matrix of binary decision variables $B_{cap}$ as shown in the following equations:

$$\text{Cost}_{cap} = C_{cap} B_{cap}$$

$$\text{Cost}_{cap} = [C_{cap,1} \, C_{cap,2} \, \ldots \, C_{cap,p}] \begin{bmatrix} B_{cap,1,1} & B_{cap,1,2} & \cdots & B_{cap,1,h} \\ B_{cap,2,1} & B_{cap,2,2} & \cdots & B_{cap,2,h} \\ \vdots & \vdots & \ddots & \vdots \\ B_{cap,p,1} & B_{cap,p,2} & \cdots & B_{cap,p,h} \end{bmatrix}$$

Objective Function Optimizer

Still referring to FIG. 9, high level optimizer 832 is shown to include an objective function generator 935 and an objective function optimizer 940. Objective function generator 935 can be configured to generate the objective function J by summing the operational cost term, the maintenance cost term, and the capital cost term formulated by cost predictors 910, 920, and 930. One example of an objective function which can be generated by objective function generator 935 is shown in the following equation:

$$J = \sum_{i=1}^{h} C_{op,i} P_{op,i} \Delta t + \sum_{i=1}^{h} C_{main,i} B_{main,i} + \sum_{i=1}^{h} C_{cap,i} P_{cap,i}$$

where $C_{op,i}$ is the cost per unit of energy (e.g., $/kWh) consumed by connected equipment 610 at time step i of the optimization period, $P_{op,i}$ is the power consumption (e.g., kW) of connected equipment 610 at time step i, $\Delta t$ is the duration of each time step i, $C_{main,i}$ is the cost of maintenance performed on connected equipment 610 at time step i, $B_{main,i}$ is a binary variable that indicates whether the maintenance is performed, $C_{cap,i}$ is the capital cost of purchasing a new device of connected equipment 610 at time step i, $B_{cap,i}$ is a binary variable that indicates whether the new device is purchased, and h is the duration of the horizon or optimization period over which the optimization is performed.

Another example of an objective function which can be generated by objective function generator 935 is shown in the following equation:

$$J = C_{op} P_{op} \Delta t + C_{main} B_{main} + C_{cap} B_{cap}$$

$$J = [C_{op,1} \, C_{op,2} \, \ldots \, C_{op,h}][P_{op,1} \, P_{op,2} \, \ldots \, P_{op,h}]^T \Delta t +$$

$$[C_{main,1} \, C_{main,2} \, \ldots \, C_{main,m}] \begin{bmatrix} B_{main,1,1} & B_{main,1,2} & \cdots & B_{main,1,h} \\ B_{main,2,1} & B_{main,2,2} & \cdots & B_{main,2,h} \\ \vdots & \vdots & \ddots & \vdots \\ B_{main,m,1} & B_{main,m,2} & \cdots & B_{main,m,h} \end{bmatrix} +$$

$$[C_{cap,1} \, C_{cap,2} \, \ldots \, C_{cap,p}] \begin{bmatrix} B_{cap,1,1} & B_{cap,1,2} & \cdots & B_{cap,1,h} \\ B_{cap,2,1} & B_{cap,2,2} & \cdots & B_{cap,2,h} \\ \vdots & \vdots & \ddots & \vdots \\ B_{cap,p,1} & B_{cap,p,2} & \cdots & B_{cap,p,h} \end{bmatrix}$$

where the array $C_{op}$ includes an energy cost value $C_{op,i}$ for a particular time step i=1 . . . h of the optimization period, the array $P_{op}$ includes a power consumption value $P_{op,i}$ for a particular time step i=1 . . . h of the optimization period, each element of the array $C_{main}$ includes a maintenance cost value $C_{main,j}$ for a particular maintenance activity j=1 . . . m, each element of the matrix $B_{main}$ includes a binary decision variable for a particular maintenance activity j=1 . . . m at a particular time step i=1 . . . h of the optimization period, each element of the array $C_{cap}$ includes a capital cost value $C_{cap,k}$ for a particular capital purchase k=1 . . . p, and each element of the matrix $B_{cap}$ includes a binary decision variable for a particular capital purchase k=1 . . . p at a particular time step i=1 . . . h of the optimization period.

Objective function generator 935 can be configured to impose constraints on one or more variables or parameters in the objective function J. The constraints can include any of the equations or relationships described with reference to operational cost predictor 910, maintenance cost predictor 920, and capital cost predictor 930. For example, objective function generator 935 can impose a constraint which defines the power consumption values $P_{op,i}$ for one or more devices of connected equipment 610 as a function of the ideal power consumption $P_{ideal,i}$ and the efficiency $\eta_i$ (e.g., $P_{op,i}=P_{ideal,i}/\eta_i$). Objective function generator 935 can impose a constraint which defines the efficiency $\eta_i$ as a function of the binary decision variables $B_{main,i}$ and $B_{cap,i}$, as described with reference to efficiency updater 911 and efficiency degrader 913. Objective function generator 935 can impose a constraint which constrains the binary decision variables $B_{main,i}$ and $B_{cap,i}$ to a value of either zero or one and defines the binary decision variables $B_{main,i}$ and $B_{cap,i}$ as a function of the reliability Reliability$_i$ of connected equipment 610, as described with reference to maintenance estimator 922 and purchase estimator 932. Objective function generator 935 can impose a constraint which defines the reliability Reliability$_i$ of connected equipment 610 as a function of the equipment performance information (e.g., operating conditions, run hours, etc.) as described with reference to reliability estimators 924 and 934.

Objective function optimizer 940 can optimize the objective function J to determine the optimal values of the binary decision variables $B_{main,i}$ and $B_{cap,i}$ over the duration of the optimization period. Objective function optimizer 940 can use any of a variety of optimization techniques to formulate and optimize the objective function J. For example, objective function optimizer 940 can use integer programming, mixed integer linear programming, stochastic optimization, convex programming, dynamic programming, or any other optimization technique to formulate the objective function J, define the constraints, and perform the optimization. These and other optimization techniques are known in the art and will not be described in detail here.

In some embodiments, objective function optimizer 940 uses mixed integer stochastic optimization to optimize the objective function J. In mixed integer stochastic optimization, some of the variables in the objective function J can be defined as functions of random variables or probabilistic variables. For example, the decision variables $B_{main,i}$ and $B_{cap,i}$ can be defined as binary variables that have probabilistic values based on the reliability of connected equipment 610. Low reliability values may increase the probability that the binary decision variables $B_{main,i}$ and $B_{cap,i}$ will have a value of one (e.g., $B_{main,i}=1$ and $B_{cap,i}=1$), whereas high reliability values may increase the probability that the binary decision variables $B_{main,i}$ and $B_{cap,i}$ will have a value of zero (e.g., $B_{main,i}=0$ and $B_{cap,i}=0$). In some embodiments, maintenance estimator 922 and purchase estimator 932 use a mixed integer stochastic technique to define the values of the binary decision variables $B_{main,i}$ and $B_{cap,i}$ as a probabilistic function of the reliability of connected equipment 610.

As discussed above, the objective function J may represent the predicted cost of operating, maintaining, and purchasing one or more devices of connected equipment 610 over the duration of the optimization period. In some embodiments, objective function optimizer 940 is configured to project these costs back to a particular point in time (e.g., the current time) to determine the net present value (NPV) of the one or more devices of connected equipment 610 at a particular point in time. For example, objective function optimizer 940 can project each of the costs in objective function J back to the current time using the following equation:

$$NPV_{cost} = \sum_{i=1}^{h} \frac{Cost_i}{(1+r)^i}$$

where r is the interest rate, Cost$_i$ is the cost incurred during time step i of the optimization period, and NPV$_{cost}$ is the net present value (i.e., the present cost) of the total costs incurred over the duration of the optimization period. In some embodiments, objective function optimizer 940 optimizes the net present value NPV$_{cost}$ to determine the NPV of one or more devices of connected equipment 610 at a particular point in time.

As discussed above, one or more variables or parameters in the objective function J can be updated dynamically based on closed-loop feedback from connected equipment 610. For example, the equipment performance information received from connected equipment 610 can be used to update the reliability and/or the efficiency of connected equipment 610. Objective function optimizer 940 can be configured to optimize the objective function J periodically (e.g., once per day, once per week, once per month, etc.) to dynamically update the predicted cost and/or the net present value NPV$_{cost}$ based on the closed-loop feedback from connected equipment 610.

In some embodiments, objective function optimizer 940 generates optimization results. The optimization results may include the optimal values of the decision variables in the objective function J for each time step i in the optimization period. The optimization results include operating decisions, equipment maintenance decisions, and/or equipment purchase decisions for each device of connected equipment 610. In some embodiments, the optimization results optimize the economic value of operating, maintaining, and purchasing connected equipment 610 over the duration of the optimization period. In some embodiments, the optimization results optimize the net present value of one or more devices of connected equipment 610 at a particular point in time. The optimization results may cause BMS 606 to activate, deactivate, or adjust a setpoint for connected equipment 610 in order to achieve the optimal values of the decision variables specified in the optimization results.

In some embodiments, MPM system 602 uses the optimization results to generate equipment purchase and maintenance recommendations. The equipment purchase and maintenance recommendations may be based on the optimal values for the binary decision variables $B_{main,i}$ and $B_{cap,i}$ determined by optimizing the objective function J. For example, a value of $B_{main,25}=1$ for a particular device of connected equipment 610 may indicate that maintenance should be performed on that device at the 25$^{th}$ time step of the optimization period, whereas a value of $B_{main,25}=0$ may indicate that the maintenance should not be performed at that time step. Similarly, a value of $B_{cap,25}=1$ may indicate that a new device of connected equipment 610 should be purchased at the 25$^{th}$ time step of the optimization period, whereas a value of $B_{cap,25}=0$ may indicate that the new device should not be purchased at that time step.

In some embodiments, the equipment purchase and maintenance recommendations are provided to building 10 (e.g., to BMS 606) and/or to client devices 448. An operator or building owner can use the equipment purchase and maintenance recommendations to assess the costs and benefits of performing maintenance and purchasing new devices. In some embodiments, the equipment purchase and maintenance recommendations are provided to service technicians 620. Service technicians 620 can use the equipment purchase and maintenance recommendations to determine when customers should be contacted to perform service or replace equipment.

Model Predictive Maintenance Process

Figure 10:
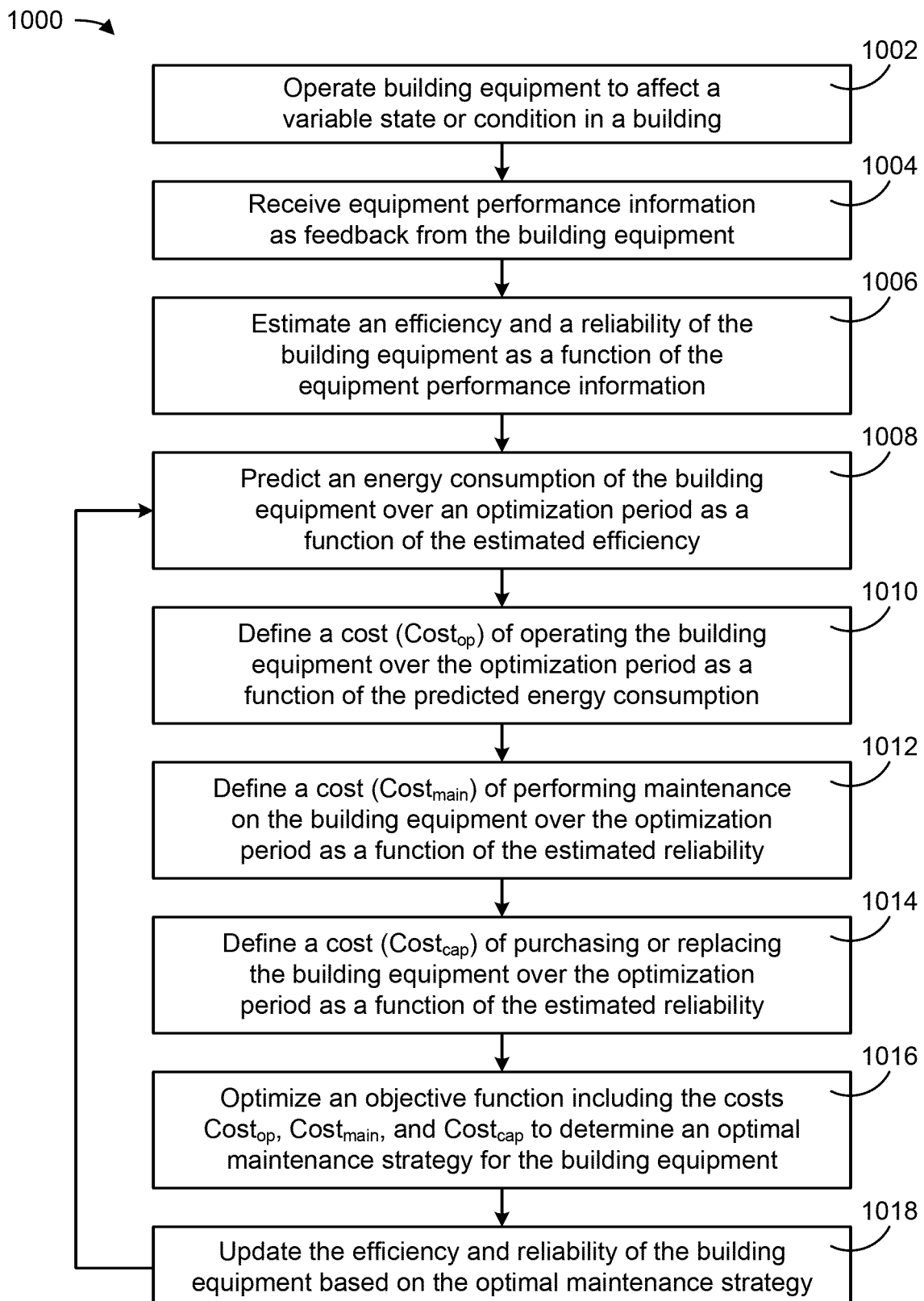
FIG. 10 is a flowchart of a process for operating the MPM system of FIG. 6, according to some embodiments.

Referring now to FIG. 10, a flowchart of a model predictive maintenance process 1000 is shown, according to an exemplary embodiment. Process 1000 can be performed by one or more components of building system 600. In some embodiments, process 1000 is performed by MPM system 602, as described with reference to FIGS. 6-9.

Process 1000 is shown to include operating building equipment to affect a variable state or condition of a building (step 1002) and receiving equipment performance information as feedback from the building equipment (step 1004). The building equipment can include type of equipment which can be used to monitor and/or control a building (e.g., connected equipment 610). For example, the building equipment can include chillers, AHUs, boilers, batteries, heaters, economizers, valves, actuators, dampers, cooling towers, fans, pumps, lighting equipment, security equipment, refrigeration equipment, or any other type of equipment in a building system or building management system. The building equipment can include any of the equipment of HVAC system 100, waterside system 200, airside system 300, BMS 400, and/or BMS 500, as described with reference to FIGS. 1-5. The equipment performance information can include samples of monitored variables (e.g., measured temperature, measured pressure, measured flow rate, power consumption, etc.), current operating conditions (e.g., heating or cooling load, current operating state, etc.), fault indications, or other types of information that characterize the performance of the building equipment.

Process 1000 is shown to include estimating an efficiency and reliability of the building equipment as a function of the equipment performance information (step 1006). In some embodiments, step 1006 is performed by efficiency updater 911 and reliability estimators 924, 926 as described with reference to FIG. 9. Step 1006 can include using the equipment performance information to determine the efficiency $\eta$ of the building equipment under actual operating conditions. In some embodiments, the efficiency $\eta_i$ represents the ratio of the ideal power consumption $P_{ideal}$ of the building equipment to the actual power consumption $P_{actual}$ of the building equipment, as shown in the following equation:

$$\eta = \frac{P_{ideal}}{P_{actual}}$$

where $P_{ideal}$ is the ideal power consumption of the building equipment as defined by the performance curve for the building equipment and $P_{actual}$ is the actual power consumption of the building equipment. In some embodiments, step 1006 includes using the equipment performance information collected in step 1002 to identify the actual power consumption value $P_{actual}$. Step 1006 can include using the actual power consumption $P_{actual}$ in combination with the ideal power consumption $P_{ideal}$ to calculate the efficiency $\eta$.

Step 1006 can include periodically updating the efficiency $\eta$ to reflect the current operating efficiency of the building equipment. For example, step 1006 can include calculating the efficiency $\eta$ of the building equipment once per day, once per week, once per year, or at any other interval as may be suitable to capture changes in the efficiency $\eta$ over time. Each value of the efficiency $\eta$ may be based on corresponding values of $P_{ideal}$ and $P_{actual}$ at the time the efficiency $\eta$ is calculated. In some embodiments, step 1006 includes updating the efficiency $\eta$ each time the high level optimization process is performed (i.e., each time the objective function J is optimized). The efficiency value calculated in step 1006 may be stored in memory 810 as an initial efficiency value $\eta_0$, where the subscript 0 denotes the value of the efficiency $\eta$ at or before the beginning of the optimization period (e.g., at time step 0).

Step 1006 can include predicting the efficiency $\eta_i$ of the building equipment at each time step i of the optimization period. The initial efficiency $\eta_0$ at the beginning of the optimization period may degrade over time as the building equipment degrade in performance. For example, the efficiency of a chiller may degrade over time as a result of the chilled water tubes becoming dirty and reducing the heat transfer coefficient of the chiller. Similarly, the efficiency of a battery may decrease over time as a result of degradation in the physical or chemical components of the battery. Step 1006 can account for such degradation by incrementally reducing the efficiency $\eta_i$ over the duration of the optimization period.

In some embodiments, the initial efficiency value $\eta_0$ is updated at the beginning of each optimization period. However, the efficiency $\eta$ may degrade during the optimization period such that the initial efficiency value $\eta_0$ becomes increasingly inaccurate over the duration of the optimization period. To account for efficiency degradation during the optimization period, step 1006 can include decreasing the efficiency $\eta$ by a predetermined amount with each successive time step. For example, step 1006 can include defining the efficiency at each time step i=1 . . . h as follows:

$$\eta_i = \eta_{i-1} - \Delta\eta$$

where $\eta_i$ is the efficiency at time step i, $\eta_{i-1}$ is the efficiency at time step i−1, and $\Delta\eta$ is the degradation in efficiency between consecutive time steps. In some embodiments, this definition of $\eta_i$ is applied to each time step for which $B_{main,i}=0$ and $B_{cap,i}=0$. However, if either $B_{main,i}=1$ or $B_{cap,i}=1$, the value of $\eta_i$ may be reset to either $\eta_{main}$ or $\eta_{cap}$ in step 1018.

In some embodiments, the value of $\Delta\eta$ is based on a time series of efficiency values. For example, step 1006 may include recording a time series of the initial efficiency values $\eta_0$, where each of the initial efficiency values $\eta_0$ represents the empirically-calculated efficiency of the building equipment at a particular time. Step 1006 can include examining the time series of initial efficiency values $\eta_0$ to determine the rate at which the efficiency degrades. For example, if the initial efficiency $\eta_0$ at time $t_1$ is $\eta_{0,1}$ and the initial efficiency at time $t_2$ is $\eta_{0,2}$, the rate of efficiency degradation can be calculated as follows:

$$\frac{\Delta\eta}{\Delta t} = \frac{\eta_{0,2} - \eta_{0,1}}{t_2 - t_1}$$

where $$\frac{\Delta\eta}{\Delta t}$$

is the rate of efficiency degradation. Step 1006 can include multiplying $$\frac{\Delta \eta}{\Delta t}$$

by the duration of each time step $\Delta t$ to calculate the value of $\Delta \eta$ $$\Delta \eta \left( \text{i.e., } \Delta \eta = \frac{\Delta \eta}{\Delta t} * \Delta t \right).$$

Step 1006 can include estimating the reliability of the building equipment based on the equipment performance information received in step 1004. The reliability may be a statistical measure of the likelihood that the building equipment will continue operating without fault under its current operating conditions. Operating under more strenuous conditions (e.g., high load, high temperatures, etc.) may result in a lower reliability, whereas operating under less strenuous conditions (e.g., low load, moderate temperatures, etc.) may result in a higher reliability. In some embodiments, the reliability is based on an amount of time that has elapsed since the building equipment last received maintenance and/or an amount of time that has elapsed since the building equipment were purchased or installed.

In some embodiments, step 1006 includes using the equipment performance information to identify a current operating state of the building equipment. The current operating state can be examined to expose when the building equipment begin to degrade in performance and/or to predict when faults will occur. In some embodiments, step 1006 includes estimating a likelihood of various types of failures that could potentially occur the building equipment. The likelihood of each failure may be based on the current operating conditions of the building equipment, an amount of time that has elapsed since the building equipment have been installed, and/or an amount of time that has elapsed since maintenance was last performed. In some embodiments, step 1006 includes identifying operating states and predicts the likelihood of various failures using the systems and methods described in U.S. patent application Ser. No. 15/188,824 titled "Building Management System With Predictive Diagnostics" and filed Jun. 21, 2016, the entire disclosure of which is incorporated by reference herein.

In some embodiments, step 1006 includes receiving operating data from building equipment distributed across multiple buildings. The operating data can include, for example, current operating conditions, fault indications, failure times, or other data that characterize the operation and performance of the building equipment. Step 1006 can include using the set of operating data to develop a reliability model for each type of equipment. The reliability models can be used in step 1006 to estimate the reliability of any given device of the building equipment as a function of its current operating conditions and/or other extraneous factors (e.g., time since maintenance was last performed, time since installation or purchase, geographic location, water quality, etc.).

One example of a reliability model which can be used in step 1006 is shown in the following equation:

$$\text{Reliability}_i = f(\text{OpCond}_i, \Delta t_{main,i}, \Delta t_{cap,i})$$

where Reliability is the reliability of the building equipment at time step i, $\text{OpCond}_i$ are the operating conditions at time step i, $\Delta t_{main,i}$ is the amount of time that has elapsed between the time at which maintenance was last performed and time step i, and $\Delta t_{cap,i}$ is the amount of time that has elapsed between the time at which the building equipment were purchased or installed and time step i. Step 1006 can include identifying the current operating conditions $\text{OpCond}_i$ based on the equipment performance information received as a feedback from the building equipment. Operating under more strenuous conditions (e.g., high load, extreme temperatures, etc.) may result in a lower reliability, whereas operating under less strenuous conditions (e.g., low load, moderate temperatures, etc.) may result in a higher reliability.

Still referring to FIG. 10, process 1000 is shown to include predicting an energy consumption of the building equipment over an optimization period as a function of the estimated efficiency (step 1008). In some embodiments, step 1008 is performed by ideal performance calculator 912 and/or power consumption estimator, as described with reference to FIG. 9. Step 1008 can include receiving load predictions $\text{Load}_i$ from load/rate predictor 822 and performance curves from low level optimizer 834. As discussed above, the performance curves may define the ideal power consumption Pea of the building equipment a function of the heating or cooling load on the device or set of devices. For example, the performance curve for the building equipment can be defined by the following equation:

$$P_{ideal,i} = f(\text{Load}_i)$$

where $P_{ideal,i}$ is the ideal power consumption (e.g., kW) of the building equipment at time step i and $\text{Load}_i$ is the load (e.g., tons cooling, kW heating, etc.) on the building equipment at time step i. The ideal power consumption $P_{ideal,i}$ may represent the power consumption of the building equipment assuming they operate at perfect efficiency. Step 1008 can include using the performance curve for the building equipment to identify the value of $P_{ideal,i}$ that corresponds to the load point $\text{Load}_i$ for the building equipment at each time step of the optimization period.

In some embodiments, step 1008 includes estimating the power consumption $P_{op,i}$ as a function of the ideal power consumption $P_{ideal,i}$ and the efficiency $\eta_i$ of the building equipment. For example, step 1008 can include calculating the power consumption $P_{op,i}$ using the following equation:

$$P_{op,i} = \frac{P_{ideal,i}}{\eta_i}$$

where $P_{ideal,i}$ is the power consumption based on the equipment performance curve for the building equipment at the corresponding load point $\text{Load}_i$, and $\eta_i$ is the operating efficiency of the building equipment at time step i.

Still referring to FIG. 10, process 1000 is shown to include defining a cost $\text{Cost}_{op}$ of operating the building equipment over the optimization period as a function of the predicted energy consumption (step 1010). In some embodiments, step 1010 is performed by operational cost calculator 916, as described with reference to FIG. 9. Step 1010 can include calculating the operational cost during each time step i using the following equation:

$$\text{Cost}_{op,i} = C_{op,i} P_{op,i} \Delta t$$

where $P_{op,i}$ is the predicted power consumption at time step i determined in step 1008, $C_{op,i}$ is the cost per unit of energy at time step i, and $\Delta t$ is the duration of each time step. Step 1010 can include summing the operational costs over the duration of the optimization period as follows:

$$Cost_{op} = \sum_{i=1}^{h} Cost_{op,i}$$

where $Cost_{op}$ is the operational cost term of the objective function J.

In other embodiments, step 1010 can include calculating the operational cost $Cost_{op}$ by multiplying the cost array $C_{op}$ by the power consumption array $P_{op}$ and the duration of each time step $\Delta t$ as shown in the following equations:

$$Cost_{op} = C_{op} P_{op} \Delta t$$

$$Cost_{op} = [C_{op,1} C_{op,2} \ldots C_{op,h}][P_{op,1} P_{op,2} \ldots P_{op,h}] \Delta t$$

where the array $C_{op}$ includes an energy cost value $C_{op,i}$ for a particular time step $i=1 \ldots h$ of the optimization period, the array $P_{op}$ includes a power consumption value $P_{op,i}$ for a particular time step $i=1 \ldots h$ of the optimization period.

Still referring to FIG. 10, process 1000 is shown to include defining a cost of performing maintenance on the building equipment over the optimization period as a function of the estimated reliability (step 1012). Step 1012 can be performed by maintenance cost predictor 920, as described with reference to FIG. 9. Step 1012 can include using the estimated reliability of the building equipment over the duration of the optimization period to determine the probability that the building equipment will require maintenance and/or replacement at each time step of the optimization period. In some embodiments, step 1012 includes comparing the probability that the building equipment will require maintenance at a given time step to a critical value. Step 1012 can include setting the value of $B_{main,i}=1$ in response to a determination that the probability that the building equipment will require maintenance at time step i exceeds the critical value. Similarly, step 1012 can include comparing the probability that the building equipment will require replacement at a given time step to a critical value. Step 1012 can include setting the value of $B_{cap,i}=1$ in response to a determination that the probability that the building equipment will require replacement at time step i exceeds the critical value.

Step 1012 can include determining the costs $C_{main,i}$ associated with performing various types of maintenance on the building equipment. Step 1012 can include receiving a set of maintenance costs from an external system or device (e.g., a database, a user device, etc.). In some embodiments, the maintenance costs define the economic cost (e.g., $) of performing various types of maintenance. Each type of maintenance activity may have a different economic cost associated therewith. For example, the maintenance activity of changing the oil in a chiller compressor may incur a relatively small economic cost, whereas the maintenance activity of completely disassembling the chiller and cleaning all of the chilled water tubes may incur a significantly larger economic cost. Step 1012 can include using the maintenance costs to define the values of $C_{main,i}$ in objective function J.

Step 1012 can include estimating the maintenance cost of the building equipment over the duration of the optimization period. In some embodiments, step 1012 includes calculating the maintenance cost during each time step i using the following equation:

$$Cost_{main,i} = C_{main,i} B_{main,i}$$

where $C_{main,i}$ is an array of maintenance costs including an element for each of the m different types of maintenance activities that can be performed at time step i and $B_{main,i}$ is an array of binary decision variables indicating whether each of the m maintenance activities will be performed at time step i. Step 1012 can include summing the maintenance costs over the duration of the optimization period as follows:

$$Cost_{main} = \sum_{i=1}^{h} Cost_{main,i}$$

where $Cost_{main}$ is the maintenance cost term of the objective function J.

In other embodiments, step 1012 includes estimating the maintenance cost $Cost_{main}$ by multiplying the maintenance cost array $C_{main}$ by the matrix of binary decision variables $B_{main}$ as shown in the following equations:

$$Cost_{main} = C_{main} B_{main}$$

$$Cost_{main} = [C_{main,1} \ C_{main,2} \ \ldots \ C_{main,m}] \begin{bmatrix} B_{main,1,1} & B_{main,1,2} & \cdots & B_{main,1,h} \\ B_{main,2,1} & B_{main,2,2} & \cdots & B_{main,2,h} \\ \vdots & \vdots & \ddots & \vdots \\ B_{main,m,1} & B_{main,m,2} & \cdots & B_{main,m,h} \end{bmatrix}$$

where each element of the array $C_{main}$ includes a maintenance cost value $C_{main,j}$ for a particular maintenance activity $j=1 \ldots m$ and each element of the matrix $B_{main}$ includes a binary decision variable for a particular maintenance activity $j=1 \ldots m$ at a particular time step $i=1 \ldots h$ of the optimization period.

Still referring to FIG. 10, process 1000 is shown to include defining a cost $Cost_{cap}$ of purchasing or replacing the building equipment over the optimization period as a function of the estimated reliability (step 1014). Step 1014 can be performed by capital cost predictor 930, as described with reference to FIG. 9. In some embodiments, step 1014 includes using the estimated reliability of the building equipment over the duration of the optimization period to determine the probability that new devices of the building equipment will be purchased at each time step of the optimization period. In some embodiments, step 1014 includes comparing the probability that new devices of the building equipment will be purchased at a given time step to a critical value. Step 1014 can include setting the value of $B_{cap,i}=1$ in response to a determination that the probability that the building equipment will be purchased at time step i exceeds the critical value.

Step 1014 can include determining the costs $C_{cap,i}$ associated with various capital purchases (i.e., purchasing one or more new devices of the building equipment). Step 1014 can include receiving a set of capital costs from an external system or device (e.g., a database, a user device, etc.). In some embodiments, the capital costs define the economic cost (e.g., $) of making various capital purchases. Each type of capital purchase may have a different economic cost associated therewith. For example, purchasing a new temperature sensor may incur a relatively small economic cost, whereas purchasing a new chiller may incur a significantly larger economic cost. Step 1014 can include using the purchase costs to define the values of $C_{cap,i}$ in objective function J.

Some capital purchases may be more expensive than other. However, different types of capital purchases may result in different levels of improvement to the efficiency $\eta$ and/or the reliability of the building equipment. For example, purchasing a new sensor to replace an existing sensor may result in a minor improvement in efficiency η and/or a minor improvement in reliability, whereas purchasing a new chiller and control system may result in a significantly greater improvement to the efficiency η and/or the reliability of the building equipment. Accordingly, multiple different levels of post-purchase efficiency (i.e., $\eta_{cap}$) and post-purchase reliability (i.e., Reliability$_{cap}$) may exist. Each level of $\eta_{cap}$ and Reliability$_{cap}$ may correspond to a different type of capital purchase.

Step 1014 can include estimating the capital cost of the building equipment over the duration of the optimization period. In some embodiments, step 1014 includes calculating the capital cost during each time step i using the following equation:

$$\text{Cost}_{cap,i} = C_{cap,i} B_{cap,i}$$

where $C_{cap,i}$ is an array of capital purchase costs including an element for each of the p different capital purchases that can be made at time step i and $B_{cap,i}$ is an array of binary decision variables indicating whether each of the p capital purchases will be made at time step i. Step 1014 can include summing the capital costs over the duration of the optimization period as follows:

$$\text{Cost}_{cap} = \sum_{i=1}^{h} \text{Cost}_{cap,i}$$

where Cost$_{cap}$ is the capital cost term of the objective function J.

In other embodiments, step 1014 includes estimating the capital cost Cost$_{cap}$ by multiplying the capital cost array $C_{cap}$ by the matrix of binary decision variables $B_{cap}$ as shown in the following equations:

$$\text{Cost}_{cap} = C_{cap} B_{cap}$$

$$\text{Cost}_{cap} = [C_{cap,1} \ C_{cap,2} \ \ldots \ C_{cap,p}] \begin{bmatrix} B_{cap,1,1} & B_{cap,1,2} & \ldots & B_{cap,1,h} \\ B_{cap,2,1} & B_{cap,2,2} & \ldots & B_{cap,2,h} \\ \vdots & \vdots & \ddots & \vdots \\ B_{cap,p,1} & B_{cap,p,2} & \ldots & B_{cap,p,h} \end{bmatrix}$$

where each element of the array $C_{cap}$ includes a capital cost value $C_{cap,k}$ for a particular capital purchase k=1 . . . p and each element of the matrix $B_{cap}$ includes a binary decision variable for a particular capital purchase k=1 . . . p at a particular time step i=1 . . . h of the optimization period.

Still referring to FIG. 10, process 1000 is shown to include optimizing an objective function including the costs Cost$_{op}$, Cost$_{main,i}$ and Cost$_{cap}$ to determine an optimal maintenance strategy for the building equipment (step 1016). Step 1016 can include generating the objective function J by summing the operational cost term, the maintenance cost term, and the capital cost term formulated in steps 1010-1014. One example of an objective function which can be generated in step 1016 is shown in the following equation:

$$J = \sum_{i=1}^{h} C_{op,i} P_{op,i} \Delta t + \sum_{i=1}^{h} C_{main,i} B_{main,i} + \sum_{i=1}^{h} C_{cap,i} P_{cap,i}$$

where $C_{op,i}$ is the cost per unit of energy (e.g., $/kWh) consumed by connected equipment 610 at time step i of the optimization period, $P_{op,i}$ is the power consumption (e.g., kW) of connected equipment 610 at time step i, Δt is the duration of each time step i, $C_{main,i}$ is the cost of maintenance performed on connected equipment 610 at time step i, $B_{main,i}$ is a binary variable that indicates whether the maintenance is performed, $C_{cap,i}$ is the capital cost of purchasing a new device of connected equipment 610 at time step i, $B_{cap,i}$ is a binary variable that indicates whether the new device is purchased, and h is the duration of the horizon or optimization period over which the optimization is performed.

Another example of an objective function which can be generated in step 1016 is shown in the following equation:

$$J = C_{op} P_{op} \Delta t + C_{main} B_{main} + C_{cap} B_{cap}$$

$$J = [C_{op,1} \ C_{op,2} \ \ldots \ C_{op,h}][P_{op,1} \ P_{op,2} \ \ldots \ P_{op,h}]^T \Delta t +$$

$$[C_{main,1} \ C_{main,2} \ \ldots \ C_{main,m}] \begin{bmatrix} B_{main,1,1} & B_{main,1,2} & \ldots & B_{main,1,h} \\ B_{main,2,1} & B_{main,2,2} & \ldots & B_{main,2,h} \\ \vdots & \vdots & \ddots & \vdots \\ B_{main,m,1} & B_{main,m,2} & \ldots & B_{main,m,h} \end{bmatrix} +$$

$$[C_{cap,1} \ C_{cap,2} \ \ldots \ C_{cap,p}] \begin{bmatrix} B_{cap,1,1} & B_{cap,1,2} & \ldots & B_{cap,1,h} \\ B_{cap,2,1} & B_{cap,2,2} & \ldots & B_{cap,2,h} \\ \vdots & \vdots & \ddots & \vdots \\ B_{cap,m,1} & B_{cap,m,2} & \ldots & B_{cap,p,h} \end{bmatrix}$$

where the array $C_{op}$ includes an energy cost value $C_{op,i}$ for a particular time step i=1 . . . h of the optimization period, the array $P_{op}$ includes a power consumption value $P_{op,i}$ for a particular time step i=1 . . . h of the optimization period, each element of the array $C_{main}$ includes a maintenance cost value $C_{main,j}$ for a particular maintenance activity j=1 . . . m, each element of the matrix $B_{main}$ includes a binary decision variable for a particular maintenance activity j=1 . . . m at a particular time step i=1 . . . h of the optimization period, each element of the array $C_{cap}$ includes a capital cost value $C_{cap,k}$ for a particular capital purchase k=1 . . . p, and each element of the matrix $B_{cap}$ includes a binary decision variable for a particular capital purchase k=1 . . . p at a particular time step i=1 . . . h of the optimization period.

Step 1016 can include imposing constraints on one or more variables or parameters in the objective function J. The constraints can include any of the equations or relationships described with reference to operational cost predictor 910, maintenance cost predictor 920, and capital cost predictor 930. For example, step 1016 can include imposing a constraint which defines the power consumption values $P_{op,i}$ for one or more devices of the building equipment as a function of the ideal power consumption $P_{ideal,i}$ and the efficiency $\eta_i$ (e.g., $P_{op,i} = P_{ideal,i}/h$). Step 1016 can include imposing a constraint which defines the efficiency $\eta_i$ as a function of the binary decision variables $B_{main,i}$ and $B_{cap,i}$, as described with reference to efficiency updater 911 and efficiency degrader 913. Step 1016 can include imposing a constraint which constrains the binary decision variables $B_{main,i}$ and $B_{cap,i}$ to a value of either zero or one and defines the binary decision variables $B_{main,i}$ and $B_{cap,i}$ as a function of the reliability Reliability$_i$ of connected equipment 610, as described with reference to maintenance estimator 922 and purchase estimator 932. Step 1016 can include imposing a constraint which defines the reliability Reliability$_i$ of connected equipment 610 as a function of the equipment performance information (e.g., operating conditions, run hours, etc.) as described with reference to reliability estimators 924 and 934.

Step 1016 can include optimizing the objective function J to determine the optimal values of the binary decision variables $B_{main,i}$ and $B_{cap,i}$ over the duration of the optimization period. Step 1016 can include using any of a variety of optimization techniques to formulate and optimize the objective function J. For example, step 1016 can include using integer programming, mixed integer linear programming, stochastic optimization, convex programming, dynamic programming, or any other optimization technique to formulate the objective function J, define the constraints, and perform the optimization. These and other optimization techniques are known in the art and will not be described in detail here.

In some embodiments, step 1016 includes using mixed integer stochastic optimization to optimize the objective function J. In mixed integer stochastic optimization, some of the variables in the objective function J can be defined as functions of random variables or probabilistic variables. For example, the decision variables $B_{main,i}$ and $B_{cap,i}$ can be defined as binary variables that have probabilistic values based on the reliability of the building equipment. Low reliability values may increase the probability that the binary decision variables $B_{main,i}$ and $B_{cap,i}$ will have a value of one (e.g., $B_{main,i}=1$ and $B_{cap,i}=1$), whereas high reliability values may increase the probability that the binary decision variables $B_{main,i}$ and $B_{cap,i}$ will have a value of zero (e.g., $B_{main,i}=0$ and $B_{cap,i}=0$). In some embodiments, step 1016 includes using a mixed integer stochastic technique to define the values of the binary decision variables $B_{main,i}$ and $B_{cap,i}$ as a probabilistic function of the reliability of the building equipment.

As discussed above, the objective function J may represent the predicted cost of operating, maintaining, and purchasing one or more devices of the building equipment over the duration of the optimization period. In some embodiments, step 1016 includes projecting these costs back to a particular point in time (e.g., the current time) to determine the net present value (NPV) of the one or more devices of the building equipment at a particular point in time. For example, step 1016 can include projecting each of the costs in objective function J back to the current time using the following equation:

$$NPV_{cost} = \sum_{i=1}^{h} \frac{Cost_i}{(1+r)^i}$$

where r is the interest rate, $Cost_i$ is the cost incurred during time step i of the optimization period, and $NPV_{cost}$ is the net present value (i.e., the present cost) of the total costs incurred over the duration of the optimization period. In some embodiments, step 1016 includes optimizing the net present value $NPV_{cost}$ to determine the NPV of the building equipment at a particular point in time.

As discussed above, one or more variables or parameters in the objective function J can be updated dynamically based on closed-loop feedback from the building equipment. For example, the equipment performance information received from the building equipment can be used to update the reliability and/or the efficiency of the building equipment. Step 1016 can include optimizing the objective function J periodically (e.g., once per day, once per week, once per month, etc.) to dynamically update the predicted cost and/or the net present value $NPV_{cost}$ based on the closed-loop feedback from the building equipment.

In some embodiments, step 1016 include generating optimization results. The optimization results may include the optimal values of the decision variables in the objective function J for each time step i in the optimization period. The optimization results include operating decisions, equipment maintenance decisions, and/or equipment purchase decisions for each device of the building equipment. In some embodiments, the optimization results optimize the economic value of operating, maintaining, and purchasing the building equipment over the duration of the optimization period. In some embodiments, the optimization results optimize the net present value of one or more devices of the building equipment at a particular point in time. The optimization results may cause BMS 606 to activate, deactivate, or adjust a setpoint for the building equipment in order to achieve the optimal values of the decision variables specified in the optimization results.

In some embodiments, process 1000 includes using the optimization results to generate equipment purchase and maintenance recommendations. The equipment purchase and maintenance recommendations may be based on the optimal values for the binary decision variables $B_{main,i}$ and $B_{cap,i}$ determined by optimizing the objective function J. For example, a value of $B_{main,25}=1$ for a particular device of the building equipment may indicate that maintenance should be performed on that device at the $25^{th}$ time step of the optimization period, whereas a value of $B_{main,25}=0$ may indicate that the maintenance should not be performed at that time step. Similarly, a value of $B_{cap,25}=1$ may indicate that a new device of the building equipment should be purchased at the $25^{th}$ time step of the optimization period, whereas a value of $B_{cap,25}=0$ may indicate that the new device should not be purchased at that time step.

In some embodiments, the equipment purchase and maintenance recommendations are provided to building 10 (e.g., to BMS 606) and/or to client devices 448. An operator or building owner can use the equipment purchase and maintenance recommendations to assess the costs and benefits of performing maintenance and purchasing new devices. In some embodiments, the equipment purchase and maintenance recommendations are provided to service technicians 620. Service technicians 620 can use the equipment purchase and maintenance recommendations to determine when customers should be contacted to perform service or replace equipment.

Still referring to FIG. 10, process 1000 is shown to include updating the efficiency and the reliability of the building equipment based on the optimal maintenance strategy (step 1018). In some embodiments, step 1018 includes updating the efficiency $\eta_i$ for one or more time steps during the optimization period to account for increases in the efficiency $\eta$ of the building equipment that will result from performing maintenance on the building equipment or purchasing new equipment to replace or supplement one or more devices of the building equipment. The time steps i at which the efficiency $\eta_i$ is updated may correspond to the predicted time steps at which the maintenance will be performed or the equipment will replaced. The predicted time steps at which maintenance will be performed on the building equipment may be defined by the values of the binary decision variables $B_{main,i}$ in the objective function J. Similarly, the predicted time steps at which the building equipment will be replaced may be defined by the values of the binary decision variables $B_{cap,i}$ in the objective function J.

Step 1018 can include resetting the efficiency $\eta_i$ for a given time step i if the binary decision variables $B_{main,i}$ and $B_{cap,i}$ indicate that maintenance will be performed at that time step and/or new equipment will be purchased at that time step (i.e., $B_{main,i}=1$ and/or $B_{cap,i}=1$). For example, if $B_{main,i}=1$, step 1018 can include resetting the value of $\eta_i$ to $\eta_{main}$, where $\eta_{main}$ is the efficiency value that is expected to result from the maintenance performed at time step i. Similarly, if $B_{cap,i}=1$, step 1018 can include resetting the value of $\eta_i$ to $\eta_{cap}$, where $\eta_{cap}$ is the efficiency value that is expected to result from purchasing a new device to supplement or replace one or more devices of the building equipment performed at time step i. Step 1018 can include resetting the efficiency $\eta_i$ for one or more time steps while the optimization is being performed (e.g., with each iteration of the optimization) based on the values of binary decision variables $B_{main,i}$ and $B_{cap,i}$.

Step 1018 may include determining the amount of time $\Delta t_{main,i}$ that has elapsed since maintenance was last performed on the building equipment based on the values of the binary decision variables $B_{main,i}$. For each time step i, step 1018 can examine the corresponding values of $B_{main}$ at time step i and each previous time step (e.g., time steps i−1, i−2, ..., 1). Step 1018 can include calculating the value of $\Delta t_{main,i}$ by subtracting the time at which maintenance was last performed (i.e., the most recent time at which $B_{main,i}=1$) from the time associated with time step i. A long amount of time $\Delta t_{main,i}$ since maintenance was last performed may result in a lower reliability, whereas a short amount of time since maintenance was last performed may result in a higher reliability.

Similarly, step 1018 may include determining the amount of time $\Delta t_{cap,i}$ that has elapsed since the building equipment were purchased or installed based on the values of the binary decision variables $B_{cap,i}$. For each time step i, step 1018 can examine the corresponding values of $B_{cap}$ at time step i and each previous time step (e.g., time steps i−1, i−2, ..., 1). Step 1018 can include calculating the value of $\Delta t_{cap,i}$ by subtracting the time at which the building equipment were purchased or installed (i.e., the most recent time at which $B_{cap,i}=1$) from the time associated with time step i. A long amount of time $\Delta t_{cap,i}$ since the building equipment were purchased or installed may result in a lower reliability, whereas a short amount of time since the building equipment were purchased or installed may result in a higher reliability Some maintenance activities may be more expensive than other. However, different types of maintenance activities may result in different levels of improvement to the efficiency $\eta$ and/or the reliability of the building equipment. For example, merely changing the oil in a chiller may result in a minor improvement in efficiency $\eta$ and/or a minor improvement in reliability, whereas completely disassembling the chiller and cleaning all of the chilled water tubes may result in a significantly greater improvement to the efficiency $\eta$ and/or the reliability of the building equipment. Accordingly, multiple different levels of post-maintenance efficiency (i.e., $\eta_{main}$) and post-maintenance reliability (i.e., Reliability$_{main}$) may exist. Each level of $\eta_{main}$ and Reliability$_{main}$ may correspond to a different type of maintenance activity.

In some embodiments, step 1018 includes identifying the maintenance activity associated with each binary decision variable $B_{main,j,i}$ and resets the efficiency $\eta$ to the corresponding post-maintenance efficiency level $\eta_{main,j}$ if $B_{main,j,i}=1$. Similarly, step 1018 may include identifying the maintenance activity associated with each binary decision variable $B_{main,j,i}$ and can reset the reliability to the corresponding post-maintenance reliability level Reliability$_{main,j}$ if $B_{main,j,i}=1$.

Some capital purchases may be more expensive than other. However, different types of capital purchases may result in different levels of improvement to the efficiency $\eta$ and/or the reliability of the building equipment. For example, purchasing a new sensor to replace an existing sensor may result in a minor improvement in efficiency $\eta$ and/or a minor improvement in reliability, whereas purchasing a new chiller and control system may result in a significantly greater improvement to the efficiency $\eta$ and/or the reliability of the building equipment. Accordingly, multiple different levels of post-purchase efficiency (i.e., $\eta_{cap}$) and post-purchase reliability (i.e., Reliability$_{cap}$) may exist. Each level of $\eta_{cap}$ and Reliability$_{cap}$ may correspond to a different type of capital purchase.

In some embodiments, step 1018 includes identifying the capital purchase associated with each binary decision variable $B_{main,k,i}$ and resetting the efficiency $\eta$ to the corresponding post-purchase efficiency level $\eta_{cap,k}$ if $B_{cap,k,i}=1$. Similarly, step 1018 may include identifying the capital purchase associated with each binary decision variable $B_{cap,k,i}$ and can resetting the reliability to the corresponding post-purchase reliability level Reliability$_{cap,k}$ if $B_{main,k,i}=1$.

Model Predictive Maintenance with Artificial Intelligence Functionality

Overview

Referring generally to FIGS. 11A-19, systems and methods for performing MPM for building equipment of a building (e.g., building 10) are shown, according to some embodiments. Performing MPM for the building can allow for generation of maintenance, replacement, and/or upgrade recommendations and decisions. Maintenance of building equipment can refer to various repairs and other activities that can be performed on building equipment to lower a degradation state of the building equipment. Replacement of building equipment can refer to switching out building equipment with new versions of the building equipment. For example, an indoor unit (IDU) of a variable refrigerant flow (VRF) system can be replaced after a degradation state of the IDU exceeds some threshold value as to reset the degradation state of the IDU to an original value (e.g., 0) when the IDU was first installed. Upgrading building equipment can refer to purchasing improved building devices for the building that are different from those currently installed. For example, upgrading a heating unit may include installing a new heating unit made by a different company as compared to the currently installed heating unit. In some embodiments, replacing and upgrading building equipment are considered together rather than separately as described above.

In a MPM process, degradation states of the building equipment can be estimated based on various measurements taken during operation of the building equipment. The degradation state of the building equipment can be defined for different building devices of the building equipment by various parameters such as, for example, an amount of resources (e.g., energy, water, etc.) the building equipment consumes during a time period, an amount of time it takes the building equipment to affect a particular change in an environmental condition of the building, a refrigerant charge level, an air flow restriction, power consumption of a compressor, etc. In some embodiments, the degradation state is divided up into elements. In particular, there may be a degradation state associated with maintenance decisions, a degradation state associated with system replacement, and/or a degradation state associated with system upgrades.

In some embodiments, artificial intelligence (AI) is integrated with the MPM system to learn how to properly estimate degradation states of the building equipment. The AI can learn mappings between degradation states and parameters of a power consumption model that can be used to predict how the building equipment consumes power over time. If the MPM system with AI is operating online, outputs of the AI can be adjusted if the parameters of the power consumption model are over estimated and/or under estimated.

MPM has emerged as an effective approach for enhancing asset reliability and availability by considering a multi-objective function including operational and maintenance (O&M) costs over a planning horizon. Reliability assessment of the complex dynamic systems can provide MPM with high predictive accuracy. Since such a dynamic system may operate under variable operational and environmental conditions, precisely estimating the reliability of an asset through historical information of similar systems can be complex and time consuming. In this way, intrinsic properties for dynamic systems can evolve and change over time. Many traditional methods of reliability estimation highly depend on the failure-time or lifetime data which are not always available, obtainable, and/or trustable. On the other hand, it may not be reasonable to collect the failure or lifetime data through an accelerated life test or censored approaches for the dynamic systems which are highly reliable.

Traditional reliability algorithms can be based on recorded lifetime data and an amount of time until physical failure of a given unit or system. Traditional methods of reliability assessment can rely on large sampling experiments in order to obtain insight regarding the failure time of the same unit. The main purpose of these algorithms can be analyzing the lifetime data in order to reach an insight into how the system may fail in the future. Lifetime data can be obtained by 1) the history of the failures in real applications, 2) results of accelerated testing in laboratories, or 3) standards for the common units. In some embodiments, obtaining information regarding the time to physical failure is not always possible. In particular, products are becoming more reliable due to technological developments. As a result, only a few or even zero failures may occur during the monitoring phases, thereby leading to a lack of valuable information. Furthermore, it should be noted that some of the experiments can degrade the units. Therefore, obtaining the information regarding the time to physical failure may not always be an optimal approach.

It should be noted that systems may inevitably deteriorate over time with dissimilar rates of deterioration. In some embodiments, the rates of deterioration may not be the same even for similar systems with a certain load due to distinct environmental factors in which the systems operate. Most general degradation models are mainly introduced for systems with a constant degradation rate, which cannot be applied for complex systems that face a time-varying degradation process. Furthermore, obtaining a degradation observation and evolution of the observations over time is still one of the practical challenges for complex systems.

In contrast to the failure data, a robust method of reliability assessment that takes into account actual conditions of the system during the operation time can ensure MPM decisions are accurate. This methodology can act as an important part of the MPM system which can significantly affect further maintenance and replacement decisions. In some embodiments, this methodology is based on condition-based maintenance (CBM) rather than the lifetime analyses. Reliability estimates can significantly affect maintenance and replacement decisions derived by an MPM optimization problem. Reliability and probability of failure (PoF) estimates are one of the main elements of the MPM objective function. Intuitively, the ability of a system to consistently perform its intended or required functions over a period of time given certain operational and environmental conditions can highly affect a recommended maintenance and replacement schedule. The MPM optimization problem can seek to constantly trigger an optimum maintenance dispatch to minimize the unscheduled downtime which can lead to optimizing the reliability and availability of the system.

Various studies can be conducted in order to enhance real-time reliability estimation and evaluation of complex dynamic systems. Most of the methodologies can be categorized into two categories as 1) regression-based analysis and 2) time-series analysis which performance data is available or obtainable. Degradation estimates can be considered as a key performance index (KPI) such that the predictive models can estimate a KPI value over time. Degradation-based algorithms may rely on an operational and environmental status of components of the system. Information regarding these explanatory variables can be obtained by collecting sensor measurements and/or from simulation results. The degradation models can be projected into the future in order to obtain an estimate of the failure time.

Degradation-based models can consider the failure when either an observed or a projected degradation profile hits a threshold value for the first time. Most of the degradation-based reliability algorithms consider a predetermined value for the threshold limit. The threshold can be assumed to be a deterministic fixed value. Failure time, $T_f$, can be defined as the first time at which the degradation profile hits the threshold. In some embodiments, a distribution function of the failure times can be determined. Consequently, a probability of failure and reliability can be estimated based on a statistical distribution function of failure times. In some embodiments, the probability of failure is defined as a probability that a degradation state is greater than or equal to a threshold value. In this case, a density function of a new random variable can be derived analytically, which allows for calculating the probability of failure analytically and can be used by an optimizer (e.g., high level optimizer 832). It should be considered that the reliability estimates, obtained by the statistical distribution of the failure time, may not be able to accurately describe the behavior of a dynamic system since each system may deteriorate differently. Therefore, a novel robust methodology is desirable in order to analytically estimate the reliability based on the actual condition of the assets.

Determining an overall degradation profile can be difficult. For this reason, the degradation profile can be projected into the future with respect to observed degradation estimates and degradation models. In this case, the distribution of degradation may have a larger variance as the prediction time is farther in time compared with a current time. It should be considered that the obtained distribution function of the lifetime based on the degradation methods is based on a unique definition of failure. In degradation-based analysis, failure can be considered to occur if a degradation estimate hits the threshold for the first time. Both of these methodologies can depend on multiple degradation profiles over the time which might not be always available or accurately possible to be estimated. Furthermore, since the reliability assessment is based on the statistical distribution, these methodologies are not robust enough to estimate the reliability based on an actual condition of the assets. Although these approaches are based on the degradation profiles, the approaches still may rely on statistical inference which makes them unable to accurately describe an actual condition of similar assets. In this way, the results of these algorithms may lead to unrealistic judgments regarding a future condition of the assets and ultimately, suboptimal maintenance and replacement schedules.

A main feature of an optimum MPM strategy is an ability to predict the future condition of units (e.g., building equipment) or systems. To measure a probability of failure and reliability, judgments can be made about what the units or systems might be like in the future. Reliability can be, therefore, an extension of quality into a time domain. Reliability of a system can be defined as the likelihood that the system will perform required functions under the stated conditions for a specified period of time. These operational or environmental conditions may not always be controllable or predictable in real-world applications. The lifetime of the assets can be determined given specific working conditions that can be considered as nominal values which have been determined by design engineers during design, manufacturing, and test phases of the assets. Consequently, a remaining useful life (RUL) of each asset can be considered a random variable.

Reliability analysis can incorporate activities to identify potential failure modes and mechanisms, to make reliability predictions, and to quantify risks for the critical components in order to optimize life-cycle costs. Reliability engineering tries to ensure that a unit is reliable during operation in specific conditions by avoiding any failure. In other words, the purpose of reliability engineering is maximizing reliability while minimizing failure effects. As such, the purpose of reliability analysis may not simply be to describe how, when, and why systems fail, but rather to use information about failures to support decisions that improve the system's quality, safety and performance to reduce costs. Said aspect is particularly important in areas where failures have serious consequences. For instance, if a component of a variable refrigerant flow (VRF) system fails, then cooling or heating would not be available, thereby resulting in occupant discomfort. Consequences of failure events can be more concerning for commercial buildings due to a large number of the people affected by a shutdown/failure. As a result, a robust methodology for estimating reliability is an essential part of MPM.

As described in greater detail below, a novel robust methodology to analytically obtain reliability estimates based on state space models (SSMs) is presented. In other words, an innovative analytical solution technique to estimate dynamic reliability based on the SSMs of degradation is described. In this way, an analytical approach to estimating an age and state-dependent reliability and probability of failure for degrading systems which experience a stochastic degradation process with known properties is described. It should be noted that an effect of the age or wear-out mechanism is considered embedded inside estimates of the rate of events. Furthermore, it can be assumed that for each deteriorating system, a single degradation estimate, which can be obtained by analyzing various dependent variables or KPIs, is available. It can also be assumed that uncertainty in defining the failure threshold can be improved by considering the threshold as a random variable which follows a normal distribution function.

Benefits of Model Predictive Maintenance

Figure 11A:
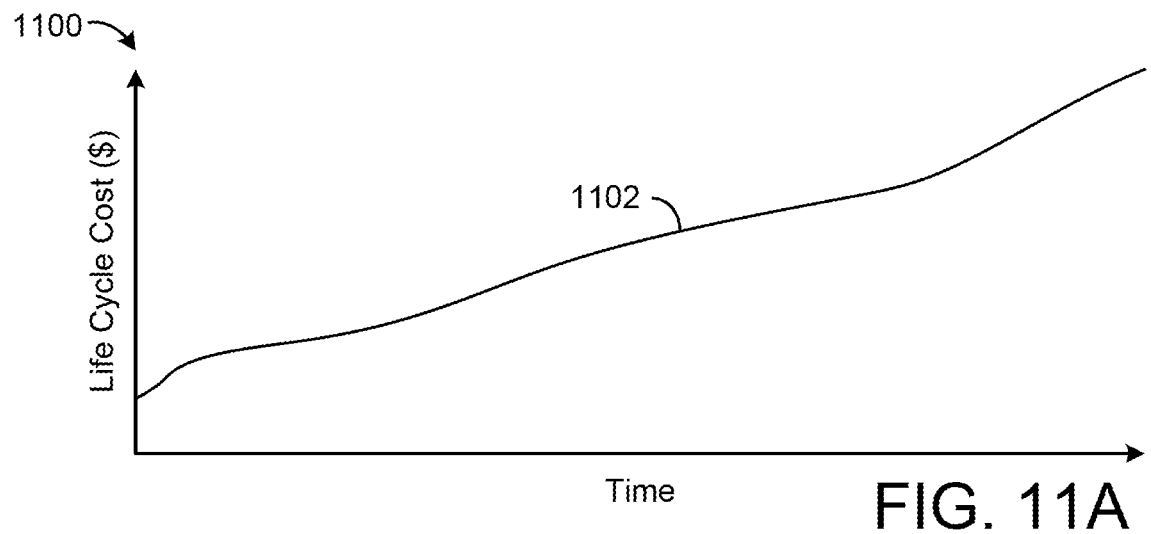
FIG. 11A is a graph illustrating experimental values of $Q_{HVAC}$ used as training data for a neural network, according to some embodiments.
Figure 11B:
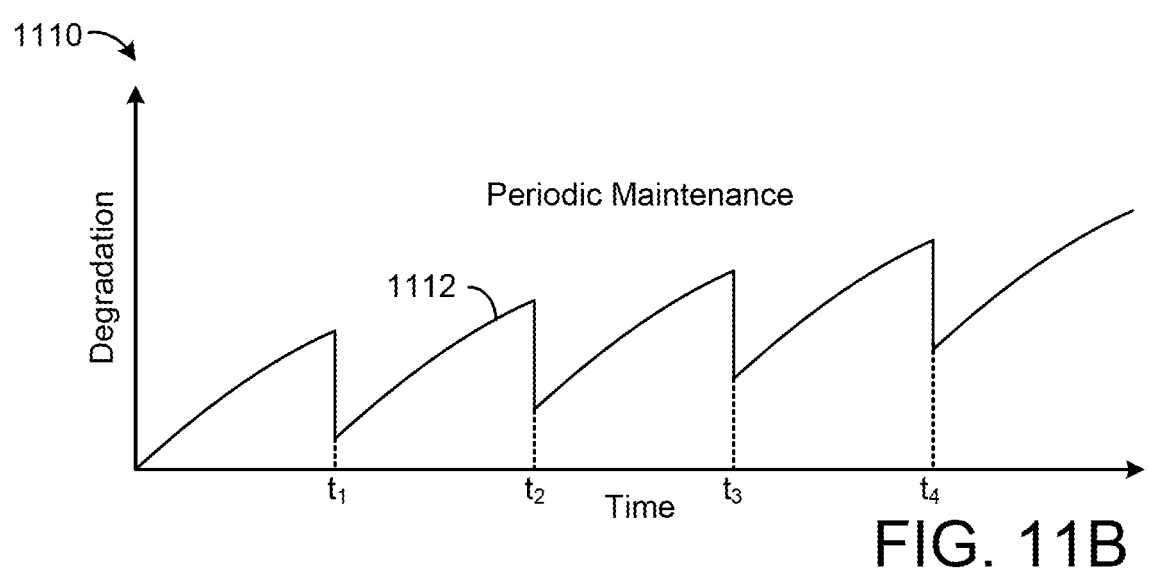
FIG. 11B is a graph illustrating how a degradation state of building equipment is affected based on a periodic maintenance strategy, according to some embodiments.
Figure 11C:
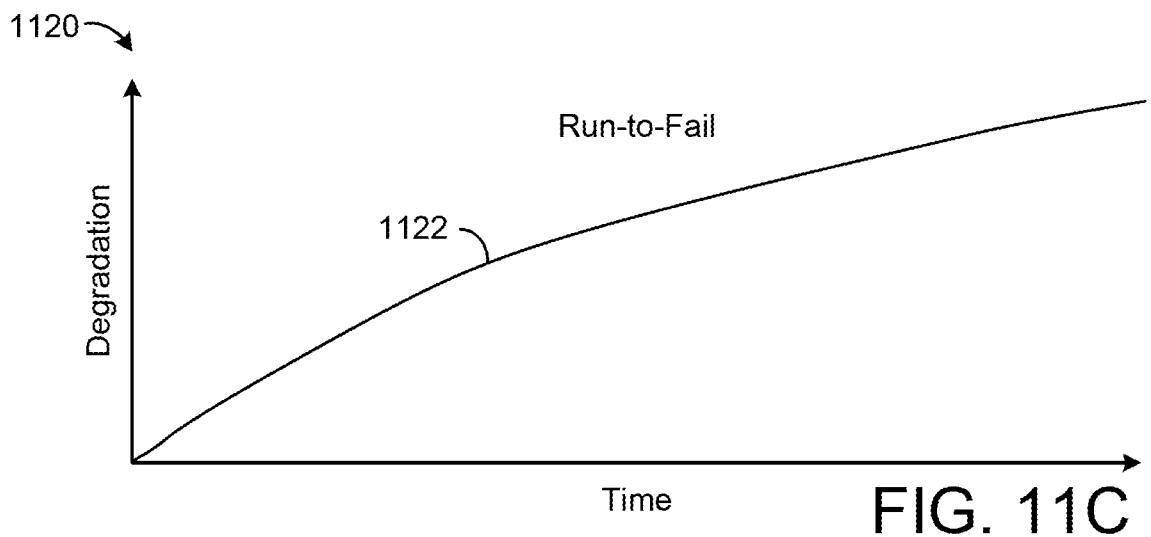
FIG. 11C is a graph illustrating how a degradation state of building equipment is affected based on a run-to-fail maintenance strategy, according to some embodiments.

Referring now to FIGS. 11A-11C, several graphs 1100-1120 illustrating disadvantages of traditional maintenance strategies are shown, according to some embodiments. Traditional maintenance strategies can result in increased costs over a time horizon, unnecessary upkeep of the building equipment, and/or repairing or replacing building equipment at suboptimal times. Examples of traditional maintenance strategies include periodic maintenance, run-to-fail, etc. Periodic maintenance may cause building equipment to have maintenance performed on a schedule (e.g., once per month, once per year, etc.). Depending on degradation of the building equipment, periodic maintenance may result in the building equipment being maintenance too much or not enough to optimize (e.g., minimize) costs. Likewise, a run-to-fail strategy may result in costly repairs if the building equipment fails completely without being maintained.

Referring particularly to FIG. 11A, a graph 1100 illustrating life cycle costs of operating and maintaining building equipment is shown, according to some embodiments. Graph 1100 is shown to include a series 1102 illustrating how cost can increase over time for a traditional maintenance strategy. As shown in graph 1100, series 1102 increases dramatically over a time period. The drastic increase of series 1102 may be due to increased operational costs as a result of the building equipment degrading, too many maintenance/replacement activities being performed, etc.

Referring now to FIG. 11B, a graph 1110 illustrating how a degradation state of building equipment is affected by a periodic maintenance strategy is shown, according to some embodiments. In a periodic maintenance strategy, the building equipment may have maintenance/replacement performed at set intervals (e.g., every week, every month, etc.). Graph 1110 is shown to include a series 1112 illustrating the degradation state of the building equipment over time. The degradation state increases over time as the equipment is used, but is reset or decreased when maintenance occurs or when the equipment is replaced. The times at which maintenance is performed or the equipment is replaced are shown as $t_1$, $t_2$, $t_3$, and $t_4$. As such, the degradation state of the building equipment is shown to increase up to the time when maintenance/replacement occurs and decreases as a result of the maintenance/replacement. Typically, periodic maintenance may not be able to restore the equipment to new condition (i.e., zero degradation), which is why the post-maintenance degradation state is still higher than zero. While periodic maintenance can keep the degradation state of the building equipment low, periodic maintenance may result in too many maintenance/replacement activities being performed if the periodic maintenance interval is too short, thus incurring unnecessary maintenance costs. Additionally, periodic maintenance may not keep the degradation state of the building equipment low enough if the periodic maintenance interval is too long, thereby resulting in additional operating costs over time.

Referring now to FIG. 11C, a graph 1120 illustrating how a degradation state of building equipment is affected based on a run-to-fail maintenance strategy is shown, according to some embodiments. Graph 1120 is shown to include a series 1122 illustrating how the degradation state of the building equipment continues to increase over time if the building equipment never has maintenance/replacement performed. As compared to series 1112 as described with reference to FIG. 11B, series 1122 does not decrease as no maintenance/replacement activities are performed on the building equipment, thus leaving the degradation state of the building equipment to continuously increase. Inevitably, the degradation state indicated by series 1122 a threshold at which the equipment fails or becomes too degraded to use and is thus completely or effectively inoperable. Equipment failure can be described as a point where operating the building equipment is either impossible and/or results in high operating costs as compared to normal operation of the building equipment at a lower degradation state. As such, it should be appreciated that allowing the degradation state of the building equipment to follow series 1120 may not be optimal and can result in unnecessary costs.

Figure 12:
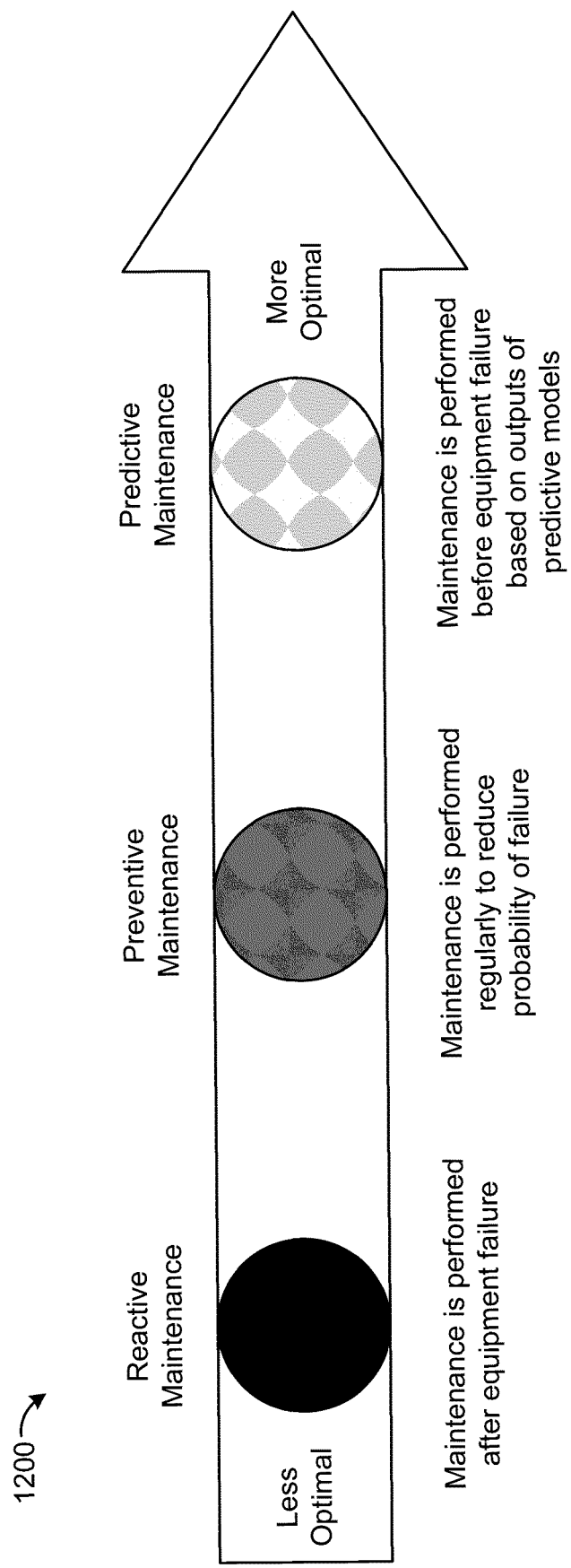
FIG. 12 is an illustration of a progression of maintenance strategies, according to some embodiments.

Referring now to FIG. 12, an illustration 1200 of a progression of maintenance strategies is shown, according to some embodiments. Illustration 1200 is shown to include reactive maintenance (e.g., run-to-fail) as a least optimal maintenance strategy for building equipment. In a reactive maintenance strategy, building equipment may only receive maintenance/replacement after an equipment failure. As described above with reference to FIG. 11C, performing maintenance/replacement after equipment failure may result in high operational costs due to a high degradation state of the building equipment and due to a high cost of performing maintenance/replacement on failed building equipment.

Illustration 1200 is also shown to include preventive maintenance as a possible maintenance strategy for the building equipment. In general, a preventive maintenance strategy can provide more cost savings as compared to reactive maintenance strategy (unless maintenance/replacement is performed extremely frequently) as the probability of failure of the building equipment can be kept at a lower value. In some embodiments, the probability of failure is estimated based on a degradation state of the building equipment. By performing maintenance/replacement routinely, the degradation state of the building equipment can be routinely improved (e.g., reduced) such that probability of failure of the building equipment is reduced. However, preventive maintenance may not result in maintenance/replacement occurring at optimal times and therefore may not be a best maintenance strategy.

Illustration 1200 is also shown to include predictive maintenance as a possible maintenance strategy for building equipment. Predictive maintenance can utilize predictive models of building equipment to estimate an optimal or near-optimal time to perform maintenance/replacement on the building equipment. Unlike preventive maintenance, predictive maintenance may not require the building equipment to be maintained on a regular basis. Instead, predictive maintenance can be used to determine a recommended time to perform maintenance/replacement of the building equipment such that the cost of the maintenance/replacement and costs related to operating the building equipment are optimized (e.g., reduced). In this way, predictive maintenance can result in lower costs as compared to preventive and reactive maintenance.

Model predictive maintenance (MPM) is a type of predictive maintenance strategy for building equipment. In some embodiments, MPM is a maintenance strategy which minimizes a likelihood of failure through monitoring performance and condition of the building equipment during normal operational time. MPM algorithms may seek to determine optimized future maintenance and replacement schedules based on the condition of an in-service component or system. As maintenance activities are performed when warranted by algorithms, the MPM approach can result in cost savings over a time horizon.

MPM can be considered a type of condition based maintenance (CBM) which carries out maintenance/replacement activities as suggested by degradation estimators of an asset or system. In some embodiments, a primary purpose of MPM is providing an optimized dispatch of preventive and corrective maintenance to prevent unexpected failure of building equipment. An efficient MPM strategy can be first predict when equipment failure could occur based on KPIs, followed by preventing the failure through corrective maintenance. Condition monitoring may be necessary for MPM to be successfully implemented as to ensure optimized usage of assets. High penetration of smart devices and Internet of Things (IoT) principles can bring condition monitoring strategies to continuous real-time monitoring. IoT, machine learning (ML), cloud computing, and big data analytics can assist in implementation of MPM by providing more information regarding conditions of assets. In this way, MPM can provide benefits from a cost perspective, minimize unexpected downtime, as well as maximize lifespan, availability, reliability, and employee productivity. While implementing MPM may take a large amount of time and budget to develop, implement, and validate the algorithms, once fully implemented the cost savings can help offset any initial costs associated with integrating MPM for a building. MPM algorithms can be applied in many applications which data can be collected for selected KPIs.

Model Predictive Maintenance System With Degradation Impact Model

Figure 13:
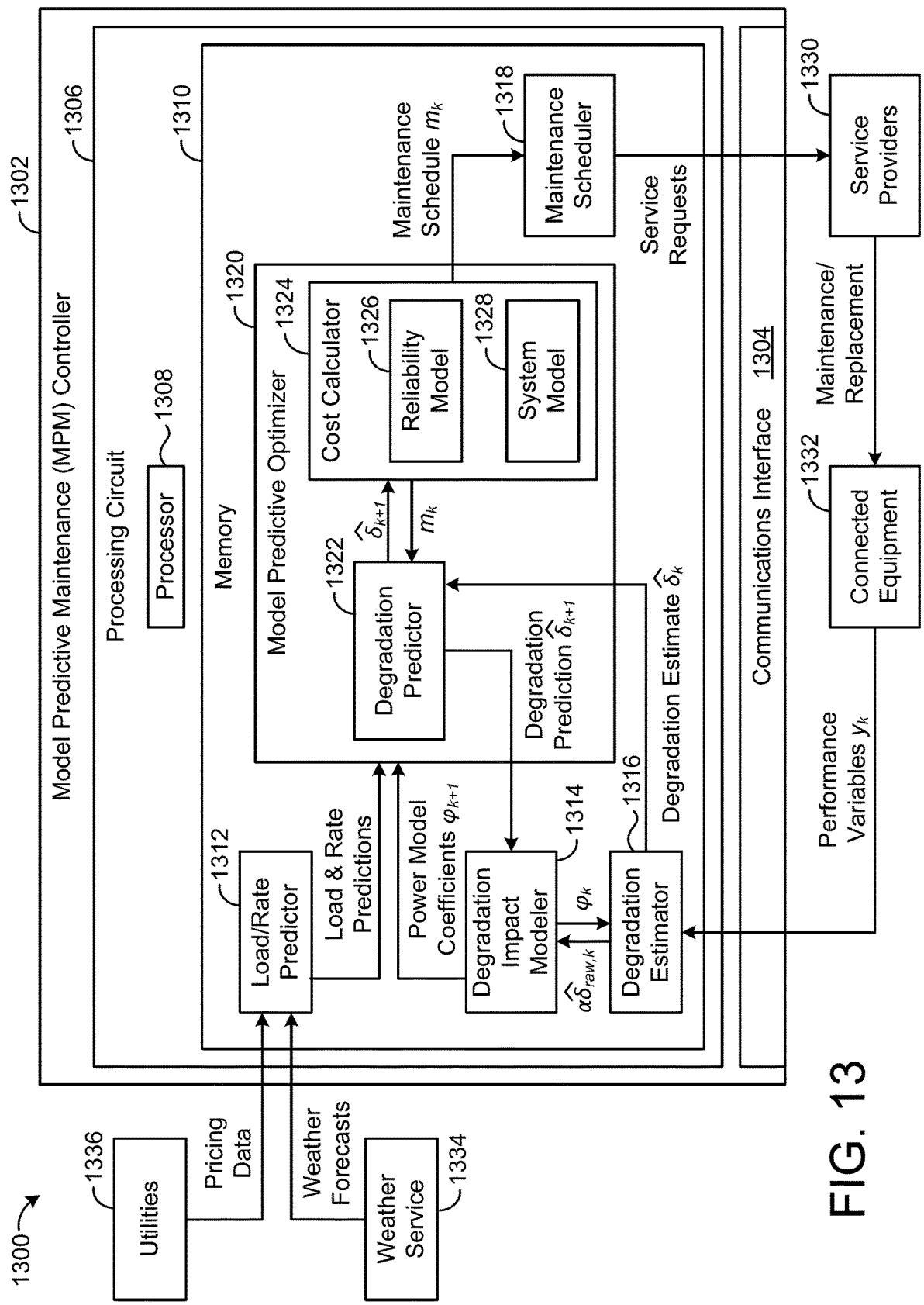
FIG. 13 is another block diagram illustrating the MPM system of FIG. 6 in greater detail, according to some embodiments.

Referring now to FIG. 13, a model predictive maintenance (MPM) system 1300 is shown, according to some embodiments. In some embodiments, one or more of the components of MPM system 1300 may be the same as or similar to the corresponding components of building system 600 and/or MPM system 602 as described with reference to FIGS. 6-10. The components of MPM system 1300 are given new reference numbers in FIG. 13 for ease of explanation. However, it should be understood that MPM system 1300 may be integrated into building system 600 in the same manner as MPM system 602 and may perform some or all of the functions of MPM system 602 as described with reference to FIGS. 6-10.

MPM system 1300 is shown to include a MPM controller 1302, service providers 1330, connected equipment 1332, a weather service 1334, and utilities 1336. Connected equipment 1332 may be the same as or similar to connected equipment 610, as described with reference to FIGS. 6 and 8. For example, connected equipment 1332 may include one or more chillers, boilers, air handling units, batteries, valves, actuators, thermal energy storage tanks, fans, dampers, or any other type of equipment that can be used to perform the various functions of a building or campus. Connected equipment 1332 may include sensors, local controllers, and/or communications electronics capable of providing performance variables $y_k$ to MPM controller 1302.

The performance variables $y_k$ can include measurements or other performance data characterizing the operating performance of connected equipment 1332. For example, the performance variables $y_k$ may include an amount of electricity consumed by connected equipment 1332, an amount of other resources (e.g., water, natural gas, etc.) consumed by connected equipment 1332, an amount of time it takes connected equipment 1332 to affect a desired change in a zone of the building, an operating efficiency of connected equipment 1332 (e.g., a ratio of resources produced to resources consumed, a coefficient of performance, etc.), a number of run hours of connected equipment, or any other variable that can be used to estimate the degradation state of connected equipment 1332. The performance variables $y_k$ can be provided to MPM controller 1302 and used by MPM controller 1302 to estimate a degradation state of connected equipment 1332. In some embodiments, the variable $y_k$ is a vector that includes values for one or more performance variables at time step k.

Service providers 1330 may include any entity capable of performing maintenance on connected equipment 1332, repairing connected equipment 1332, replacing connected equipment 1332, or otherwise performing actions in accordance with the maintenance schedule $m_k$ generated by MPM controller 1302. For example, service providers 1330 may include maintenance personnel who work within the building or campus, external service providers such as contractors, service technicians, or any other person or entity capable of executing the maintenance activities specified by the maintenance schedule $m_k$. Service providers 1330 may receive service requests from MPM controller 1302 and execute the service requests by performing maintenance, repairing, replacing, or otherwise servicing connected equipment 1332.

Weather service 1334 and utilities 1336 may be the same as or similar to weather service 604 and utilities 608, as described with reference to FIGS. 6 and 8. Utilities 1336 may provide utility pricing data (e.g., electricity prices, natural gas prices, water prices, demand charge prices, etc.) to MPM controller 1302, whereas weather service 1334 may provide weather forecasts (e.g., outdoor air temperature, outdoor air humidity, wind speed, precipitation forecasts, etc.) to MPM controller 1302. MPM controller 1302 may use the pricing data and weather forecasts to predict the energy loads of the building or campus and utility prices at each time step of an optimization period.

MPM controller 1302 is shown to include a communications interface 1304 and a processing circuit 1306. Communications interface 1304 may include wired or wireless interfaces (e.g., jacks, antennas, transmitters, receivers, transceivers, wire terminals, etc.) for conducting data communications with various systems, devices, or networks. For example, communications interface 1304 may include an Ethernet card and port for sending and receiving data via an Ethernet-based communications network and/or a Wi-Fi transceiver for communicating via a wireless communications network. Communications interface 1304 may be configured to communicate via local area networks or wide area networks (e.g., the Internet, a building WAN, etc.) and may use a variety of communications protocols (e.g., BACnet, IP, LON, etc.).

Communications interface 1304 may be a network interface configured to facilitate electronic data communications between MPM controller 1302 and various external systems or devices (e.g., connected equipment 1332, utilities 1336, weather service 1334, service providers 1330, etc.). For example, MPM controller 1302 may receive performance variables $y_k$ from connected equipment 1332 indicating one or more measured states of the controlled building (e.g., temperature, humidity, electric loads, etc.) and/or equipment performance information (e.g., run hours, power consumption, operating efficiency, etc.). Communications interface 1304 may receive inputs from utilities 1336, weather service 1334, connected equipment 1332 and may provide a maintenance schedule $m_k$ or service requests to service providers 1330 or other external systems or devices.

Processing circuit 1306 is shown to include a processor 1308 and memory 1310. Processor 1308 may be a general purpose or specific purpose processor, an application specific integrated circuit (ASIC), one or more field programmable gate arrays (FPGAs), a group of processing components, or other suitable processing components. Processor 1308 may be configured to execute computer code or instructions stored in memory 1310 or received from other computer readable media (e.g., CDROM, network storage, a remote server, etc.).

Memory 1310 may include one or more devices (e.g., memory units, memory devices, storage devices, etc.) for storing data and/or computer code for completing and/or facilitating the various processes described in the present disclosure. Memory 1310 may include random access memory (RAM), read-only memory (ROM), hard drive storage, temporary storage, non-volatile memory, flash memory, optical memory, or any other suitable memory for storing software objects and/or computer instructions. Memory 1310 may include database components, object code components, script components, or any other type of information structure for supporting the various activities and information structures described in the present disclosure. Memory 1310 may be communicably connected to processor 1308 via processing circuit 1306 and may include computer code for executing (e.g., by processor 1308) one or more processes described herein.

Still referring to FIG. 13, MPM controller 1302 is shown to include a load/rate predictor 1312, a degradation impact modeler 1314, a degradation estimator 1316, a model predictive optimizer 1320, and a maintenance scheduler 1318. Load/rate predictor 1312 may be configured to predict the energy loads ($Load_i$) (e.g., heating load, cooling load, electric load, etc.) of the building or campus for each time step $i$ of the optimization period. Load/rate predictor 1312 is shown receiving weather forecasts from weather service 1334. In some embodiments, load/rate predictor 1312 predicts the energy loads $Load_i$ as a function of the weather forecasts. In some embodiments, load/rate predictor 1312 uses feedback from connected equipment 1332 to predict loads $Load_i$. Feedback from connected equipment 1332 may include various types of sensory inputs (e.g., temperature, flow, humidity, enthalpy, etc.) or other data relating to the controlled building (e.g., inputs from a HVAC system, a lighting control system, a security system, a water system, etc.) and may be included in performance variables $y_k$.

In some embodiments, load/rate predictor 1312 receives a measured electric load and/or previous measured load data from connected equipment 1332. Load/rate predictor 1312 may predict loads $Load_i$ as a function of a given weather forecast ($\hat{\phi}_w$), a day type (day), the time of day (t), and previous measured load data ($Y_{i-1}$). Such a relationship is expressed in the following equation:

$$Load_i = f(\hat{\phi}_w, day, t | Y_{i-1})$$

In some embodiments, load/rate predictor 1312 uses a deterministic plus stochastic model trained from historical load data to predict loads $Load_i$. Load/rate predictor 1312 may use any of a variety of prediction methods to predict loads $Load_i$ (e.g., linear regression for the deterministic portion and an AR model for the stochastic portion). Load/rate predictor 1312 may predict one or more different types of loads for the building or campus. For example, load/rate predictor 1312 may predict a hot water load $Load_{Hot,i}$, a cold water load $Load_{Cold,i}$, and an electric load $Load_{Elec,i}$ for each time step $i$ within the optimization period. The predicted load values $Load_i$ can include some or all of these types of loads. In some embodiments, load/rate predictor 1312 makes load/rate predictions using the techniques described in U.S. patent application Ser. No. 14/717,593.

Load/rate predictor 1312 is shown receiving utility rates from utilities 1336. Utility rates may indicate a cost or price per unit of a resource (e.g., electricity, natural gas, water, etc.) provided by utilities 1336 at each time step $i$ in the optimization period. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 608 or predicted utility rates estimated by load/rate predictor 1312.

In some embodiments, the utility rates include demand charges for one or more resources provided by utilities 1336. A demand charge may define a separate cost imposed by utilities 608 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Model predictive optimizer 1320 may be configured to account for demand charges in a high level optimization process performed by model predictive optimizer 1320. Utilities 1336 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 1312 may store the predicted loads $Load_i$ and the utility rates in memory 1310 and/or provide the predicted loads $Load_i$ and the utility rates to model predictive optimizer 1320.

Degradation estimator 1316 can be configured to estimate the degradation states $\hat{\delta}_k$ of connected equipment 1332. As used herein, the variable $\hat{\delta}_k$ denotes one or more estimated degradation states of connected equipment 1332 at time step k. In some embodiments, the variable $\hat{\delta}_k$ is a vector containing a plurality of degradation state estimates. For example, the variable $\hat{\delta}_k$ may be defined as:

$$\hat{\delta}_k = \begin{bmatrix} \hat{\delta}_{1,k} \\ \hat{\delta}_{2,k} \\ \vdots \\ \hat{\delta}_{n,k} \end{bmatrix}$$

where $\hat{\delta}_{1,k}$ is a first estimated degradation state of connected equipment 1333 at time step k, $\hat{\delta}_{2,k}$ is a second estimated degradation state of connected equipment 1333 at time step k, and $\hat{\delta}_{n,k}$ is a $n^{th}$ estimated degradation state of connected equipment 1333 at time step k, where n is the total number of estimated degradation states contained within vector $\hat{\delta}_k$. In various embodiments, the degradation states $\hat{\delta}_{1,k}$, $\hat{\delta}_{2,k}$ ... $\hat{\delta}_{n,k}$ may represent degradation states of different devices of connected equipment 1332 (e.g., the degradation state of a chiller, the degradation state of a boiler, the degradation state of a fan, etc.) and/or degradation states of particular components of a device of connected equipment 1332 (e.g., the degradation state of a chiller's compressor, the degradation state of the same chiller's refrigerant tubes, etc.).

In some embodiments, degradation estimator 1316 estimates the degradation states $\hat{\delta}_k$ based on the performance variables $y_k$ received from connected equipment 1332. Values of the performance variables $y_k$ can be gathered by various sensors and/or other devices in a building and provided as inputs to degradation estimator 1316. For example, $Y_k$ can include information such as an operating temperature of a building device as gathered by a temperature sensor, power consumption of a building device as gathered by an electrical measurement device, a current flowing through building equipment, a pressure of components in a building device, etc. Degradation estimator 1316 can estimate the degradation state $\hat{\delta}_k$ of connected equipment 1332 at time step k as a function of the performance variables $y_k$, as shown in the following equation:

$$\hat{\delta}_k = f(y_k)$$

where the function $f(\ )$ is a function that relates the performance variables $y_k$ to the degradation states $\hat{\delta}_k$.

It is contemplated that the function $f(\ )$ can have any of a variety of forms. For example, the function $f(\ )$ may include operations that compare one or more values of the performance variables $y_k$ (or functions thereof) to design parameters of connected equipment 1332 and calculate the degradation states $\hat{\delta}_k$ based on the values of the performance variables $y_k$ relative to the design parameters (e.g., a ratio of operating efficiency at time step k relative to design efficiency). In other embodiments, the function $f(\ )$ may represent a degradation estimation model that can be generated empirically by degradation estimator 1316. For example, degradation estimator 1316 may use a set of historical data from one or more building sites to train the degradation estimation model. The set of historical data may include values of the performance variables $y_k$ and corresponding values of the degradation states $\hat{\delta}_k$ or values representative of the degradation states $\hat{\delta}_k$ (e.g., equipment efficiency, operating cost, etc.). The degradation estimation model may include a regression model, a neural network, or any other type of model that provides a mapping between the performance variables $y_k$ and the degradation states $\hat{\delta}_k$. The estimated degradation state $\hat{\delta}_k$ at time step k can be provided to degradation predictor 1322.

In some embodiments, degradation estimator 1316 generates a raw degradation estimate $\hat{\delta}_{raw,k}$. The raw degradation estimate $\hat{\delta}_{raw,k}$ may be a function of the performance variables $y_k$ and can be calculated using the same or similar technique as the estimated degradation states $\hat{\delta}_k$. Like the estimated degradation states $\hat{\delta}_k$, the raw degradation estimate $\hat{\delta}_{raw,k}$ may be a vector that includes an estimated degradation state for each device of connected equipment 1332 and/or components of the devices of connected equipment 1332. In some embodiments, the raw degradation estimate $\hat{\delta}_{raw,k}$ is a function of the values of the performance variables $y_k$ at time step k and one or more previous time steps. For example, the raw degradation estimate $\hat{\delta}_{raw,k}$ can be defined as:

$$\hat{\delta}_{raw,k} = f(Y_k)$$

where $Y_k$ is a matrix that includes all of the values of the performance variables $y_k$ over the period of time from $k-h_b$ to k, where k is the time step at which the degradation state is evaluated and $h_b$ is a backward looking time horizon. The matrix $Y_k$ may include a value of each performance variable at each time step from $k-h_b$ to k and may be defined as:

$$Y_k = \begin{bmatrix} y_{1,k-h_b} & \cdots & y_{1,k} \\ \vdots & \ddots & \vdots \\ y_{n,k-h_b} & \cdots & y_{n,k} \end{bmatrix}$$

where $y_1$ is the first performance variable, $y_n$ is the $n^{th}$ performance variable, $k-h_b$ is the first time step included in the matrix $Y_k$ (i.e., $h_b$ time steps before time step k), and k is the last time step included in the matrix $Y_k$. The raw degradation state $\hat{\delta}_{k,raw}$ at time step k can be provided to degradation impact modeler 1314.

In some embodiments, degradation estimator 1316 scales the raw degradation state $\hat{\delta}_{raw,k}$ by a scaling factor $\alpha$ (e.g., by multiplying $\hat{\delta}_{raw,k}$ by the scaling factor $\alpha$) to produce a scaled degradation estimate $\alpha\hat{\delta}_{raw,k}$. The scaled degradation estimate $\alpha\hat{\delta}_{raw,k}$ represents a scaled output of degradation estimator 1316 and can be provided to degradation impact modeler 1314. Scaling the values of $\hat{\delta}_{raw,k}$ can ensure inputs to a neural network used by degradation impact modeler 1314 are scaled to limit the values between a lower threshold and an upper threshold. Degradation estimator 1316 can provide the scaled values of $\alpha\hat{\delta}_{raw,k}$ to degradation impact modeler 1314. If a scale value of $\hat{\delta}_{raw,k}$ is not calculated, $\alpha$ can effectively be considered one (i.e. 1.0). Degradation impact modeler 1314 can use the values of $\alpha\hat{\delta}_{raw,k}$ to train a neural network to map degradation states to power model coefficients, described in greater detail below.

In some embodiments, degradation estimator 1316 performs an optimization process to generate a value of the scaling factor $\alpha$. For example, degradation estimator 1316 can find value of the scaling factor $\alpha$ that optimizes the following objective function:

$$\operatorname*{argmin}_{\alpha} \sum_{l=1}^{\infty} \left| P_{k-l} - \hat{P}_{k-l}(Q_{k-l}, \varphi(\alpha\hat{\delta}_{raw,k})) \right| e^{-\frac{l}{\tau}}$$

where $P_{k-l}$ is the actual power consumption of connected equipment 1332 at time step k−l, $\hat{P}_{k-l}$ is a predicted power consumption of connected equipment 1332 at time step k−l, $Q_{k-l}$ is the heating or cooling load of connected equipment 1332 at time step k−l, $\varphi$ are coefficients of a power consumption model used to predict $\hat{P}_{k-l}$, and $e^{-l/\tau}$ is a weighting factor. The predicted power consumption $\hat{P}_{k-l}$ can be predicted using a power model that predicts $\hat{P}_{k-l}$ as a function of power model coefficients $\varphi$ and the heating or cooling load $Q_{k-l}$. The power model coefficients $\varphi$ can be generated by degradation impact modeler 1314 as a function of the degradation state $\alpha\hat{\delta}_{raw,k}$, as described in greater detail below. By optimizing this objective function, degradation estimator 1316 may seek to minimize the difference between the actual power consumption $P_{k-l}$ and the model predicted power consumption $\hat{P}_{k-l}$.

In some embodiments, degradation estimator 1316 separates the degradation estimation into two processes: (1) an offline process that trains a degradation estimation model with historical data from various building sites and (2) an online process that uses data from past time horizons from the specific building site at which connected equipment 1332 are located and estimates the current state of degradation $\hat{\delta}_k$. Calculating the values of the degradation states $\hat{\delta}_k$ as a function of the performance variables $y_k$ using the function $f(\ )$ can be considered the online portion, whereas generating the degradation estimation model represented by the function $f(\ )$ can be considered the offline portion.

Degradation impact modeler 1314 can be configured to determine the impact of the estimated degradation state $\hat{\delta}_k$ or scaled degradation estimate $\alpha\hat{\delta}_{raw,k}$ on the cost of operating connected equipment 1332. In some embodiments, the cost of operating connected equipment 1332 depends on the amount of electric power or other resource (e.g., water, natural gas, etc.) consumed by connected equipment 1332 during operation, which in turn may be a function of the degradation state. Although degradation impact modeler 1314 is described primarily with reference to electric power consumption, it should be understood that any other resource consumed by connected equipment 1332 can be used instead of electric power or in addition to electric power without departing from the teachings of the present disclosure.

Advantageously, degradation impact modeler 1314 can be configured to predict the power consumption of connected equipment 1332 as a function of the estimated degradation state $\hat{\delta}_k$ or scaled degradation estimate $\alpha\hat{\delta}_{raw,k}$. For ease of explanation, the following description assumes that degradation impact modeler 1314 uses the scaled degradation estimate $\alpha\hat{\delta}_{raw,k}$. However, it should be understood that the estimated degradation state $\hat{\delta}_k$ can be used in place of or in addition to the scaled degradation estimate $\alpha\hat{\delta}_{raw,k}$ without departing from the teachings of the present disclosure. The predicted power consumption of connected equipment 1332 can be provided to model predictive optimizer 1320 for use in calculating the cost of operating connected equipment.

In some embodiments, degradation impact modeler 1314 is configured to generate power model coefficients $\varphi$ of connected equipment 1332 as a function of the estimated degradation state $\hat{\delta}_k$ or scaled degradation estimate $\alpha\hat{\delta}_{raw,k}$. The power model coefficients $\varphi$ may be coefficients of a power consumption model that is used by model predictive optimizer 1320 to determine that power consumption of connected equipment 1332 as a function of the operating decisions for connected equipment 1332. For example, the power consumption model may provide a mapping between the amount of power consumed by connected equipment 1332 and the heating or cooling load on connected equipment 1332 (e.g., if connected equipment 1332 is a heater or chiller). More generally, the power consumption model may be a function or curve that defines the relationship between the amount of an input resource (or multiple input resources) consumed by connected equipment 1332 and the corresponding amount of an output resource (or multiple output resources) produced by connected equipment 1332. In this regard, the power consumption model may be similar to or the same as equipment models 818, described with reference to FIG. 8. As the degradation state of connected equipment 1332 increases, degradation impact modeler 1314 may update the power consumption model to reflect the decreased efficiency of connected equipment 1332 as a result of the degradation. Accordingly, by mapping the scaled degradation estimate $\alpha\hat{\delta}_{raw,k}$ to the power model coefficients $\varphi$, degradation impact modeler 1314 can automatically adjust the power consumption model to account for equipment degradation. The updated values of the power model coefficients $\varphi$ may be provided as an input to model predictive optimizer 1320.

Still referring to FIG. 13, model predictive optimizer 1320 can be configured to perform an optimization process to generate the maintenance schedule $m_k$ for connected equipment 1332 along with operating decisions for connected equipment 1332. Model predictive optimizer 1320 may receive the degradation estimate $\hat{\delta}_k$ from degradation estimator 1316, the load and rate predictions from load/rate predictor 1312, and the power model coefficients $\varphi$ from degradation impact modeler 1314. Model predictive optimizer 1320 may use these inputs to perform an optimization process that seeks to optimize (e.g., minimize) the total cost of operating connected equipment 1332 and performing maintenance on connected equipment 1332 over a given time period (i.e., the optimization period).

The maintenance schedule $m_k$ may be provided as an output of the optimization process performed by model predictive optimizer 1320. It should be appreciated that $m_k$ can be likewise referred to as a maintenance schedule, a maintenance and replacement schedule, and/or a maintenance strategy. The maintenance schedule $m_k$ can include various information such as when connected equipment 1332 should have maintenance or replacement performed, specific building devices of connected equipment 1332 to have maintenance or replacement performed, equipment parts required for the maintenance or replacement activities, etc. It should be understood that the maintenance schedule $m_k$ is not limited to maintenance activities and can also include replacement activities, equipment upgrades, adding new equipment that does not replace existing equipment, or any other type of service or modification that alters the set of connected equipment 1332 as a whole. In general, the maintenance schedule $m_k$ can include any information necessary for connected equipment 1332 to be suitably maintained, replaced, upgraded, repaired, and/or otherwise serviced.

Model predictive optimizer 1320 is shown to include a degradation predictor 1322 and a cost calculator 1324. Degradation predictor 1322 can be configured to predict future degradation states $\hat{\delta}_{k+1}$ of connected equipment 1332 at one or more time steps after time step k. In some embodiments, degradation predictor 1322 uses a degradation prediction model to predict the future degradation states $\hat{\delta}_{k+1}$ as a function of the degradation states $\hat{\delta}_k$ at time step k and the maintenance schedule $m_k$ for time step k. For example, the future degradation states $\hat{\delta}_{k+1}$ can be predicted using the following equation:

$$\hat{\delta}_{k+1} = (\hat{\delta}_k, m_k)$$

where $\hat{\delta}_{k+1}$ is a vector of the future degradation states of connected equipment 1332 at a future time step k+1 (i.e., a time step after k) and $m_k$ is the maintenance schedule at time step k. In some embodiments, the maintenance schedule $m_k$ is generated by cost calculator 1324 and provided back to degradation predictor 1322 to predict the future degradation states $\hat{\delta}_{k+1}$.

In some embodiments, both the maintenance schedule $m_k$ and the future degradation states $\hat{\delta}_{k+1}$ are generated as results of an optimization process performed by model predictive optimizer 1320. The optimization process may seek to optimize (e.g., minimize) the total cost of operating connected equipment 1332 and performing maintenance on connected equipment 1332 over a given time horizon. The cost of operating connected equipment 1332 at the future time step k+1 can be defined as a function of the future degradation states $\hat{\delta}_{k+1}$. Both the cost of performing maintenance on connected equipment 1332 and the future degradation states $\hat{\delta}_{k+1}$ can be defined as functions of the maintenance schedule $m_k$. For example, maintenance/replacement activities that occur at time step k can affect (e.g., improve) a degradation state of connected equipment 1332 and therefore can affect a predicted degradation state at time step k+1. Accordingly, the optimization performed by model predictive optimizer 1320 may generate optimal values of the maintenance schedule $m_k$ and the resulting future degradation states $\hat{\delta}_{k+1}$. The future degradation states $\hat{\delta}_{k+1}$ may be provided as an input to degradation impact modeler 1314 and used by degradation impact modeler 1314 to determine the corresponding values of the power model coefficients $\varphi_{k+1}$ at the future time step.

Cost calculator 1324 is shown to include a reliability model 1326 and a system model 1328. Reliability model 1326 can be used to estimate projections of reliability forward in time for connected equipment 1332. In this way, reliability model 1326 can incorporate a risk of failure of connected equipment 1332 into the optimization problem solved by model predictive optimizer 1320. System model 1328 may model the operating performance of connected equipment 1332 and may include the power consumption model described above (or any other model that relates input resource consumption to output resource generation). In some embodiments, system model 1328 has parameters p as well as the independent variable inputs x. For example, system model 1328 may have the form:

$$p = p_{equip}(\varphi; x)$$

where p is the predicted power consumption of connected equipment 1320, $p_{equip}$ is a function that defines power consumption p as a function of the power model parameters p and the independent variables x, $\varphi$ includes estimated power parameters, and x is a matrix or vector of power estimation predictors (i.e., independent variables).

For example, in a variable refrigerant flow (VRF) system, system model 1328 may define the power consumption of VRF equipment (i.e., a type of connected equipment 1332) as a function of one or more model parameters $\varphi$ and a set of independent variable inputs x that represent the heating and cooling loads on the system (i.e., $\hat{Q}_h$ and $\hat{Q}_c$) as well as the temperature lift $\hat{T}_{lift}$ (i.e., the difference between outdoor air temperature and a setpoint temperature value). Accordingly, the matrix or vector of independent variable inputs x can be defined as:

$$x = \begin{bmatrix} \hat{Q}_c \\ \hat{Q}_h \\ \hat{T}_{lift} \end{bmatrix}$$

where $\hat{Q}_c$ is the estimated cooling load, $\hat{Q}_h$ is the estimated heating load, and $\hat{T}_{lift}$ is a lift temperature. Although x is shown as a vector in the equation above, it should be understood that each of the variables $\hat{Q}_c$, $\hat{Q}_h$, and $\hat{T}_{lift}$ may include multiple values (e.g., one value for each time step. The multiple values of $\hat{Q}_c$, $\hat{Q}_h$, and $\hat{T}_{Lift}$ can be included in x by adding another dimension to x, in which case x becomes a 3 by n matrix where n is the total number of time steps included in the matrix x.

Continuing the example of the VRF system, the system model 1328 for the VRF system can be defined as:

$$p = p_{design}(\varphi_1 \cdot \max(\hat{Q}_c, \hat{Q}_h) + \varphi_2 \cdot |\hat{Q}_c - \hat{Q}_h| + \varphi_3 \cdot \max(\hat{Q}_c, \hat{Q}_h) \cdot \hat{T}_{lift})$$

where p is the power consumption of the VRF equipment, $p_{design}$ is the design power of the VRF equipment, $\varphi_1$, $\varphi_2$, and $\varphi_3$ are parameters of the system model 1328, and the remaining variables are the same as previously described.

Cost calculator 1324 may use the power model coefficients $\varphi_{k+1}$ provided by degradation impact modeler 1314 to update system model 1328 and may use the updated system model 1328 to formulate the optimization problem. For example, cost calculator 1324 may use system model 1328 to define a relationship between the power consumption of connected equipment 1332 and the load served by connected equipment 1332. The relationship between power consumption and load served may be imposed as a constraint on the optimization problem solved by model predictive optimizer 1320.

Cost calculator 1324 can be configured to obtain (e.g., generate, receive, formulate, etc.) an objective function J that is optimized by model predictive optimizer 1320. An example of such an objective function J is:

$$J(m_k) = \sum_{i=k}^{h_b+k-1} \left\{ c_{op,i}(\delta_i) + \begin{bmatrix} c_{main,i} \\ c_{replace,i} \end{bmatrix}^T m_i + c_{fail,i}^T p_{fail,i}(\delta_i) \right\}$$

where $m_k$ is a maintenance and replacement schedule, k is a given time step (past, present, or future) $h_b$ is a backward optimization horizon (backward from the time step k), $C_{op,i}(\delta_i)$ is an operational cost dependent on a degradation state $\delta_i$ at time step i, $c_{main,i}$ is a cost of maintenance at time step i, $C_{replace,i}$ is a replacement cost at time step i, $m_i$ is a binary vector representing which maintenance actions are taken at time step i, $C_{fail,i}$ is a cost of failure of building equipment at time step i, and $p_{fail,i}(\delta_i)$ is a vector of probabilities of failure for each component of building equipment dependent on the state of degradation $\delta_i$. In the above objective function, the T superscript indicates a transpose of the associated matrix. Values of $c_{fail,k}$ can include a cost to repair/replace the tracked building equipment and/or any opportunity costs related to failure of the tracked building equipment.

It should be appreciated that a first portion of the maintenance vector $m_i$ (i.e., the portion to which maintenance costs $c_{main,i}$ are applied) includes maintenance decisions, whereas a second portion of the maintenance vector $m_i$ (i.e., the portion to which replacement costs $C_{replace,i}$ are applied) includes replacement decisions. For example, the maintenance vector $m_i$ can be defined as $$m_i = \begin{bmatrix} m_{main,i} \\ m_{replace,i} \end{bmatrix}.$$

Each maintenance action $m_{main,i}$ is associated with a corresponding maintenance cost $c_{main,i}$, whereas each replacement action $m_{replace,i}$ is associated with a corresponding replacement cost $c_{replace,i}$. Further, it should be appreciated that $C_{fail,k}^T \, p_{fail,k}(\delta_k)$ represents a risk cost term of the objective function. In some embodiments, the probability of failure (PoF) given each degradation state, $p_{fail,i}(\delta_i)$, can be an output of reliability model 1326.

The objective function J is shown as a summation of three costs. The first term of the objective function J (i.e., $C_{op,i}(\delta_i)$) represents the total cost of operating connected equipment 1332 over the time period from time step k to time step $h_b+k-1$. The second term of the objective function j $$J\left(i.e., \begin{bmatrix} c_{main,i} \\ c_{replace,i} \end{bmatrix}^T m_i\right)$$

represents the total cost of performing any of the maintenance or replacement activities defined by the maintenance vector $m_i$ on connected equipment 1332 over the time period from time step k to time step $h_b+k-1$. The third term of the objective function J (i.e., $C_{fail,i}^T p_{fail,i}(\delta_i)$) represents the total cost of failure of connected equipment 1332 over the time period from time step k to time step $h_b+k-1$. The time step k can be any time step in the past, present, or future. Accordingly, the time period ranging from time step k to time step $h_b+k-1$ may be entirely in the past; partially in the past and partially in the present; partially in the past, present, and future; partially in the present and partially in the future; or entirely in the future in various embodiments.

Model predictive optimizer 1320 can be configured to perform an optimization of the objective function J subject to a set of constraints. The constraints may include the power consumption model or any other type of system model 1328 that defines the relationship between the operating cost $C_{op,i}$ and the load served by connected equipment 1332. For example, one constraint on the objective function J may be a power consumption model that defines the amount of power consumed $p_i$ as a function of the load served by connected equipment and the power model parameters $\varphi_i$. Another constraint on the objective function J may be a cost model that defines the operating cost $C_{op,i}$ as a function of the amount of power consumed $p_i$ and the pricing data received from utilities 1336. Another constraint on the objective function J may be a model that defines the relationship between the probability of failure $p_{fail,i}$ and the degradation state $\delta_i$. Another constraint on the objective function J may require connected equipment 1332 to satisfy the predicted heating or cooling load provided by load/rate predictor 1312. Another constraint on the objective function J may require connected equipment 1332 to operate within their respective capacity limits (e.g., limiting the amount of input resources consumed, output resources produced, or other capacity-related variables at each time step). Other constraints on the objective function J can include any of the equations or relationships described with reference to operational cost predictor 910, maintenance cost predictor 920, and capital cost predictor 930, as described with reference to FIG. 9.

Model predictive optimizer 1320 can perform an optimization of the objective function J, subject to the constraints, to determine the maintenance schedule $m_k$ as well as operating decisions for connected equipment 1332. The maintenance schedule $m_k$ can be provided to maintenance scheduler 1318, which may operate to schedule maintenance/replacement activities to be performed by service providers 1330 at times indicated by $m_k$. In some embodiments, maintenance scheduler 1318 selects a particular service provider 1330 by determining available service providers 1330 that are capable of performing a maintenance/replacement activity indicated by $m_k$ at a particular time. If $m_k$ indicates multiple maintenance/replacement activities to be performed, maintenance scheduler 1318 may schedule each particular activity at an associated time. It should be appreciated that different service providers 1330 can be scheduled for different maintenance/replacement activities. In other words, the same service provider 1330 need not perform all maintenance/replacement activities indicated by $m_k$.

Service providers 1330 may receive service requests from maintenance scheduler 1318 and perform the requested maintenance/replacement activities. As a result of the maintenance/replacement activity, the degradation state of connected equipment 1332 can be improved (e.g., reduced). In this way, operational costs associated with connected equipment 1332 can be reduced. The maintenance/replacement activities performed by service providers 1330 can include any number of maintenance/replacement activities as indicated by $m_k$ and scheduled by maintenance scheduler 1318.

Figure 14A:
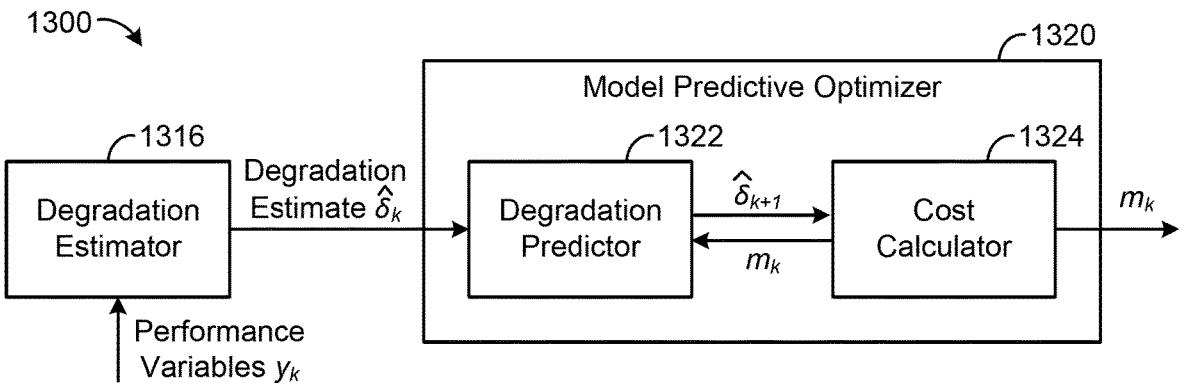
FIG. 14A is another block diagram illustrating a portion of the MPM system of FIG. 13 in greater detail, according to some embodiments.
Figure 14B:
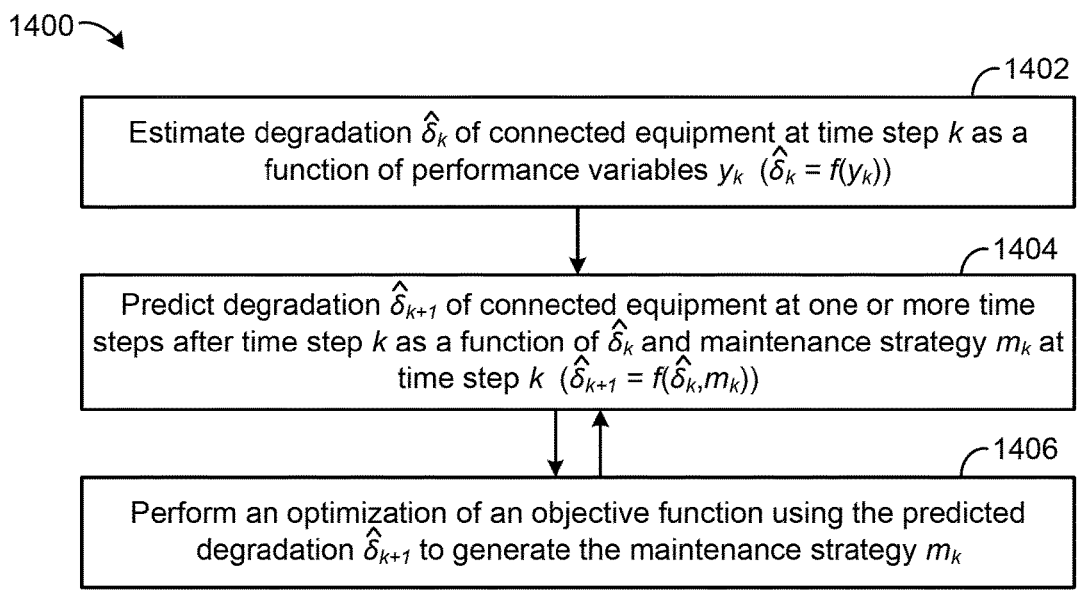
FIG. 14B is a flowchart of a process for generating an optimal maintenance schedule, which can be performed by the MPM system of FIG. 13, according to some embodiments.

Referring now to FIGS. 14A-14B, a block diagram illustrating a portion of MPM system 1300 in greater detail and a corresponding process 1400 performed by these components of MPM system 1300 are shown, according to some embodiments. Process 1400 can be performed to generate a maintenance and replacement strategy $m_k$ for connected equipment 1332. Process 1400 further illustrates how degradation estimates and predictions can be used to generate $m_k$. The steps of process 1400 can be performed by various components of MPM system 1300 as shown in FIG. 14A.

Process 1400 is shown to include estimating the degradation state $\hat{\delta}_k$ of connected equipment 1332 at time step k as a function of performance variables $y_k$ (step 1402). In some embodiments, step 1402 is performed by degradation estimator 1316 using a degradation estimation model, as described with reference to FIG. 13. Step 1402 may include receiving values of the performance variables $y_k$. Values of the performance variables $y_k$ can be gathered by various sensors and/or other devices in a building that can measure performance information associated with connected equipment. For example, $y_k$ can include information such as an operating temperature of a building device as gathered by a temperature sensor, power consumption of a building device as gathered by an electrical measurement device, a current flowing through building equipment, a pressure of components in a building device, etc. Based on $Y_k$, a degradation state $\hat{\delta}_k$ of building equipment at time step k can be estimated by the following function:

$$\hat{\delta}_k = f(y_k)$$

In other words, $\hat{\delta}_k$ can be expressed as a function of sensor measurements/performance variables $y_k$.

Process 1400 is shown to include predicting the degradation state $\hat{\delta}_{k+1}$ of connected equipment 1332 at one or more time steps after time step k as a function of the degradation state $\hat{\delta}_k$ at time step k and a maintenance strategy $m_k$ for connected equipment 1332 at time step k (step 1404). In some embodiments, step 1404 is performed by degradation predictor 1332, as described with reference to FIG. 13. The degradation state of connected equipment 1332 can be predicted for a time step k+1 (i.e., a time step after time step k). $\hat{\delta}_{k+1}$ can be predicted as a function of $\hat{\delta}_k$ and $m_k$ as shown in the following equation:

$$\hat{\delta}_{k+1} = f(\hat{\delta}_k, m_k)$$

such that $\hat{\delta}_{k+1}$ is a function of a state of degradation at time step k and a maintenance and replacement strategy at time step k. As shown in FIG. 14A, the maintenance strategy $m_k$ may be generated by cost calculator 1324. In some embodiments, both $\hat{\delta}_{k+1}$ and $m_k$ are generated by model predictive optimizer 1320 by performing an optimization of an objective function in step 1406. In other words, $m_k$ can be generated in step 1406 (which may occur concurrently with step 1404) and provided as an input to step 1404 for more accurately determining $\hat{\delta}_{k+1}$ in step 1404. Of course, maintenance/replacement activities that occur at time step k can affect (e.g., improve) a degradation state of connected equipment 1332 and therefore can affect the predicted degradation state $\hat{\delta}_{k+1}$ at time step k+1.

Process 1400 is shown to include performing an optimization of an objective function using the predicted degradation $\hat{\delta}_{k+1}$ to generate the maintenance strategy $m_k$ (step 1406). In some embodiments, step 1406 is performed by cost calculator 1324, as described with reference to FIG. 13. Based on $\hat{\delta}_{k+1}$ as predicted in step 1404, a recommended maintenance and replacement strategy $m_k$ can be determined in step 1406 that optimizes (e.g., minimizes) costs related to performing maintenance/replacement and operating the building equipment. As an example, if $\hat{\delta}_{k+1}$ is predicted to be extremely high in step 1404, operational costs at time step k+1 may be determined to be high, thereby necessitating maintenance or replacement to be performed. If so, $m_k$ can be generated such that maintenance or replacement is performed on connected equipment 1332 to improve $\hat{\delta}_{k+1}$. The value of $m_k$ can be provided back to step 1404 to predict a new value of $\hat{\delta}_{k+1}$ as to ensure the degradation state of connected equipment 1332 is improved. As discussed above, both steps 1404 and 1406 may be performed concurrently in some embodiments such that both the predicted degradation state $\hat{\delta}_{k+1}$ and the maintenance strategy $m_k$ are results of optimizing the objective function.

Degradation Impact Modeling

Figure 15:
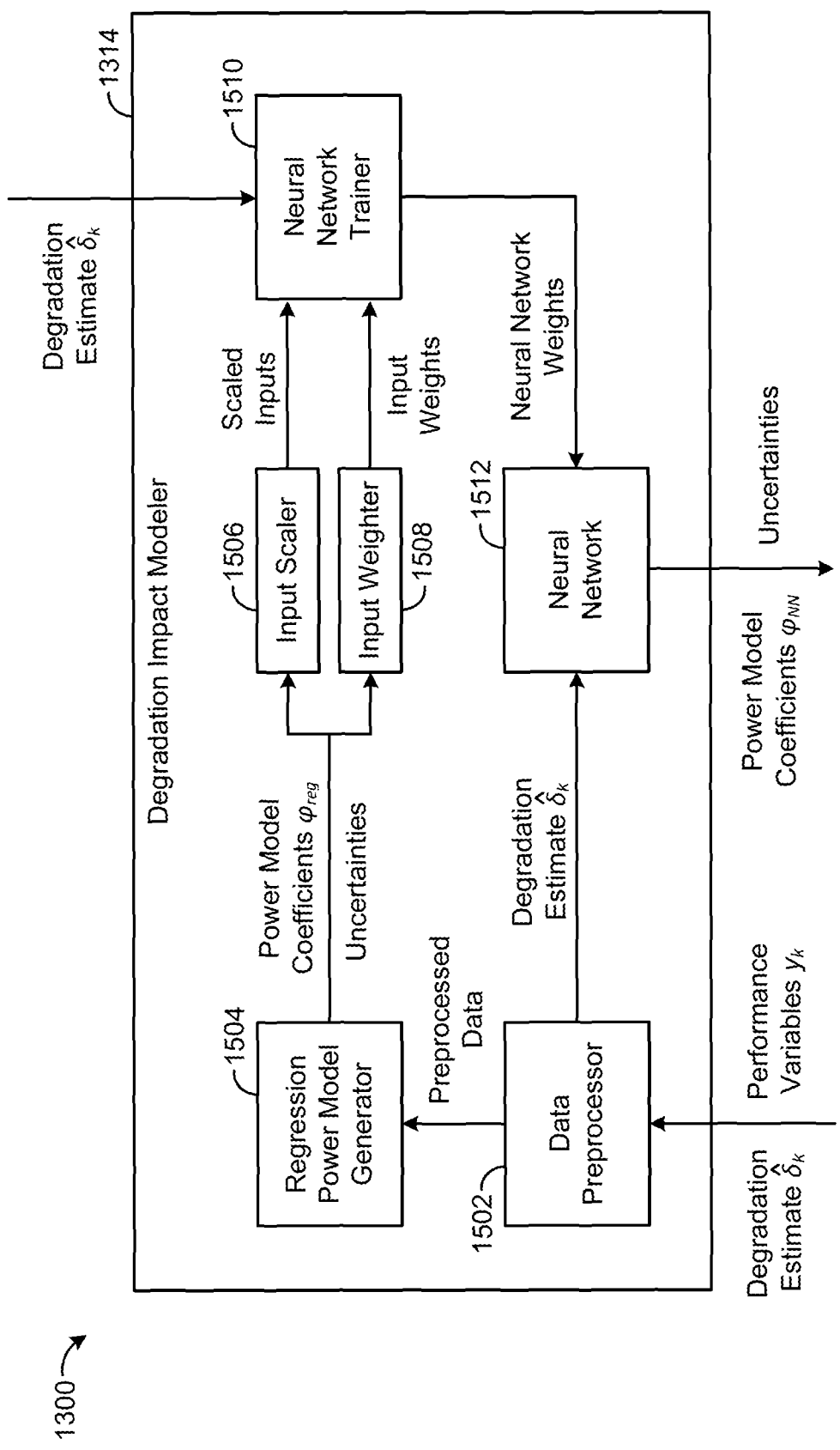
FIG. 15 is a block diagram illustrating the degradation impact modeler of FIG. 13 in greater detail, according to some embodiments.

Referring now to FIG. 15, a block diagram illustrating degradation impact modeler 1314 in greater detail is shown, according to an exemplary embodiment. As discussed above, degradation impact modeler 1314 may be configured to generate power model coefficients φ of connected equipment 1332 as a function of the estimated degradation state $\hat{\delta}_k$. The power model coefficients φ may be coefficients of a power consumption model that is used by model predictive optimizer 1320 to determine that power consumption of connected equipment 1332 as a function of the operating decisions for connected equipment 1332. For example, the power consumption model may provide a mapping between the amount of power consumed by connected equipment 1332 and the heating or cooling load on connected equipment 1332 (e.g., if connected equipment 1332 is a heater or chiller).

Although degradation impact modeler 1314 is described primarily with reference to electric power consumption, it should be understood that any other resource consumed by connected equipment 1332 can be used instead of electric power or in addition to electric power without departing from the teachings of the present disclosure. For example, the power consumption model may be a function or curve that defines the relationship between the amount of an input resource (or multiple input resources) consumed by connected equipment 1332 and the corresponding amount of an output resource (or multiple output resources) produced by connected equipment 1332, even if none of the input resources or output resources are electric power. In some embodiments, the input resource is electric power and the output resources are heating or cooling load. However, the input resource and output resource can be replaced with any other resources in various embodiments. For example, a gas-fueled boiler may consume natural gas as the input resource instead of electric power.

In some embodiments, degradation impact modeler 1314 uses a neural network 1512 to generate the power model coefficients $\varphi_{NN}$ as a function of the estimated degradation state $\hat{\delta}_k$. Degradation impact modeler 1314 may train the neural network 1512 using a set of training data that includes input values of the estimated degradation state $\hat{\delta}_k$ and corresponding values of the power model coefficients $\varphi_{reg}$. The values of the estimated degradation state $\hat{\delta}_k$ in the training data may be generated by degradation estimator 1316 as described above. The values of the power model coefficients $\varphi_{reg}$ in the training data may be generated by performing a regression process, described in greater detail below. As used herein, the variable $\varphi_{NN}$ denotes the power model coefficients generated by neural network 1512, whereas the variable $\varphi_{reg}$ denotes the power model coefficients generated by performing the regression process. Although degradation impact modeler 1314 is described primarily as using neural network 1512 to generate the power model coefficients and/or predict the resource consumption as a function of the estimated degradation state, it should be understood that any other type of model (i.e., other than neural network models) can be used in addition to or in place of neural network 1512. Examples of such models may include regression models, polynomial models, physics-based models, linear or nonlinear models, static or dynamic models, discrete or continuous models, deterministic or stochastic models, or any other type of model that relates the estimated degradation state to the power model coefficients and/or the predicted resource consumption.

Degradation impact modeler 1314 is shown to include a data preprocessor 1502. Data preprocessor 1502 can be configured to associate values of the performance variables $y_k$ with corresponding values of the estimated degradation state $\hat{\delta}_k$. The performance variables $y_k$ may include any of a variety of variables that characterize the performance of connected equipment 1332 including for example, power consumption, natural gas consumption, water consumption, heating load produced, cooling load produced, temperature lift, or any other variable that indicates the resource consumption or production of connected equipment 1332 or characterizes the performance of connected equipment 1332. In some embodiments, data preprocessor 1502 generates a plurality of different sets of preprocessed data. Each set of preprocessed data may include a value of the estimated degradation state $\hat{\delta}_k$ and corresponding values of the performance variables $y_k$.

In some embodiments, data preprocessor 1502 prepares the raw input data to be used by regression power model generator 1504. For example, data preprocessor 1502 may modify the input data such that it fits an expected form for use in the power regression model. Prior to being processed, a raw dataset can include one or more files (e.g., an Excel file) which are a combination of both cooling and heating mode data. Each file in the raw dataset can be related to a specific degradation case that has been generated by simulation for an amount of time (e.g., one hour, two hours, etc.). Each file can include several feature columns. However, only specific features of the raw dataset may be needed by regression power model generator 1504.

Data preprocessor 1502 can be configured to extract information from the raw data including a degradation state, a power value, a load value, $\hat{T}_{lift}$, $\hat{P}_{lift}$, etc. Data preprocessor 1502 can also organize the extracted information based on the degradation state. In particular, information related to the same degradation state can be concatenated together. In some embodiments, the processed data is divided into processed data files. Each processed data file can include both heating and cooling mode information. As a result of performing the preprocessing, data preprocessor 1502 can generate one or more data files such that each data file relates to a different degradation case and is ready to feed to regression power model generator 1504.

Regression power model generator 1504 can be configured to perform a regression process to generate a set of power model coefficients $\varphi_{reg}$ and related uncertainties based on the preprocessed data. The power model coefficients $\varphi_{reg}$ parameters may be used to train neural network 1512. To obtain the power model coefficients $\varphi_{reg}$ and related uncertainties, regression power model generator 1504 can perform a regression process, using the preprocessed data as training data, to generate a power consumption regression model. For example, the preprocessed data may include values of power consumption P, heating load $\dot{Q}_h$, cooling load $\dot{Q}_c$, temperature lift $T_{lift}$, or any other variable included in the power consumption regression model. Regression power model generator 1504 can use any of a variety of regression techniques (e.g., ordinary least squares, linear, nonlinear, weighted least squares, ridge regression, etc.) to generate the power model coefficients $\varphi_{reg}$. The following equation is one example of the power consumption model for which the power model coefficients $\varphi_{reg}$ can be generated:

$$P = \varphi_1 * \max(\dot{Q}_c, \dot{Q}_h) + \varphi_2 * \max(\dot{Q}_c, \dot{Q}_h) * T_{lift}$$

where P is a power value, $\varphi_1$ and $\varphi_2$ are the power model coefficients, $\dot{Q}_c$ is an estimated cooling load, $\dot{Q}_h$ is an estimated heating load, and $T_{lift}$ is the difference between the outside ambient temperature and the predefined setpoint value.

In some embodiments, it may be desirable to have uncorrelated predictors in the power consumption model. In other words, it may be desirable that the terms of the power consumption model are not correlated with each other. Regression power model generator 1504 can be configured to reduce or eliminate correlation between the two predictors $\max(\dot{Q}_c, \dot{Q}_h)$ and $\max(\dot{Q}_c, \dot{Q}_h) * T_{lift}$. Eliminating the correlation can be achieved using orthogonalization by performing two consecutive regression steps.

In some embodiments, regression power model generator 1504 performs the first regression step using the following model:

$$\max(\dot{Q}_c, \dot{Q}_h) * T_{lift} = \varphi_1 * \max(\dot{Q}_c, \dot{Q}_h) + \text{Residual of } (\max(\dot{Q}_c, \dot{Q}_h) * T_{lift})$$

In the first regression step, a regression model can be constructed for the second predictor (i.e., $\max(\dot{Q}_c, \dot{Q}_h) * T_{lift}$) based on the first predictor (i.e., $\max(\dot{Q}_c, \dot{Q}_h)$). The residual obtained in the first regression step (i.e., Residual of (max $(\dot{Q}_c, \dot{Q}_h) * T_{lift}$)) indicates the amount of the second predictor that is orthogonal or uncorrelated with the first predictor. Regression power model generator 1504 can provide the values of heating load $\dot{Q}_h$, cooling load $\dot{Q}_c$, and temperature lift $T_{lift}$ as inputs to the regression process to determine the values of $\varphi_1$ and the residual Residual of $(\max(\dot{Q}_c, \dot{Q}_h) * T_{lift})$.

In some embodiments, regression power model generator 1504 performs the second regression step using the following model:

$$P = \varphi_1' * \max(\dot{Q}_c, \dot{Q}_h) + \varphi_2' * \text{Residual of}(\max(\dot{Q}_c, \dot{Q}_h) * T_{lift})$$

where P is the desired variable of power. Regression power model generator 1504 can provide the values of power consumption P, heating load $\dot{Q}_h$, cooling load $\dot{Q}_c$, and the residual Residual of $(\max(\dot{Q}_c, \dot{Q}_h) * T_{lift})$ as inputs to the second regression step to determine the values of $\varphi_1'$ and $\varphi_2'$ and their related uncertainties. Accordingly, the final outputs of the regression process are the power model coefficients $\varphi_1'$ and $\varphi_2'$ and their related uncertainties (for parameters total). $\varphi_1'$ and $\varphi_2'$ are also referred to as $\varphi_{1,reg}$ and $\varphi_{2,reg}$ respectively, or $\varphi_{reg}$ collectively, throughout the present disclosure. In some embodiments, regression power model generator 1504 removes outputs which have p-values greater than a threshold value (e.g., 0.1).

Regression power model generator 1504 can be configured to repeat the regression process for each set of the preprocessed data to generate a plurality of different sets of power model coefficients $\varphi_{reg}$. Each set of the power model coefficients $\varphi_{reg}$ may be associated with a corresponding set of estimated degradation states $\hat{\delta}_k$. Regression power model generator 1504 can update the sets of preprocessed data provided by data preprocessor 1502 to include the values of the power model coefficients $\varphi_{reg}$ that were generated from the corresponding values of the performance variables $y_k$ and may associate each set of the power model coefficients $\varphi_{reg}$ with the degradation states $\hat{\delta}_k$ previously associated with the corresponding values of the performance variables $Y_k$. From a physical standpoint, the set of power model coefficients $\varphi_{reg}$ represents the relationship between resource consumption (e.g., power consumption) and resource production (e.g., heating or cooling load) predicted to result from the corresponding degradation states $\hat{\delta}_k$.

Degradation impact modeler 1314 is shown to include an input scaler 1506 and an input weighter 1508. In some embodiments, prior to using the sets of power model coefficients $\varphi_{reg}$ and corresponding degradation states $\hat{\delta}_k$ as inputs to train neural network 1512, input scaler 1506 may scale these inputs to limit their values between a lower threshold and an upper threshold. For example, input scaler 1506 may add or subtract a scaling value from the inputs and/or multiply the inputs by a scaling factor to ensure that each input has a value between the lower and upper thresholds. In some embodiments, input scaler 1506 standardizes (e.g., modifies, adjusts, etc.) the input data such that adjusted values have zero mean and unity variance.

Input weighter 1508 can be configured to assign a weight to each set of power model coefficients $\varphi_{reg}$ and corresponding degradation states $\hat{\delta}_k$. It may be beneficial in training neural network 1512 if inputs that correspond to more efficient operation of connected equipment 1332 (e.g., higher coefficient of performance (COP) values) have a larger effect on training neural network 1512 as compared to inputs that correspond to less efficient operation of connected equipment 1332 (e.g., lower COP values). Input weighter 1508 can apply a weighting function to the inputs to assign larger weights to inputs with higher COP values and smaller weights to inputs with higher COP values.

To generate the weight function, input weighter 1508 can divide the model used in the second regression step described above by the variable $\max(\dot{Q}_c, \dot{Q}_h)$. This results in the left side of the equation being the inverse of the coefficient of performance (i.e., 1/COP) and the right side of the equation being proportional to $\varphi_1'$. Accordingly, this relationship is defined as:

$$\varphi_1' \propto \frac{1}{COP}$$

Figure 16:
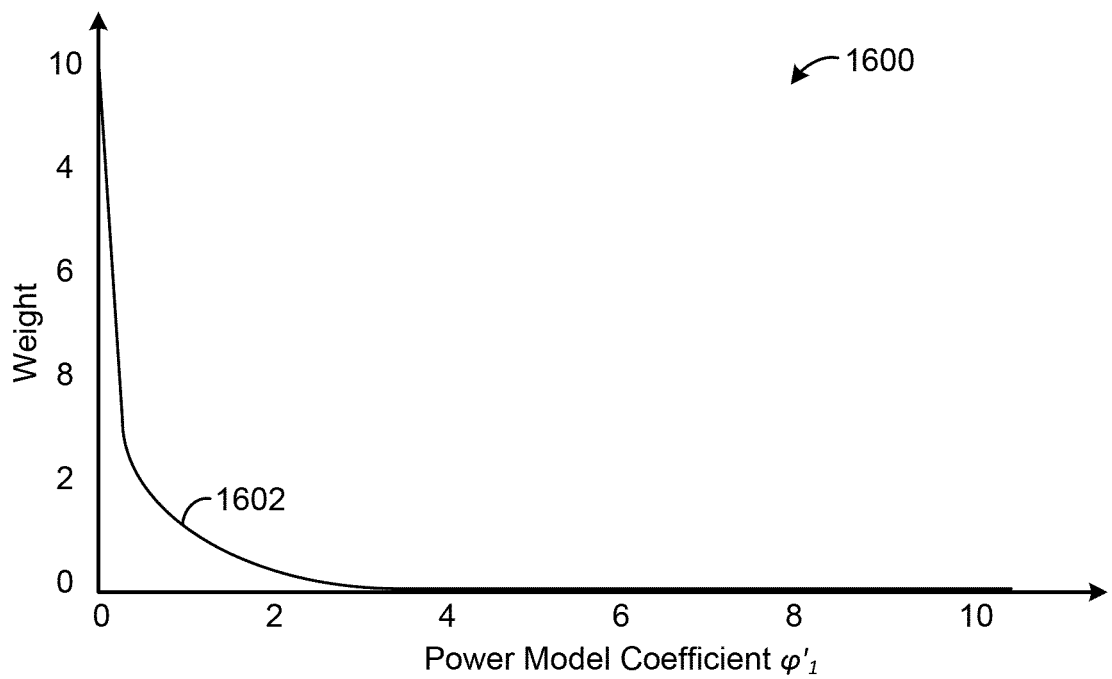
FIG. 16 is a graph illustrating a weighting function that can be used to weight inputs to a neural network model used by the degradation impact modeler of FIG. 15, according to some embodiments.

Due to the inverse relationship between $\varphi_1'$ and COP, input weighter 1508 can generate a weighting function that assigns weights that are inversely proportional to the value of $\varphi_1'$. An example of such a weighting function is:

$$\text{weight} = 10^{1-\varphi_1'}$$

which is shown graphically in FIG. 16 as graph 1600. In graph 1600, curve 1602 represents the relationship between the weight and the power model coefficient $\varphi_1'$.

Referring again to FIG. 15, neural network trainer 1510 is shown receiving scaled inputs input scaler 1506 (e.g., the power model coefficients $\varphi_{reg}$) and the corresponding input weights from input weighter 1508. Neural network trainer 1510 may also receive the estimated degradation states $\hat{\delta}_k$ from degradation estimator 1316. Neural network trainer 1510 may use these inputs to train neural network 1512. In some embodiments, neural network 1512 is a radial basis function neural network (RBFNN). However, other various types of neural networks can be used. Neural network trainer 1510 can train neural network 1512 to map between the degradation states $\hat{\delta}_k$ and the power model parameters $\varphi_{reg}$. Accordingly, once neural network 1512 has been trained, the output of neural network 1512 (i.e., $\varphi_{NN}$) may be the same as or similar to the values of $\varphi_{reg}$ used to train neural network 1512.

Neural network 1512 can be configured to map degradation states $\hat{\delta}_k$ of connected equipment 1332 to the power model coefficients $\varphi_{NN}$, which can be used to calculate predicted operational costs for connected equipment 1332. The degradation states $\hat{\delta}_k$ can specify which of the degradation indices is contributing to coefficients of power (COP) reduction. For this reason, it can be desirable to have a standard COP calculation from the degradation states $\hat{\delta}_k$ that is consistent with a standard COP calculation from measuring the site data. For example, a standard COP calculation can be given by the following equation:

$$\overline{COP}(\varphi_{reg}, x_{standard}, w) = \overline{COP}(\varphi_{NN}, x_{standard}, w)$$

where $\varphi_{reg}$ are the values of the power model coefficients generated by regression power model generator 1504, $x_{standard}$ is a standard matrix of power estimation predictors, w is a weight calculated by a weight function, and $\varphi_{NN}$ are the power model coefficients generated by neural network 1512. The previous equation shows that the two COP calculations are equivalent, regardless of whether the power model coefficients $\varphi_{reg}$ or $\varphi_{NN}$ are used.

Advantageously, neural network 1512 benefits the MPM optimization process performed by MPM system 1300. In some embodiments, neural network 1512 accepts degradation states $\hat{\delta}_k$ as inputs (e.g., refrigerant leakage, compressor power, and airflow restriction) and outputs values of the power model coefficients $\varphi_{NN}$ parameters as well as their related uncertainties. The power model coefficients $\varphi_{NN}$ generated by neural network 1512 may be used in place of the power model coefficients $\varphi_{reg}$ generated by regression power model generator 1504 when calculating the power consumption and resulting operating cost of connected equipment 1332.

In some embodiments, the data used to train neural network 1512 is generated using a simulation framework. The simulation framework can be used to generate a variety of degradation cases that can be used to train neural network 1512. In some embodiments, a simulation platform such as Simulink is used to generate the operational simulation data of the system. Further, neural network 1512 can be retrained as new data is obtain obtained. Retraining neural network 1512 can ensure neural network 1512 properly maps degradation states $\hat{\delta}_k$ to power model coefficients $\varphi_{NN}$ even as the system changes.

In some embodiments, degradation impact modeler 1314 trains neural network 1512 to map the degradation state $\hat{\delta}_k$ to power consumption or other resource consumption of connected equipment 1332. For example, neural network trainer 1510 can receive a set of training data including the estimated degradation states $\hat{\delta}_k$ at each time step k from degradation estimator 1316 along with data indicating the amounts of input resources consumed and output resources produced at each time step k. The amounts of resources consumed and produced at each time step k may be indicated by the performance variables $y_k$.

Neural network trainer 1510 can use these training data to train neural network 1512 to predict the amount of one or more input resources consumed by connected equipment 1332 as a function of both the degradation states $\hat{\delta}_k$ and the requested amount(s) of one or more output resources to be produced by connected equipment 1332. For example, for a VRF system, neural network 1512 can be trained to predict the amount of power consumed at time step k as a function of the degradation states $\hat{\delta}_k$ of the VRF equipment at time step k as well as the requested heating load or cooling load to be served by the VRF equipment at time step k. In this way, neural network 1512 can be trained to predict resource consumption as a function of both the degradation states $\hat{\delta}_k$ and the requested load on connected equipment 1332 without explicitly generating power model coefficients $\varphi_{NN}$ in some embodiments.

Neural Network Examples

Figure 17:
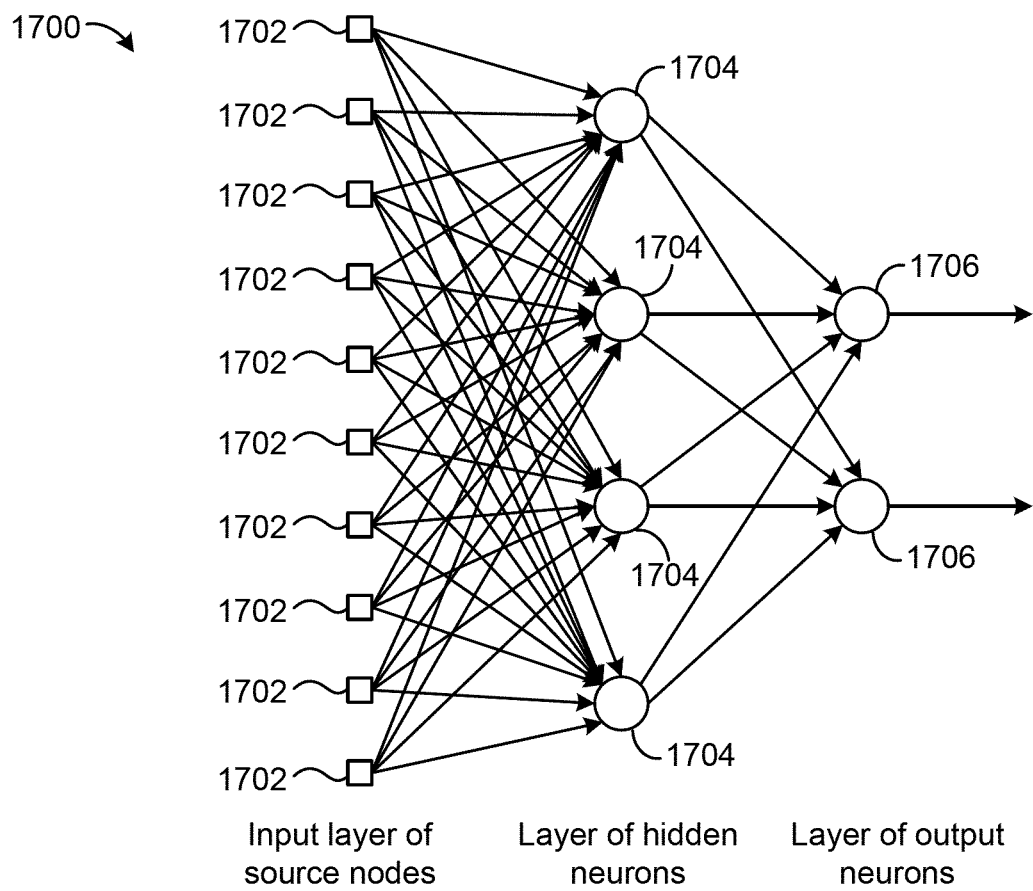
FIG. 17 is an illustration of a neural network model, according to some embodiments.
Figure 18:
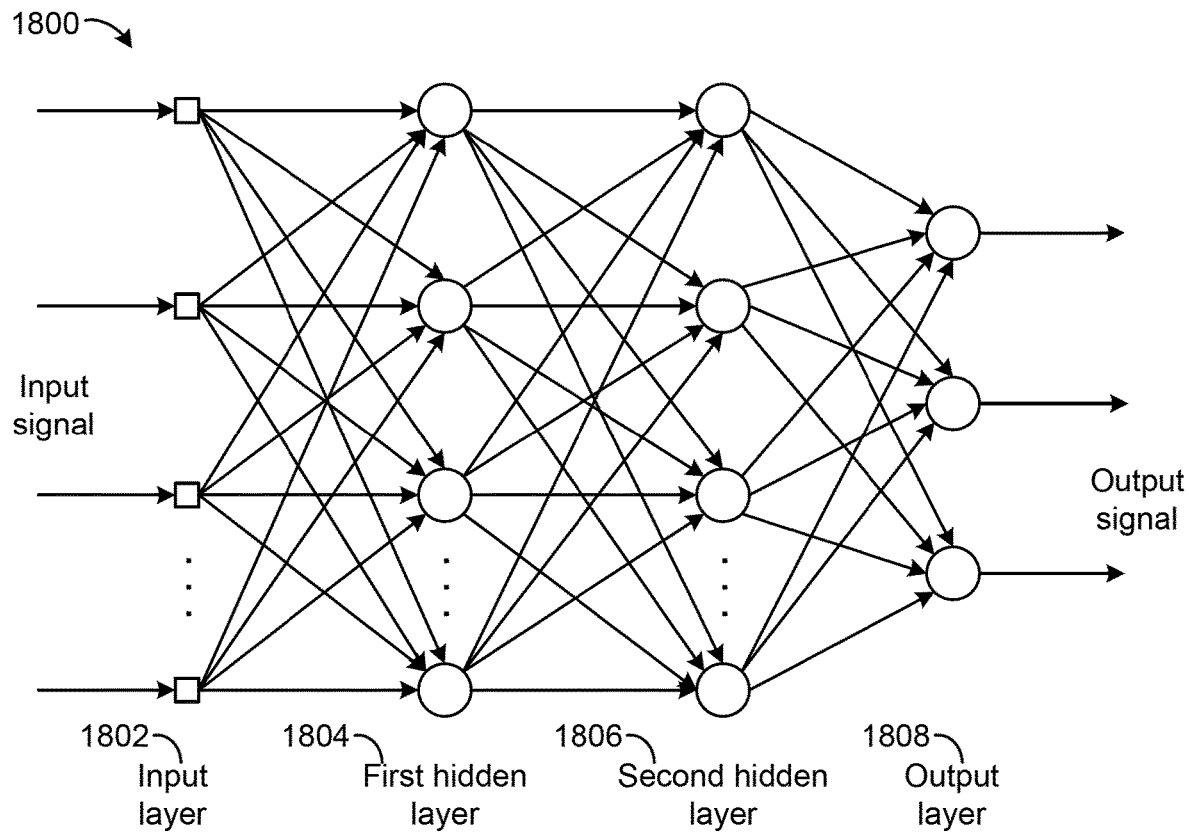
FIG. 18 is an example illustration of a multilayer perceptron (MLP) neural network, according to some embodiments.
Figure 19:
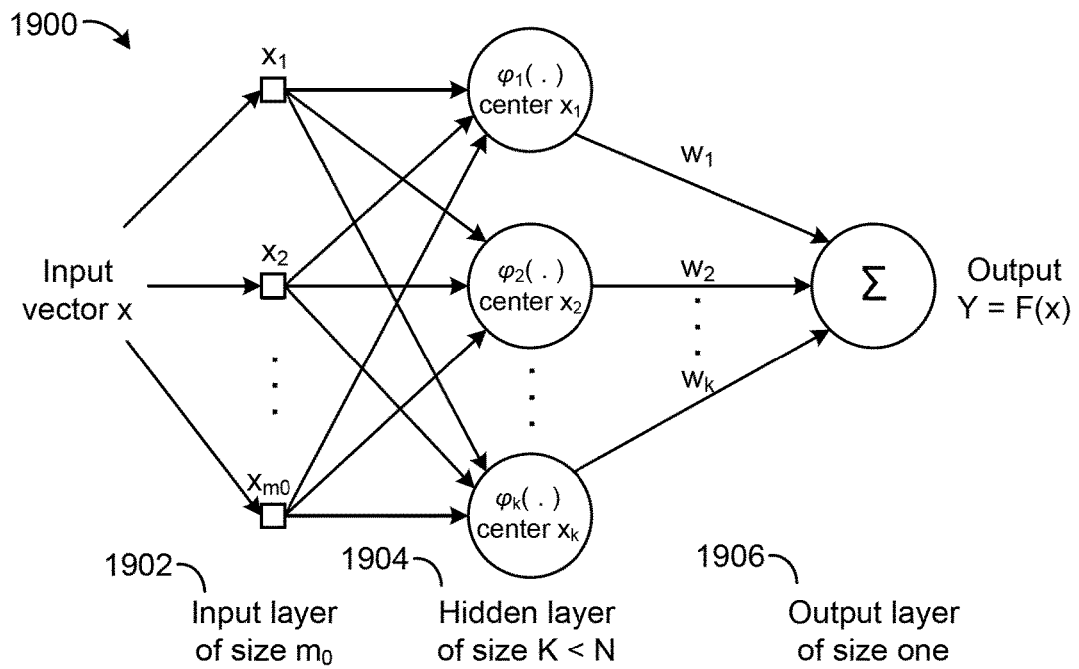
FIG. 19 is an example illustration of a radial basis function neural network (RBFNN), according to some embodiments.

Referring now to FIGS. 17-19, several examples of neural network architectures which can be used for neural network 1512 are shown, according to some embodiments. Referring particularly to FIG. 17, an illustration 1700 of a neural network model is shown, according to some embodiments. As a simple definition for neural networks, neural networks can be considered black boxes that map input samples to desired output values by tuning some parameters that can be referred to as weights. Neural networks can include input layer, hidden layer(s), and output layer and each layer has some nodes or neurons. As such, illustration 1700 is shown to include input nodes 1702 in an input layer, hidden neurons 1704 in a hidden layer, and output neurons 1706 in an output layer. It should be appreciated that while the hidden layer is shown to include one hidden layer, the neural network can include multiple hidden layers if necessary. In a fully connected network, every neuron in each layer is connected to all of the nodes at the next layer as shown in illustration 1700.

A number of neurons in each layer can be determined based on an available data set, a dimension of the data, and what problem is being solved by the neural network. Neural networks can be used for various tasks such as, for example, classification, regression or function approximation, clustering, and so on. Neural networks can be considered universal approximators. In other words, neural networks can approximate any function from simple to complex using some input-output data pairs provided to the neural networks. Different types of neural networks exist and can be used based on the type of the problem. Some examples of neural networks include multilayer perceptron (MLP), radial basis function (RBF) networks, recurrent neural network (RNN), and autoencoder neural networks. In particular, RBF networks can be beneficial for solving regression problems in multidimensional space.

Referring now to FIG. 18, an example illustration 1800 of an MLP neural network is shown, according to some embodiments. Example illustration 1800 is shown to include an input layer 1802 that includes multiple input nodes (e.g., input nodes 1702 as described with reference to FIG. 17), a first hidden layer 1804, a second hidden layer 1806, and an output layer 1808. Hidden layers 1804 and 1806 are shown to include hidden neurons (e.g., hidden neurons 1704). Likewise, output layer 1808 is shown to include output neurons (e.g., output neurons 1706). It should be appreciated that the number of input nodes, hidden neurons, and output neurons can vary depending on the problem being solved. In general, an MLP neural network includes one input layer, one output layer, and usually more than one hidden layer. In some embodiments, however, the MLP neural network only has one hidden layer dependent on a problem being solved. Each hidden layer neuron can have nonlinear activation functions (e.g., a sigmoid function).

Referring now to FIG. 19, an example illustration 1900 of a radial basis function neural network (RBFNN) is shown, according to some embodiments. Example illustration 1900 is shown to include an input layer 1902 of size $m_0$, a hidden layer 1904 of size K<N, and an output layer 1906 of size one where $m_0$ is a size of an input vector x, N is a size of hidden layer 1904, and K is a number of input neurons. In general, an RBFNN is a three-layer neural network that has only one hidden layer (i.e., hidden layer 1904). The activation functions in the hidden layer can be radial basis functions or Gaussian shape functions. Output of the neurons in the hidden layers can, for example, correspond to a distance of their respective inputs from a center of the Gaussian function. The output layer can generate a linear combination of the hidden unit activations. An example of a function which can be used as activation function in RBF networks can be given by the following:

$$h(x) = \exp\left(-\frac{(x-c)^2}{r^2}\right)$$

where c is a center of the radial basis function and r is a measure of a width of the radial basis function.

As mentioned above, an output of output layer 1906 can be given as a linear combination of the hidden unit activations. In particular, the output can be given by the following:

$$f(x) = \sum_{j=1}^{m} w_j h_j(x)$$

where m is a number of hidden neurons, $w_j$ is a weight associated with hidden node j, and $h_j(x)$ is a result of the activation function for hidden node j.

Neural network 1512 may include any of a variety of neural network model such as, for example, an MLP, an RBFNN, an RNN, an autoencoder neural network, etc. In some embodiments, neural network 1512 receives a degradation state $\hat{\delta}_k$ as input. The degradation state $\hat{\delta}_k$ can include various degradation metrics such as an air flow restriction, refrigerant loss, compressor degradation, etc. of various components of connected equipment 1332. In this way, values of $\hat{\delta}_k$ can represent input neurons to neural network 1512. As described above with reference to FIGS. 17-19, inputs of the input neurons can be passed through hidden layers of neural network model until an output layer of the neural network model is reached. The output of an output neural network 1512 can include power model coefficients $\varphi_k$ for a time step k and an uncertainty $\sigma_{\varphi_k}$ (e.g., a standard deviation, a variance, etc.) of the power model coefficients $\varphi_k$. In some embodiments, $\sigma_{\varphi_k}$ is an optional output of neural network model 1512 and can be omitted in some implementations.

As applied to a VRF system, the power consumption model may be a linear equation that relates power consumption, heating or cooling load, and a lift temperature $\hat{T}_{lift}$, where $\hat{T}_{lift}$ represents a difference between an outdoor ambient temperature and a predefined setpoint. Coefficients of the power consumption model $\varphi_{reg}$ as well as their uncertainty values can be obtained by performing a linear regression. The coefficients $\varphi_{reg}$ obtained by the regression can be used as a target of neural network 1512 when trained by neural network trainer 1510. In this way, neural network 1512 can be trained to predict coefficients $\varphi_{NN}$ of the power consumption model as well as their related uncertainties. In some embodiments, an RBFNN is a preferred neural network for mapping degradation indices to power model coefficients $\varphi_{NN}$.

Degradation Impact Modeling Process

Figure 20:
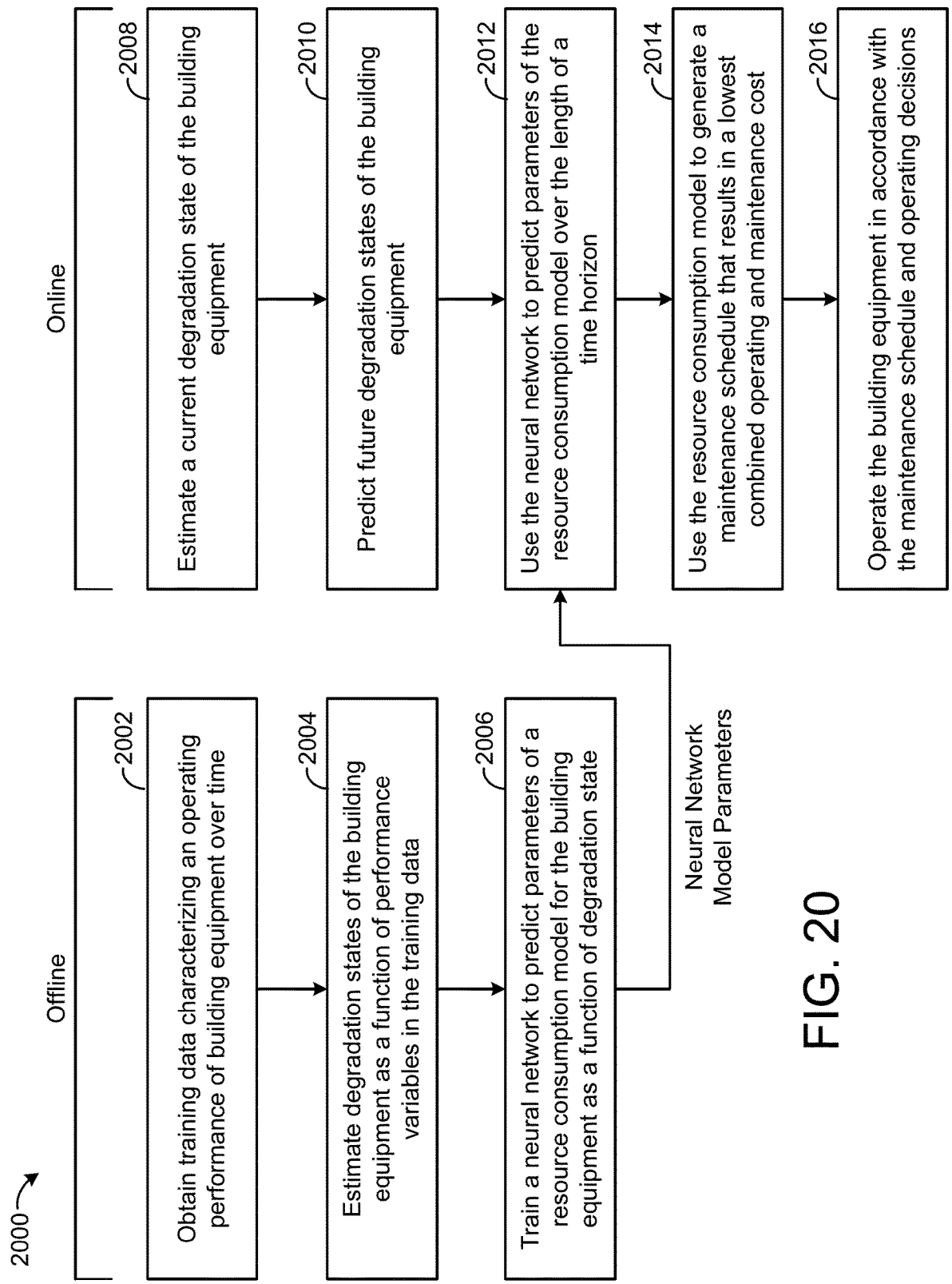
FIG. 20 is a flowchart of a process for generating a maintenance schedule for building equipment, which can be performed by the MPM system of FIG. 13, according to some embodiments.

Referring now to FIG. 20, a flowchart of a process 2000 which can be performed by MPM system 1300 is shown, according to an exemplary embodiment. Process 2000 is shown to include a set of offline steps 2002-2006 and a set of online steps 2008-2016. It is contemplated that steps 2002-2006 can be performed offline (e.g., prior to operating actual building equipment) using historical operating data and/or simulated operating data for a set of building equipment. Steps 2008-2016 may be performed online (e.g., during real-time operation of the building equipment or different building equipment) to generate operating decisions and maintenance decisions for the building equipment over a given time period. The steps of process 2000 may be performed by various components of MPM system 1300 or any of the systems or components previously described herein.

Process 2000 is shown to include obtaining training data characterizing an operating performance of building equipment over time (step 2002). The training data may indicate an amount of resource consumption of the building equipment (e.g., electricity, natural gas, water, etc.) at a plurality of different times and corresponding amounts of resource production (e.g., hot water, cold water, heating load, cooling load, filtered air, etc.) at each of the plurality of different times. The training data may indicate the relationship between resource consumption and resource production at each of the different times. In some embodiments, the training data can be retrieved from a database of historical operating data for the building equipment (e.g., connected equipment 1332) or similar building equipment. In other embodiments, the training data can be generated by running a simulation of the building equipment.

Process 2000 is shown to include estimating degradation states of the building equipment as a function of performance variables in the training data (step 2004). In some embodiments, step 2004 is performed by degradation estimator 1316 as described with reference to FIGS. 13-15. Step 2004 may include estimating one or more degradation states $\hat{\delta}_k$ of the building equipment at each of a plurality of time steps k (e.g., k=1 . . . n). Step 2004 may further include matching each of the degradation states $\hat{\delta}_k$ with corresponding values of resource consumption and resource production for the building equipment at the given time step k.

Process 2000 is shown to include training a neural network to predict parameters of a resource consumption model for the building equipment as a function of the degradation state (step 2006). Step 2006 may be performed by degradation impact modeler 1314 as described with reference to FIGS. 13-15. The resource consumption model may be any type of model that relates the amount of any input resource (or multiple input resources) consumed by building equipment to an amount of any output resource (or multiple output resources) produced by the building equipment. For example, a resource consumption model for VRF equipment may relate power consumption (an input resource) to heating load or cooling load (output resources). As another example, a resource consumption model for a chiller may relate water consumption and/or electricity consumption (input resources) to an amount of chilled water produced and/or cooling load (output resources).

In some embodiments, step 2006 includes using the estimated degradation states $\hat{\delta}_k$ and corresponding values of resource consumption and resource production to train a regression model. For example, the regression model may be a power consumption model that predicts the power consumption of the building equipment as a function of the heating or cooling load on the equipment and a set of regression model coefficients $\varphi_{reg,k}$ for each of the time steps k. Step 2006 may include performing a regression process to generate values of the power model coefficients $\varphi_{reg,k}$ using the corresponding values of resource consumption and resource production at each time step k.

In some embodiments, step 2006 includes using the generated power model coefficients $\varphi_{reg,k}$ and the corresponding degradation states $\hat{\delta}_k$ to train a neural network. In some embodiments, the neural network is neural network 1512 and is trained by neural network trainer 1510 as described with reference to FIG. 15. The neural network can be trained to predict the values of the power model coefficients $\varphi_{NN,k}$ as a function of the degradation states $\hat{\delta}_k$. Once the neural network has been trained, it can be used to generate values of the power model coefficients $\varphi_{NN,k}$ that are the same as or similar to the regression model coefficients $\varphi_{reg,k}$ generated by regression power modeler 1504. The output of step 2006 may include a set of neural network model parameters (e.g., learned weights between nodes of the neural network) for use in the online portion of process 2000.

Moving into the online portion of process 2000, process 2000 is shown to include estimating a current degradation state of the building equipment (step 2008). In some embodiments, step 2008 is performed by degradation estimator 1316 as described with reference to FIGS. 13-15. Step 2008 may be similar to step 2004, with the exception that the degradation state $\hat{\delta}_k$ estimated in step 2008 is the current degradation state of the building equipment for which operating decisions and maintenance decisions are desired. Process 2000 is shown to include predicting future degradation states of the building equipment (step 2010). Step 2010 may be performed by degradation predictor 1322 as described with reference to FIGS. 13-15 and may include predicting a degradation state $\hat{\delta}_{k+1}$ for one or more time steps subsequent to the current time step k. In some embodiments, step 2010 includes predicting the future degradation states $\hat{\delta}_{k+1}$ as a function of the current degradation state $\hat{\delta}_k$ and a set of maintenance decisions $m_k$ for the building equipment. The future degradation states $\hat{\delta}_{k+1}$ may be predicted for each time step within a given time horizon.

Process 2000 is shown to include using the neural network model to predict parameters of the resource consumption model over the length of a time horizon (step 2012). Step 2012 may include applying the predicted degradation states $\hat{\delta}_{k+1}$ as inputs to the neural network model and obtaining the parameters of the resource consumption model $\varphi_{NN,k}$ as outputs of the neural network model. Step 2012 may include generating a set of resource consumption model parameters $\varphi_{NN,k}$ for each time step within the given time horizon, which may be the same time horizon for which predicted degradation states $\hat{\delta}_{k+1}$ are generated in step 2010.

Process 2000 is shown to include using the resource consumption model to generate a maintenance schedule for the building equipment that results in a lowest combined operating and maintenance cost (step 2014). In some embodiments, step 2014 is performed by model predictive optimizer 1320 as described with reference to FIGS. 13-15. Step 2014 may include optimizing an objective function J that accounts for the operating cost of the building equipment and the maintenance cost of the building equipment over the time horizon. Both the operating cost and the maintenance cost may be a function of a set of maintenance decisions defined by the maintenance schedule $m_k$. The maintenance cost may be a direct function of the maintenance decisions because each maintenance activity may incur a corresponding cost when the maintenance activity is performed. The operating cost may be an indirect function of the maintenance decisions because the maintenance activities at a given time step k reduce the predicted degradation states $\hat{\delta}_{k+1}$ at subsequent time steps, which results in improved operating efficiency and reduced operating cost.

Process 2000 is shown to include operating the building equipment in accordance with the maintenance schedule and operating decisions (step 2016). In some embodiments, the optimization performed in step 2014 may produce both a set of maintenance decisions and a set of operating decisions for the building equipment. Step 2016 may include executing the decisions generated in step 2014. Maintenance decisions can be executed by placing service requests with service providers 1330 and performing maintenance, replacement, upgrades, or other activities that result in changes to the set of building equipment. Operating decisions can be executed by providing adjusted setpoints to the building equipment, providing control signals to the building equipment, or otherwise operating the building equipment in accordance with the operating decisions determined in step 2014.

In some embodiments, process 2000 includes initiating a maintenance activity for the building equipment in accordance with the maintenance schedule. The maintenance activity may include performing maintenance on the building equipment, repairing the building equipment, replacing one or more devices of the building equipment, upgrading the building equipment, placing a service request with service providers for the building equipment, scheduling a service appointment, generating a maintenance recommendation for a user to review and approve, or otherwise taking action based on the maintenance schedule generated in step 2014.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A model predictive maintenance (MPM) system for building equipment, the MPM system comprising:
one or more processing circuits comprising one or more processors and memory storing instructions that, when executed by the one or more processors, cause the one or more processors to perform operations comprising:
estimating a degradation state of the building equipment;
using a degradation impact model to generate parameters of a separate resource consumption model based on the degradation state of the building equipment, wherein the degradation impact model receives the degradation state of the building equipment as an input to the degradation impact model and provides the parameters of the resource consumption model as an output of the degradation impact model;
using the resource consumption model to predict an amount of one or more input resources that are provided as inputs to the building equipment and consumed by the building equipment to produce an amount of one or more output resources by converting the one or more input resources into the one or more output resources, wherein the resource consumption model defines a relationship between the amount of the one or more input resources consumed and the amount of the one or more output resources produced based on the parameters generated and output by the degradation impact model;
generating a maintenance schedule for the building equipment and operating decisions for the building equipment based on the amount of the one or more input resources predicted using the resource consumption model;
initiating a maintenance activity for the building equipment in accordance with the maintenance schedule; and
controlling the building equipment by generating electronic control signals based on the operating decisions for the building equipment and causing the building equipment to affect a variable state or condition in a building using the electronic control signals.

2. The MPM system of claim 1, wherein the degradation impact model is trained using historical or simulated training data prior to using the degradation impact model to predict the amount of the one or more input resources consumed by the building equipment, wherein training the degradation impact model comprises:

generating the training data for the degradation impact model, the training data comprising a plurality of different values of the degradation state of the building equipment and corresponding values of parameters of a resource consumption model for the building equipment; and using the training data to train the degradation impact model to predict the values of the parameters of the resource consumption model as a function of the degradation state.

3. The MPM system of claim 2, wherein generating the training data comprises:

performing a regression process to generate the values of the parameters of the resource consumption model using data associated with a first degradation state of the building equipment; and repeating the regression process using data associated with one or more additional degradation states of the building equipment to generate a plurality of different values of the parameters of the resource consumption model, the plurality of different values of the parameters corresponding to a plurality of different degradation states of the building equipment.

4. The MPM system of claim 1, wherein the degradation impact model comprises a neural network model and using the degradation impact model to predict the amount of the one or more input resources consumed by the building equipment comprises:

providing the degradation state of the building equipment and an amount of the one or more output resources to be produced by the building equipment as inputs to the neural network model; and obtaining the amount of one or more input resources consumed by the building equipment as an output of the neural network model.

5. The MPM system of claim 1, wherein generating the maintenance schedule for the building equipment comprises:

performing an optimization of an objective function that accounts for both a cost of operating the building equipment and a cost of performing maintenance on the building equipment over a time period; and generating a set of maintenance decisions for the building equipment as a result of performing the optimization, the set of maintenance decisions forming the maintenance schedule.

6. The MPM system of claim 1, wherein generating the maintenance schedule for the building equipment comprises:

calculating a cost of operating the building equipment over a time period as a function of the degradation state of the building equipment at one or more times within the time period;

calculating a cost of performing maintenance on the building equipment over the time period as a function of one or more maintenance activities defined by the maintenance schedule;

adjusting the degradation state of the building equipment at one or more times following the one or more maintenance activities defined by the maintenance schedule; and generating the maintenance schedule that results in a lowest total cost comprising the cost of operating the building equipment over the time period and the cost of performing maintenance on the building equipment over the time period.

7. The MPM system of claim 1, wherein generating the maintenance schedule comprises determining a specific type of maintenance activity to be performed at a service time from a set of multiple different types of maintenance activities based on (1) first costs of operating the building equipment over a time period predicted to result from the multiple different types of the maintenance activities and (2) second costs of servicing the building equipment over the time period predicted to result from the multiple different types of the maintenance activities.

8. The MPM system of claim 1, wherein the degradation state of the building equipment is an initial degradation state, the operations further comprising:

predicting one or more future degradation states of the building equipment as a function of the initial degradation state; and using the degradation impact model to predict the amount of the one or more input resources consumed by the building equipment at one or more future times as a function of the one or more future degradation states.

9. A method for using model predictive maintenance (MPM) to generate a maintenance schedule for building equipment, the method comprising:

estimating a degradation state of the building equipment;

using a degradation impact model to generate parameters of a separate resource consumption model based on the degradation state of the building equipment, wherein the degradation impact model receives the degradation state of the building equipment as an input to the degradation impact model and provides the parameters of the resource consumption model as an output of the degradation impact model;

using the resource consumption model to predict an amount of one or more input resources that are provided as inputs to the building equipment and consumed by the building equipment to produce an amount of one or more output resources by converting the one or more input resources into the one or more output resources, wherein the resource consumption model defines a relationship between the amount of the one or more input resources consumed and the amount of the one or more output resources produced based on the parameters generated and output by the degradation impact model;

generating a maintenance schedule for the building equipment and operating decisions for the building equipment based on the amount of the one or more input resources predicted using the resource consumption model;

initiating a maintenance activity for the building equipment in accordance with the maintenance schedule; and controlling the building equipment by generating electronic control signals based on the operating decisions for the building equipment and causing the building equipment to affect a variable state or condition in a building using the electronic control signals.

10. The method of claim 9, wherein the degradation impact model is trained using historical or simulated training data prior to using the degradation impact model to predict the amount of the one or more input resources consumed by the building equipment, wherein training the degradation impact model comprises:

generating the training data for the degradation impact model, the training data comprising a plurality of different values of the degradation state of the building equipment and corresponding values of parameters of a resource consumption model for the building equipment; and using the training data to train the degradation impact model to predict the values of the parameters of the resource consumption model as a function of the degradation state.

11. The method of claim 10, wherein generating the training data comprises:
performing a regression process to generate the values of the parameters of the resource consumption model using data associated with a first degradation state of the building equipment; and
repeating the regression process using data associated with one or more additional degradation states of the building equipment to generate a plurality of different values of the parameters of the resource consumption model, the plurality of different values of the parameters corresponding to a plurality of different degradation states of the building equipment.

12. The method of claim 9, wherein the degradation impact model comprises a neural network model and using the degradation impact model to predict the amount of the one or more input resources consumed by the building equipment comprises:
providing the degradation state of the building equipment and an amount of the one or more output resources to be produced by the building equipment as inputs to the neural network model; and
obtaining the amount of one or more input resources consumed by the building equipment as an output of the neural network model.

13. The method of claim 9, wherein generating the maintenance schedule for the building equipment comprises:
performing an optimization of an objective function that accounts for both a cost of operating the building equipment and a cost of performing maintenance on the building equipment over a time period; and
generating a set of maintenance decisions for the building equipment as a result of performing the optimization, the set of maintenance decisions forming the maintenance schedule.

14. The method of claim 9, wherein generating the maintenance schedule for the building equipment comprises:
calculating a cost of operating the building equipment over a time period as a function of the degradation state of the building equipment at one or more times within the time period;
calculating a cost of performing maintenance on the building equipment over the time period as a function of one or more maintenance activities defined by the maintenance schedule;
adjusting the degradation state of the building equipment at one or more times following the one or more maintenance activities defined by the maintenance schedule; and
generating the maintenance schedule that results in a lowest total cost comprising the cost of operating the building equipment over the time period and the cost of performing maintenance on the building equipment over the time period.

15. The method of claim 9, wherein the degradation state of the building equipment is an initial degradation state, the method comprising:
predicting one or more future degradation states of the building equipment as a function of the initial degradation state; and
using the degradation impact model to predict the amount of the one or more input resources consumed by the building equipment at one or more future times as a function of the one or more future degradation states.

16. The method of claim 9, wherein generating the maintenance schedule comprises determining a specific type of maintenance activity to be performed at a service time from a set of multiple different types of maintenance activities based on (1) first costs of operating the building equipment over a time period predicted to result from the multiple different types of the maintenance activities and (2) second costs of servicing the building equipment over the time period predicted to result from the multiple different types of the maintenance activities.

17. A model predictive maintenance (MPM) system for building equipment, the MPM system comprising:
one or more processing circuits comprising one or more processors and memory storing instructions that, when executed by the one or more processors, cause the one or more processors to perform operations comprising:
using a degradation impact model to generate parameters of a separate resource consumption model for the building equipment based on a degradation state of the building equipment, wherein the degradation impact model receives the degradation state of the building equipment as an input to the degradation impact model and provides the parameters of the resource consumption model as an output of the degradation impact model;
using the resource consumption model to predict an amount of one or more input resources provided as inputs to the building equipment and consumed by the building equipment to produce an amount of one or more output resources by converting the one or more input resources into the one or more output resources, wherein the resource consumption model defines a relationship between the amount of the one or more input resources consumed and the amount of the one or more output resources produced based on the parameters generated and output by the degradation impact model;
using the resource consumption model to generate a maintenance schedule for the building equipment and operating decisions for the building equipment that result in a lowest total cost of operating the building equipment and performing maintenance on the building equipment over a time period;
initiating a maintenance activity for the building equipment in accordance with the maintenance schedule; and
controlling the building equipment by generating electronic control signals based on the operating decisions for the building equipment and causing the building equipment to affect a variable state or condition in a building using the electronic control signals.

18. The MPM system of claim 17, wherein using the resource consumption model to generate the maintenance schedule comprises:
using the resource consumption model to predict an amount of one or more input resources consumed by the building equipment to produce one or more output resources as a function of the parameters of the resource consumption model; and generating the maintenance schedule based on the amount of the one or more input resources consumed by the building equipment to produce the one or more output resources.

19. The MPM system of claim 17, wherein the degradation impact model is trained using historical or simulated training data prior to using the degradation impact model to generate the parameters of the resource consumption model, wherein training the degradation impact model comprises:
  generating the training data for the degradation impact model, the training data comprising a plurality of different values of the degradation state of the building equipment and corresponding values of the parameters of the resource consumption model; and
  using the training data to train the degradation impact model to predict the values of the parameters of the resource consumption model as a function of the degradation state.

20. The MPM system of claim 19, wherein generating the training data comprises:
  performing a regression process to generate the values of the parameters of the resource consumption model using data associated with a first degradation state of the building equipment; and
  repeating the regression process using data associated with one or more additional degradation states of the building equipment to generate a plurality of different values of the parameters of the resource consumption model, the plurality of different values of the parameters corresponding to a plurality of different degradation states of the building equipment.

* * * * *